(12) United States Patent
Blake et al.

(10) Patent No.: US 12,179,902 B2
(45) Date of Patent: Dec. 31, 2024

(54) SMART CARGO BAY DOOR(S) FOR A UAV

(71) Applicant: Wing Aviation LLC, Mountain View, CA (US)

(72) Inventors: Jesse Blake, Palo Alto, CA (US); Andre Prager, Sunnyvale, CA (US); Evan Twyford, Mountain View, CA (US); Ivan Qiu, Redwood City, CA (US); Jasper Lewin, Santa Cruz, CA (US)

(73) Assignee: Wing Aviation LLC, Palo Alto, CA (US)

( * ) Notice: Subject to any disclaimer, the term of this patent is extended or adjusted under 35 U.S.C. 154(b) by 111 days.

(21) Appl. No.: 17/864,975

(22) Filed: Jul. 14, 2022

(65) Prior Publication Data

US 2024/0017814 A1 Jan. 18, 2024

(51) Int. Cl.
*B64C 1/14* (2006.01)
*B64C 39/02* (2023.01)
*B64U 101/60* (2023.01)

(52) U.S. Cl.
CPC .......... *B64C 1/1415* (2013.01); *B64C 39/024* (2013.01); *B64U 2101/60* (2023.01)

(58) Field of Classification Search
CPC ...... B64C 1/1415; B64C 1/22; B64U 2101/60
See application file for complete search history.

(56) References Cited

U.S. PATENT DOCUMENTS

| | | | | |
|---|---|---|---|---|
| 9,493,227 B2* | 11/2016 | Helou, Jr. | ............... | B64C 39/02 |
| 10,793,272 B2* | 10/2020 | Shannon | .................. | B64D 1/12 |
| 11,186,368 B2* | 11/2021 | Prager | .................. | B64C 39/024 |
| 2004/0135031 A1 | 7/2004 | Stupakis | | |
| 2011/0084162 A1* | 4/2011 | Goossen | .................. | B64D 1/22 |
| | | | | 244/135 C |
| 2021/0214082 A1* | 7/2021 | Inuma | ....................... | B64D 1/12 |
| 2022/0048625 A1 | 2/2022 | Prager et al. | | |

FOREIGN PATENT DOCUMENTS

| | | | |
|---|---|---|---|
| CN | 207389571 | * | 2/2018 |
| CN | 107985597 | | 5/2018 |
| CN | 207389571 U | | 5/2018 |
| CN | 207617959 U | | 7/2018 |
| WO | 2020/041318 | | 2/2020 |

OTHER PUBLICATIONS

The International Search Report (ISR) with Written Opinion for PCT/US2023/069917 dated Oct. 27, 2023, pp. 1-9.

* cited by examiner

*Primary Examiner* — Justin M Benedik
(74) *Attorney, Agent, or Firm* — MCDONNELL BOEHNEN HULBERT & BERGHOFF LLP

(57) ABSTRACT

An unmanned aerial vehicle (UAV) including a fuselage body having a cavity that forms a cargo bay for transporting a payload, and a lower access opening for lowering the payload from the cargo bay, the lower access opening including a cargo bay door; a winch system positioned in the cargo bay configured to suspend a payload within the cargo bay; and a cargo bay door monitor which is configured to detect when the payload is applying a weight to the cargo bay door.

25 Claims, 55 Drawing Sheets

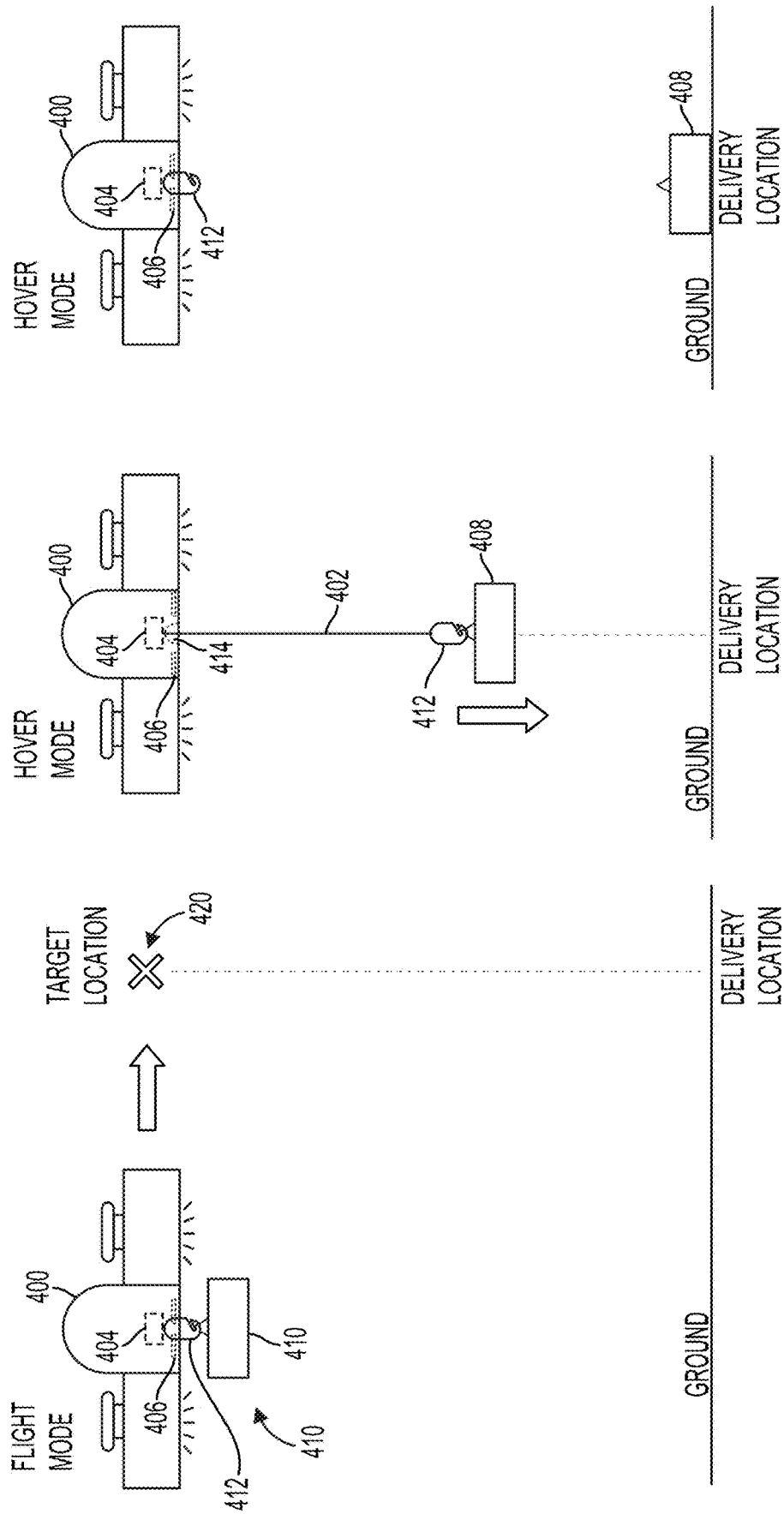

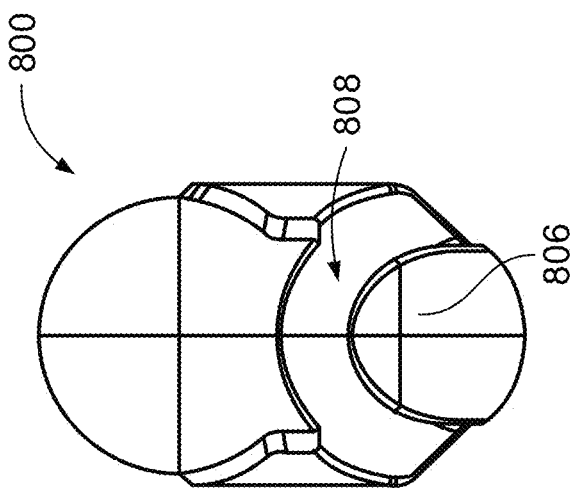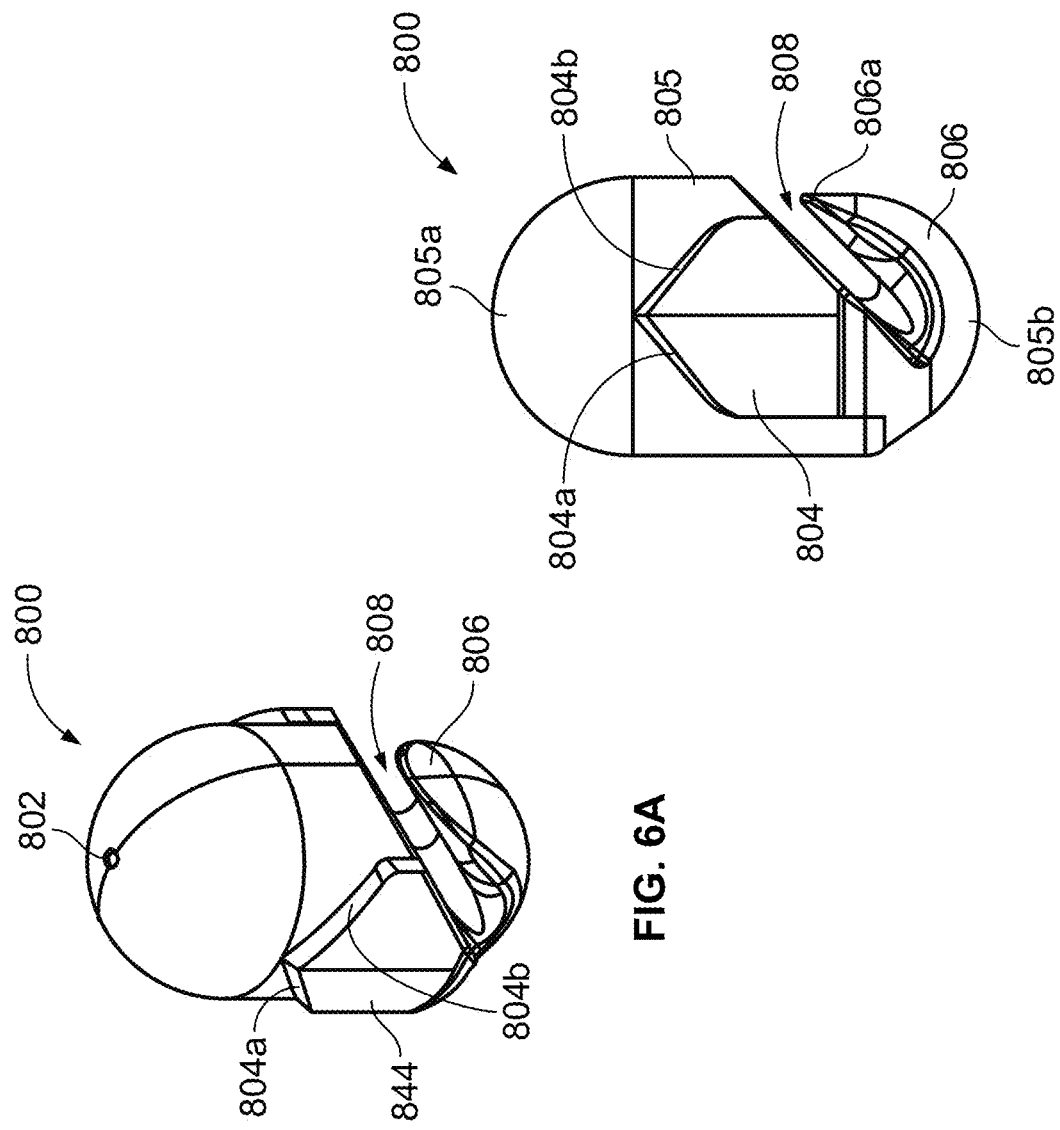

SMART CARGO BAY DOOR(S) FOR A UAV

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

The present embodiments are directed to an unmanned aerial vehicle having a cargo bay for housing a payload, a cargo bay door(s), a winch system configured to suspend the payload within the cargo bay, and a cargo bay door monitor which is configured to detect when the payload is applying a weight to the cargo bay door.

In one aspect, an unmanned aerial vehicle (UAV) is provided that includes a fuselage body having a cavity that forms a cargo bay for transporting a payload, and a lower access opening for lowering the payload from the cargo bay, the lower access opening including a cargo bay door; a winch system positioned in the cargo bay configured to suspend a payload within the cargo bay; and a cargo bay door monitor which is configured to detect when the payload is applying a weight to the cargo bay door.

In another aspect, an unmanned aerial vehicle (UAV) is provided having a fuselage body including a cavity that forms a cargo bay for transporting a payload; and a lower access opening for lowering the payload from the cargo bay, the lower access opening including a cargo bay door; a winch system positioned in the cargo bay configured to suspend a payload within the cargo bay; and a cargo bay door monitor which is configured to detect when the payload is in contact with the cargo bay door.

In a further aspect, method is provided including (i) providing an unmanned aerial vehicle (UAV) having a fuselage body including a cavity that forms a cargo bay for transporting a payload, and a lower access opening for lowering the payload from the cargo bay, the lower access opening including a cargo bay door; a winch system positioned in the cargo bay configured to suspend a payload within the cargo bay; and a cargo bay door monitor which is configured to detect contact between the payload and the cargo bay door; and (ii) using the cargo bay door monitor to detect contact between the payload and the cargo bay door.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIGS. 4A, 4B, and 4C show a payload delivery apparatus, according to example embodiments.

FIG. 6A is a perspective view of payload coupling apparatus 800, according to an example embodiment.

FIG. 6B is a side view of payload coupling apparatus 800 shown in FIG. 6A.

FIG. 6C is a front view of payload coupling apparatus 800 shown in FIGS. 6A and 6B.

DETAILED DESCRIPTION

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

Figure 1A:
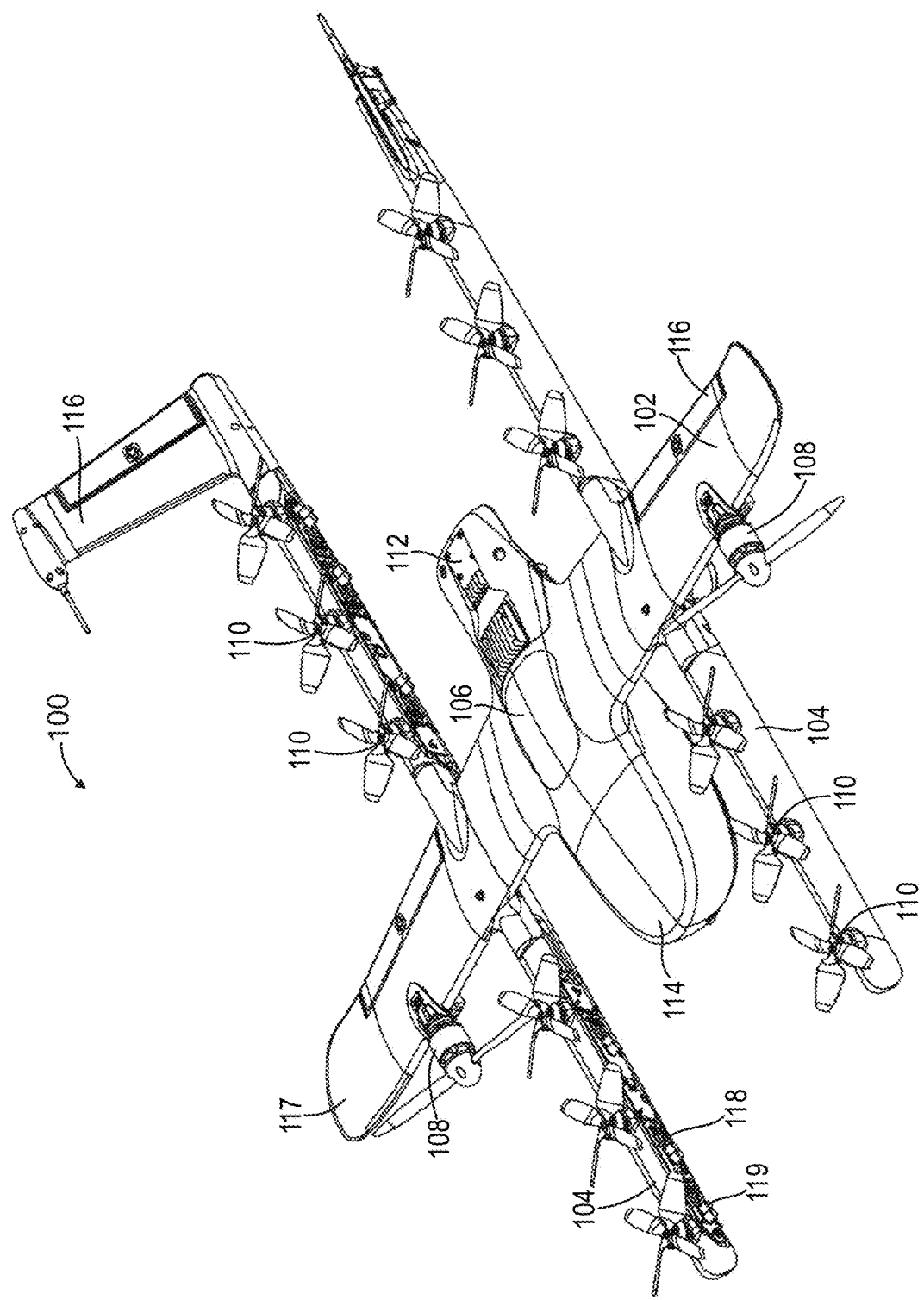
FIG. 1A is an isometric view of an example unmanned aerial vehicle 100, according to an example embodiment.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
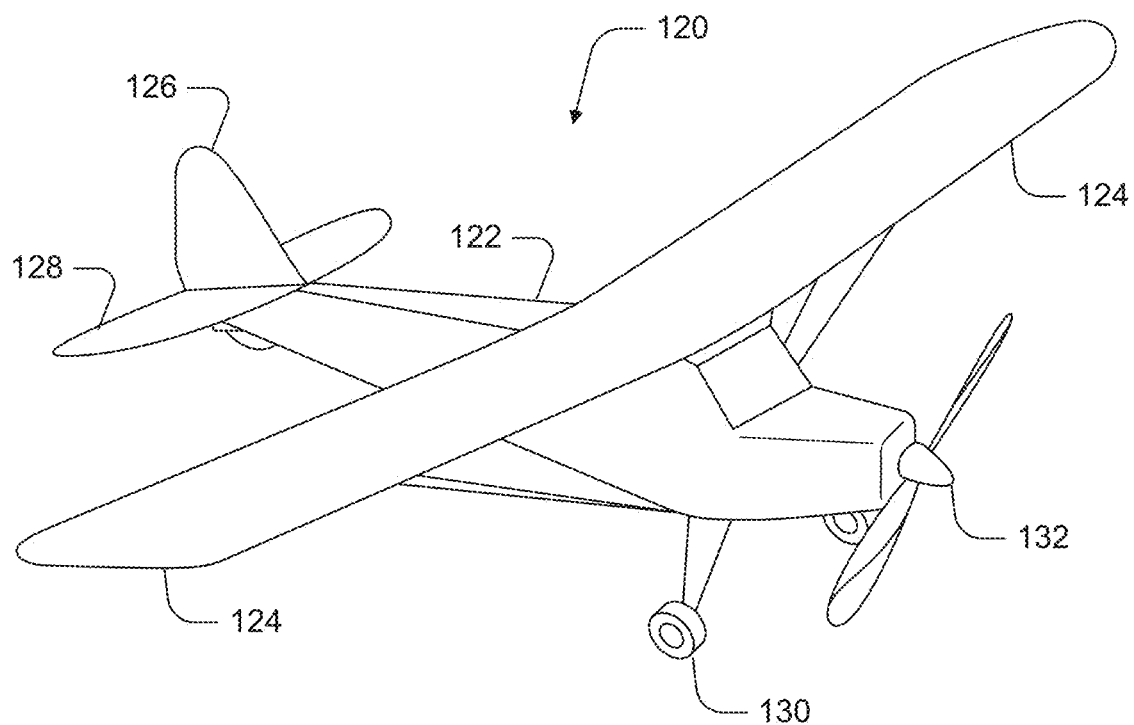
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
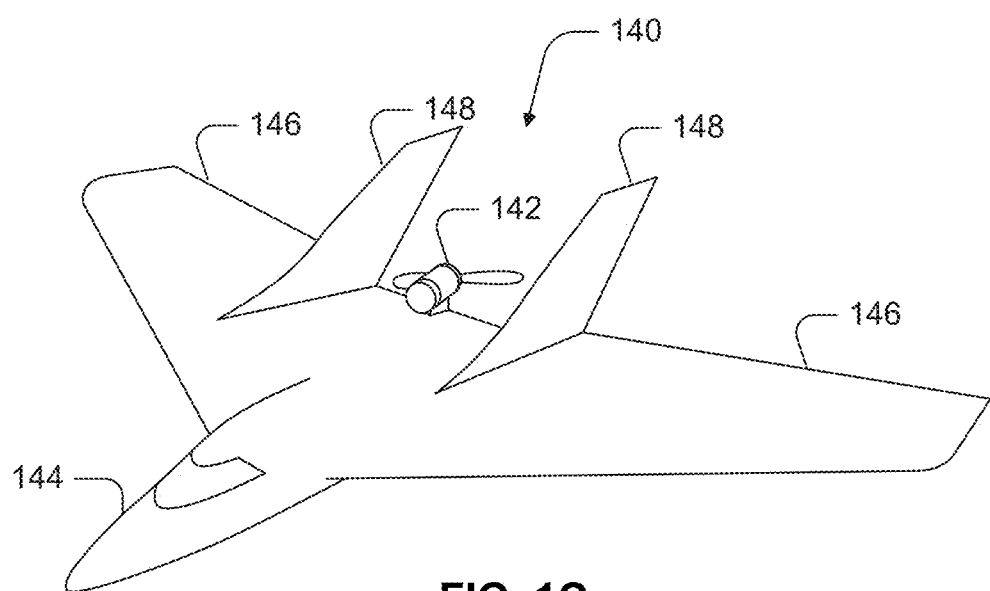
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
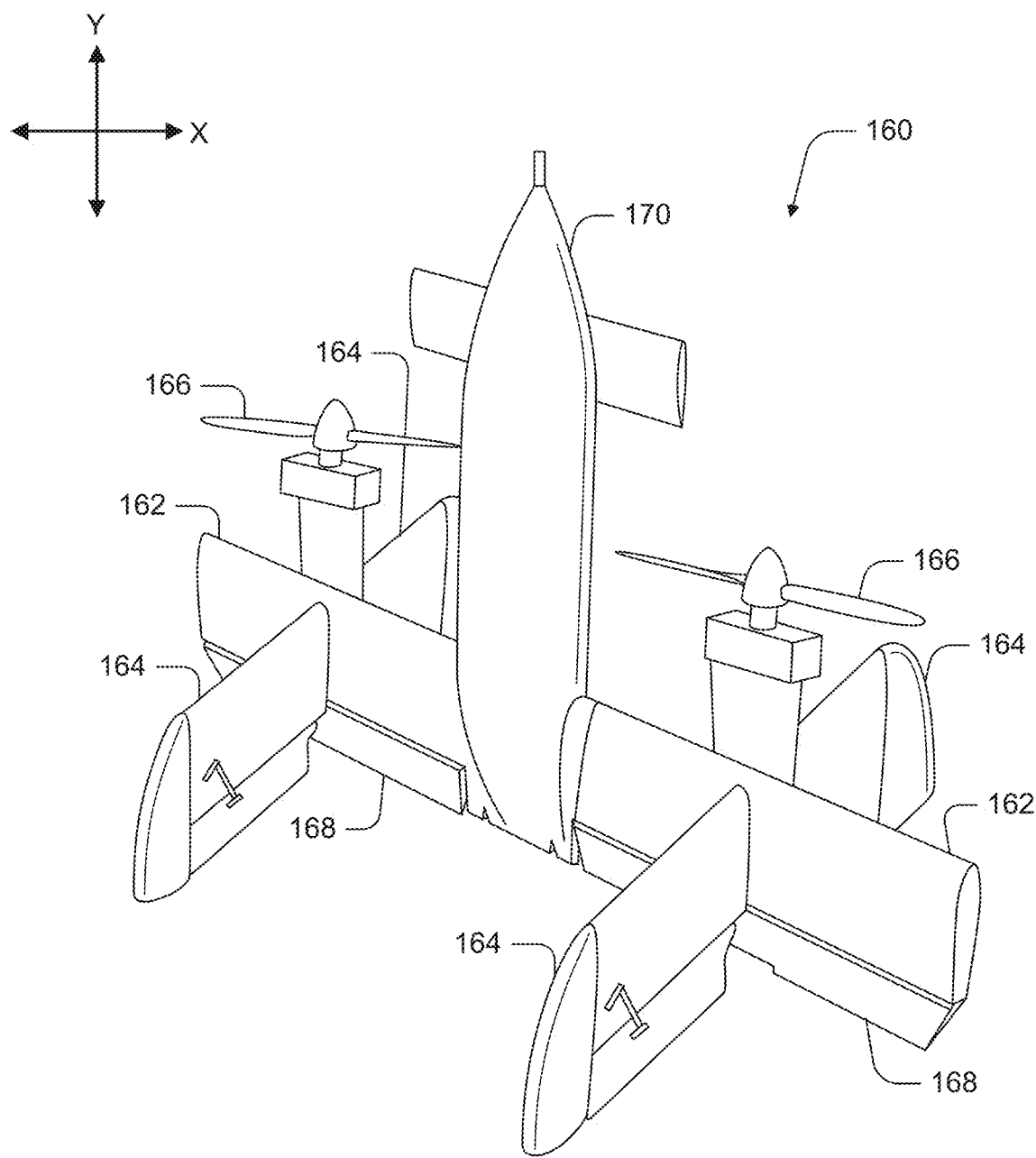
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
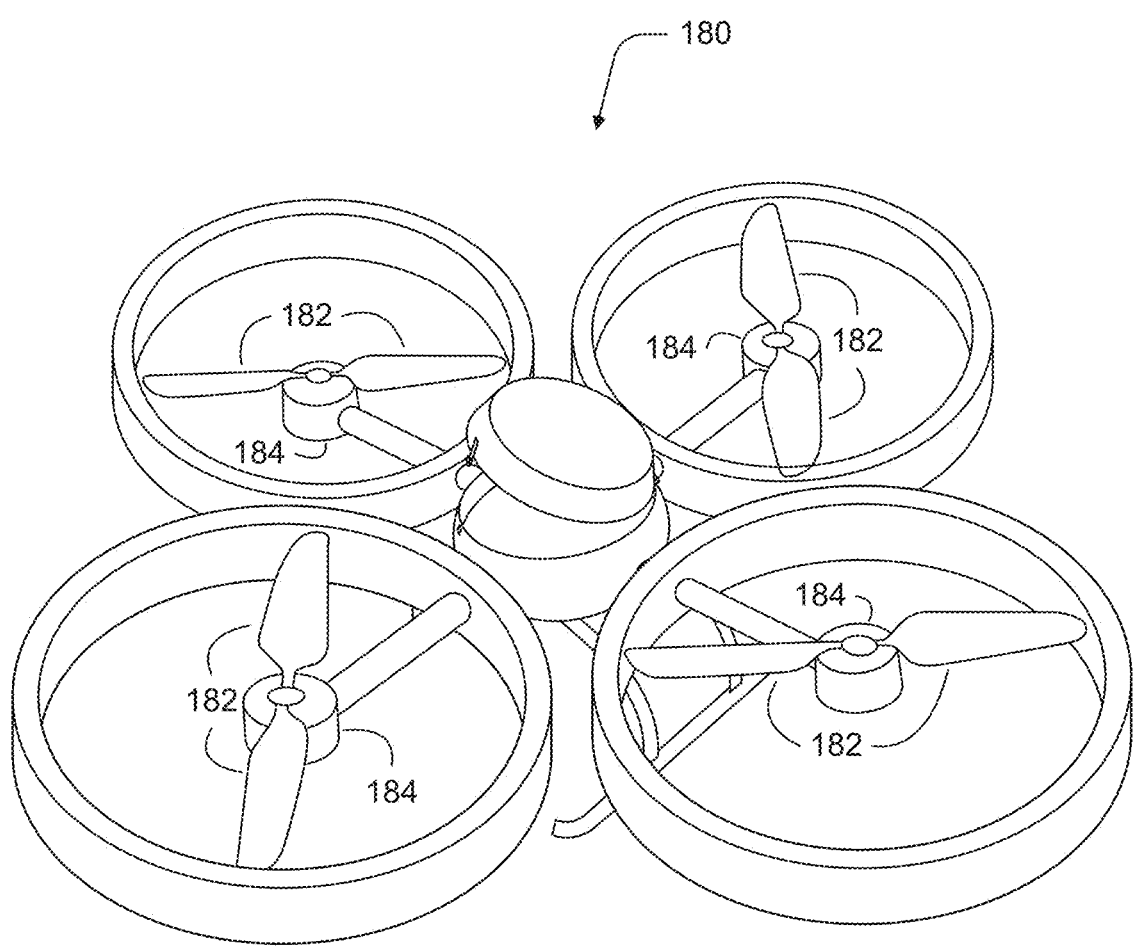
FIG. 1E is a simplified illustration of an unmanned aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

Figure 2:
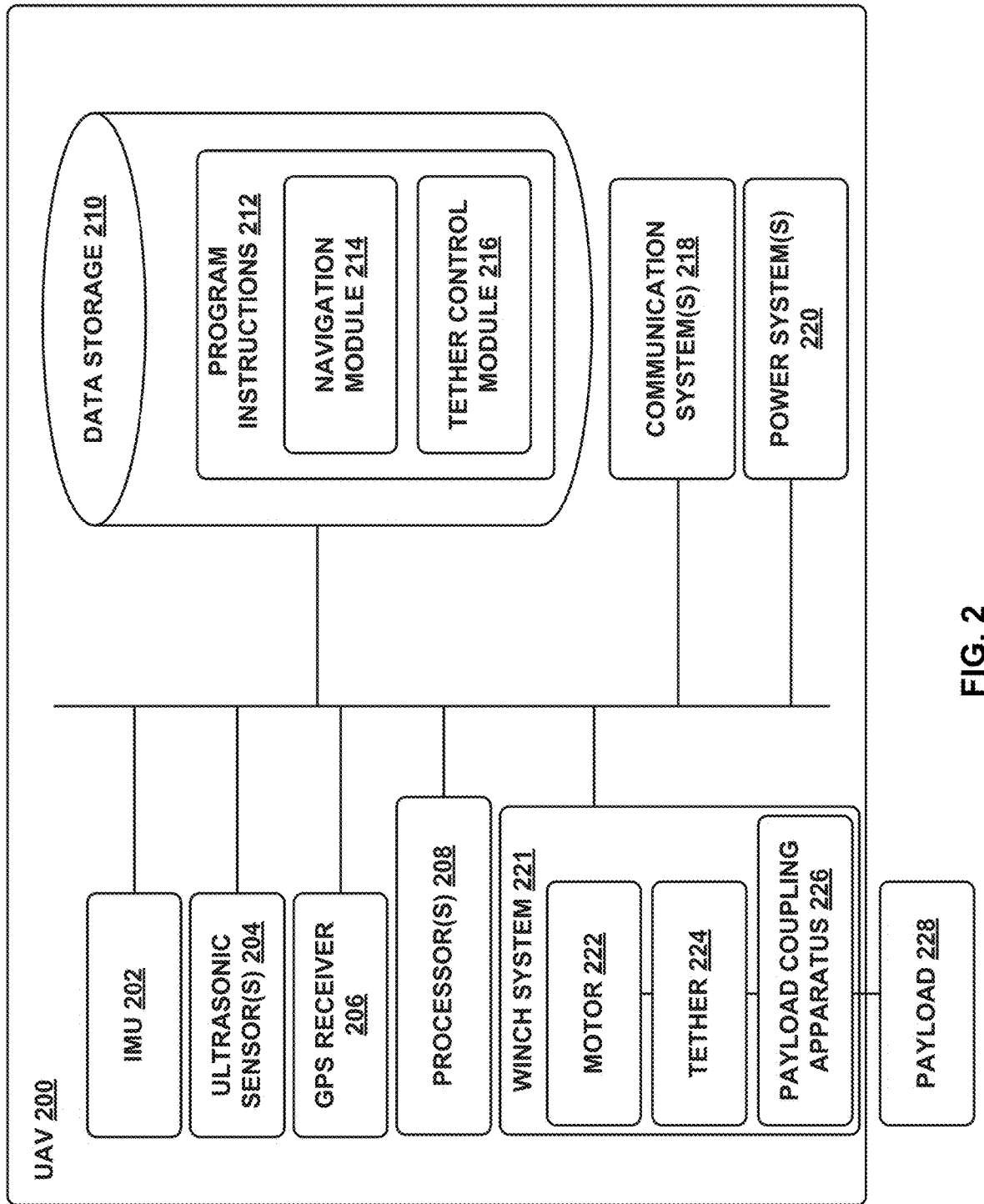
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LA-DAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may contain one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) caused by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operating rate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

Figure 3:
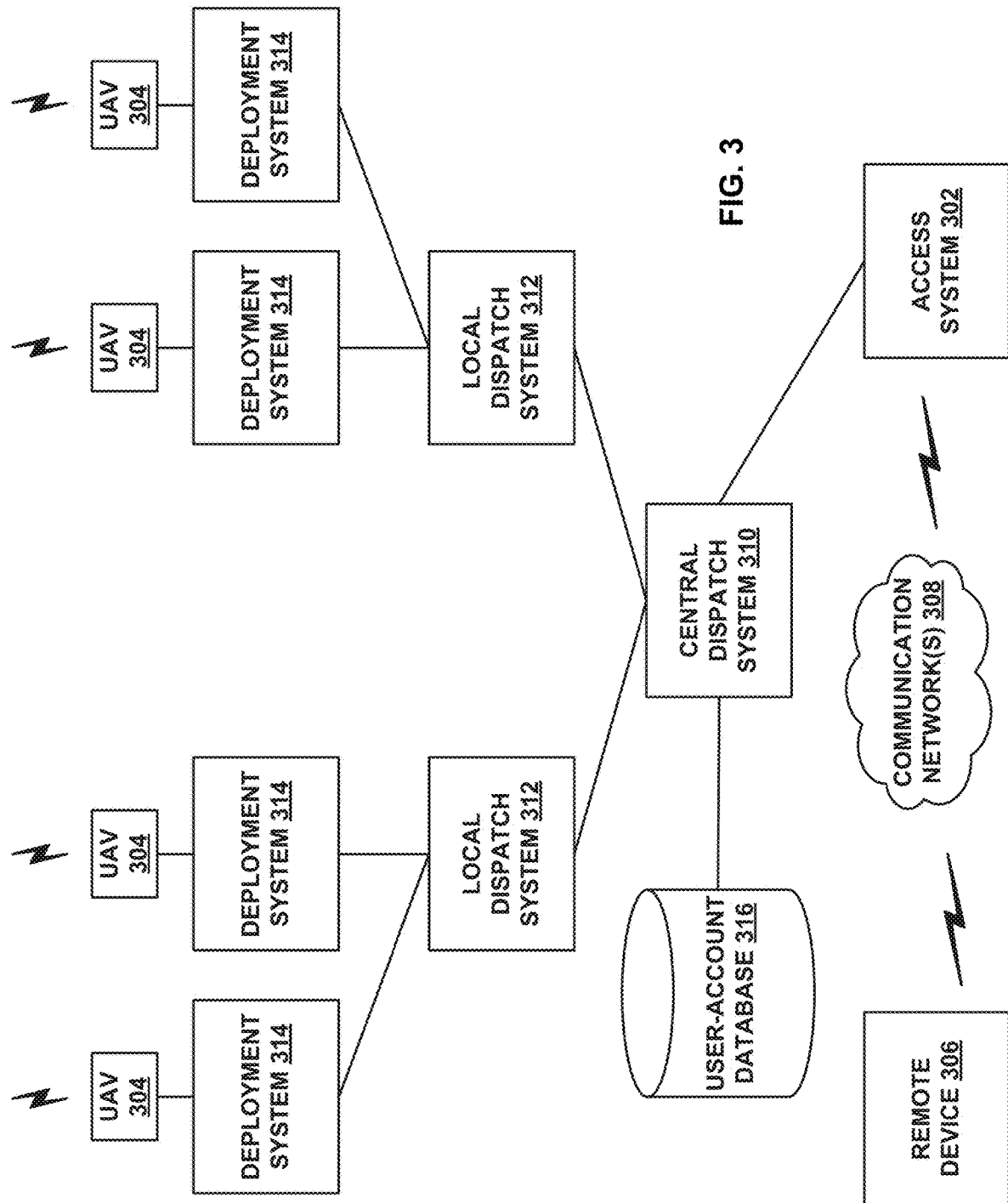
FIG. 3 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

FIGS. 4A, 4B, and 4C show a UAV 400 that includes a payload delivery system 410 (which could also be referred to as a payload delivery apparatus), according to an example embodiment. As shown, payload delivery system 410 for UAV 400 includes a tether 402 coupled to a spool 404, a payload latch 406, and a payload 408 coupled to the tether 402 via a payload coupling apparatus 412. The payload latch 406 can function to alternately secure payload 408 and release the payload 408 upon delivery. For instance, as shown, the payload latch 406 may take the form of one or more pins that can engage the payload coupling apparatus 412 (e.g., by sliding into one or more receiving slots in the payload coupling apparatus 412). Inserting the pins of the payload latch 406 into the payload coupling apparatus 412 may secure the payload coupling apparatus 412 within a receptacle 414 on the underside of the UAV 400, thereby preventing the payload 408 from being lowered from the UAV 400. In some embodiments, the payload latch 406 may be arranged to engage the spool 404 or the payload 408 rather than the payload coupling apparatus 412 in order to prevent the payload 408 from lowering. In other embodiments, the UAV 400 may not include the payload latch 406, and the payload delivery apparatus may be coupled directly to the UAV 400.

In some embodiments, the spool 404 can function to unwind the tether 402 such that the payload 408 can be lowered to the ground with the tether 402 and the payload coupling apparatus 412 from UAV 400. The payload 408 may itself be an item for delivery, and may be housed within (or otherwise incorporate) a parcel, container, or other structure that is configured to interface with the payload latch 406. In practice, the payload delivery system 410 of UAV 400 may function to autonomously lower payload 408 to the ground in a controlled manner to facilitate delivery of the payload 408 on the ground while the UAV 400 hovers above.

As shown in FIG. 4A, the payload latch 406 may be in a closed position (e.g., pins engaging the payload coupling apparatus 412) to hold the payload 408 against or close to the bottom of the UAV 400, or even partially or completely inside the UAV 400, during flight from a launch site to a target location 420. The target location 420 may be a point in space directly above a desired delivery location. Then, when the UAV 400 reaches the target location 420, the UAV's control system (e.g., the tether control module 216 of FIG. 2) may toggle the payload latch 406 to an open position (e.g., disengaging the pins from the payload coupling apparatus 412), thereby allowing the payload 408 to be lowered from the UAV 400. The control system may further operate the spool 404 (e.g., by controlling the motor 222 of FIG. 2) such that the payload 408, secured to the tether 402 by a payload coupling apparatus 412, is lowered to the ground, as shown in FIG. 4B.

Once the payload 408 reaches the ground, the control system may continue operating the spool 404 to lower the tether 402, causing over-run of the tether 402. During over-run of the tether 402, the payload coupling apparatus 412 may continue to lower as the payload 408 remains stationary on the ground. The downward momentum and/or gravitational forces on the payload coupling apparatus 412 may cause the payload 408 to detach from the payload coupling apparatus 412 (e.g., by sliding off a hook of the payload coupling apparatus 412). After releasing payload 408, the control system may operate the spool 404 to retract the tether 402 and the payload coupling apparatus 412 toward the UAV 400. Once the payload coupling apparatus reaches or nears the UAV 400, the control system may operate the spool 404 to pull the payload coupling apparatus 412 into the receptacle 414, and the control system may toggle the payload latch 406 to the closed position, as shown in FIG. 4C.

In some embodiments, when lowering the payload 408 from the UAV 400, the control system may detect when the payload 408 and/or the payload coupling apparatus 412 has been lowered to be at or near the ground based on an unwound length of the tether 402 from the spool 404. Similar techniques may be used to determine when the payload coupling apparatus 412 is at or near the UAV 400 when retracting the tether 402. As noted above, the UAV 400 may include an encoder for providing data indicative of the rotation of the spool 404. Based on data from the encoder, the control system may determine how many rotations the spool 404 has undergone and, based on the number of rotations, determine a length of the tether 402 that is unwound from the spool 404. For instance, the control system may determine an unwound length of the tether 402 by multiplying the number of rotations of the spool 404 by the circumference of the tether 402 wrapped around the spool 404. In some embodiments, such as when the spool 404 is narrow or when the tether 402 has a large diameter, the circumference of the tether 402 on the spool 404 may vary as the tether 402 winds or unwinds from the tether, and so the control system may be configured to account for these variations when determining the unwound tether length.

In other embodiments, the control system may use various types of data, and various techniques, to determine when the payload 408 and/or payload coupling apparatus 412 have lowered to be at or near the ground. Further, the data that is used to determine when the payload 408 is at or near the ground may be provided by sensors on UAV 400, sensors on the payload coupling apparatus 412, and/or other data sources that provide data to the control system.

In some embodiments, the control system itself may be situated on the payload coupling apparatus 412 and/or on the UAV 400. For example, the payload coupling apparatus 412 may include logic module(s) implemented via hardware, software, and/or firmware that cause the UAV 400 to function as described herein, and the UAV 400 may include logic module(s) that communicate with the payload coupling apparatus 412 to cause the UAV 400 to perform functions described herein.

Figure 5A:
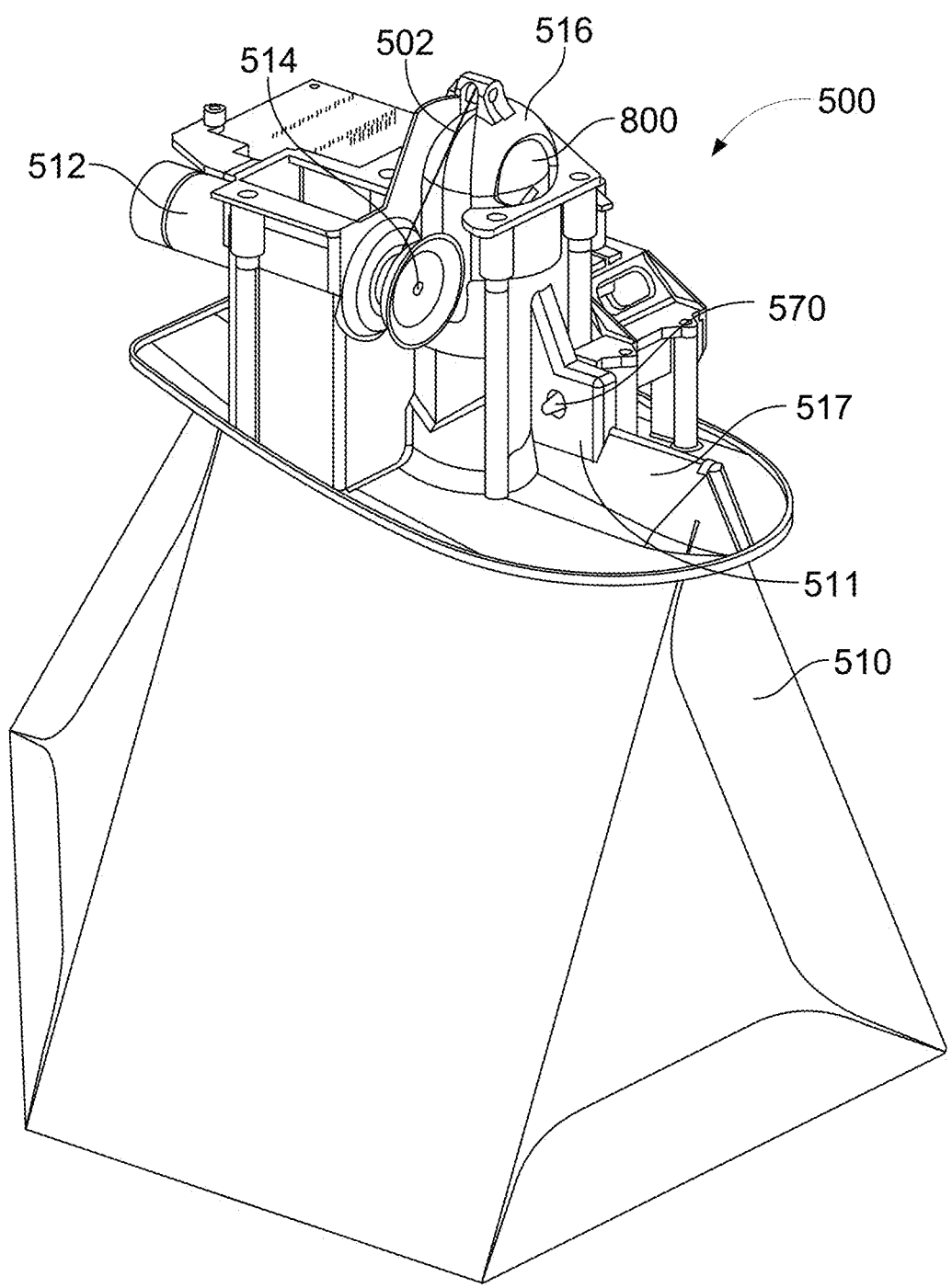
FIG. 5A is a perspective view of a payload delivery apparatus 500 including payload 510, according to an example embodiment.

FIG. 5A shows a perspective view of a payload delivery apparatus 500 including payload 510, according to an example embodiment. The payload delivery apparatus 500 is positioned within a fuselage of a UAV (not shown) and includes a winch 514 powered by motor 512, and a tether 502 spooled onto winch 514. The tether 502 is attached to a payload coupling apparatus or payload retriever 800 positioned within a payload coupling apparatus receptacle 516 positioned within the fuselage of the UAV (not shown). A payload 510 is secured to the payload coupling apparatus 800. In this embodiment a top portion 517 of payload 510 is secured within the fuselage of the UAV. A locking pin 570 is shown extending through handle 511 attached to payload 510 to positively secure the payload beneath the UAV during high speed flight.

Figure 5B:
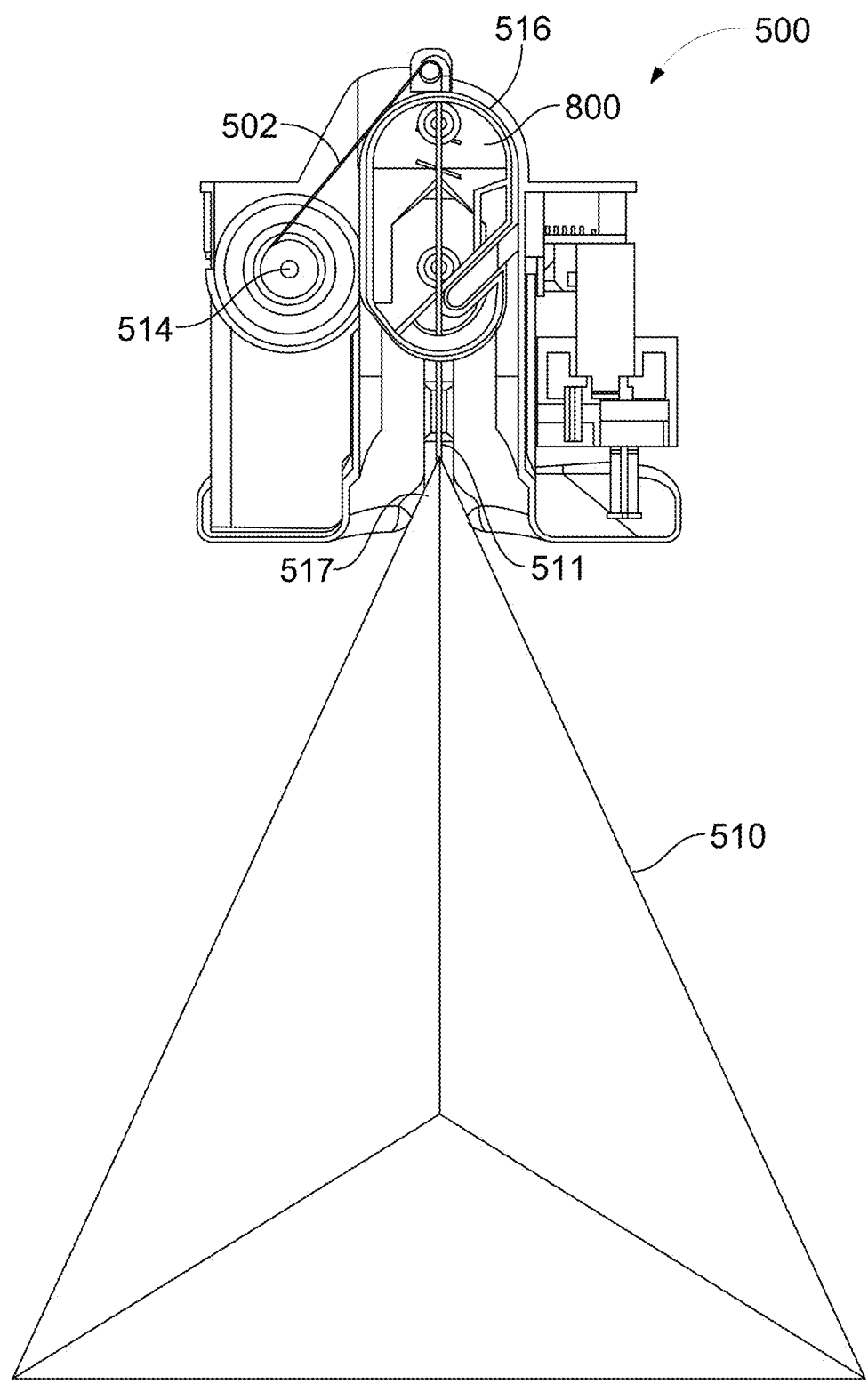
FIG. 5B is a cross-sectional side view of payload delivery apparatus 500 and payload 510 shown in FIG. 5A.

FIG. 5B is a cross-sectional side view of payload delivery apparatus 500 and payload 510 shown in FIG. 5A. In this view, the payload coupling apparatus is shown tightly positioned with the payload coupling apparatus receptacle 516. Tether 502 extends from winch 514 and is attached to the top of payload coupling apparatus 800. Top portion 517 of payload 510 is shown positioned within the fuselage of the UAV (not shown) along with handle 511.

Figure 5C:
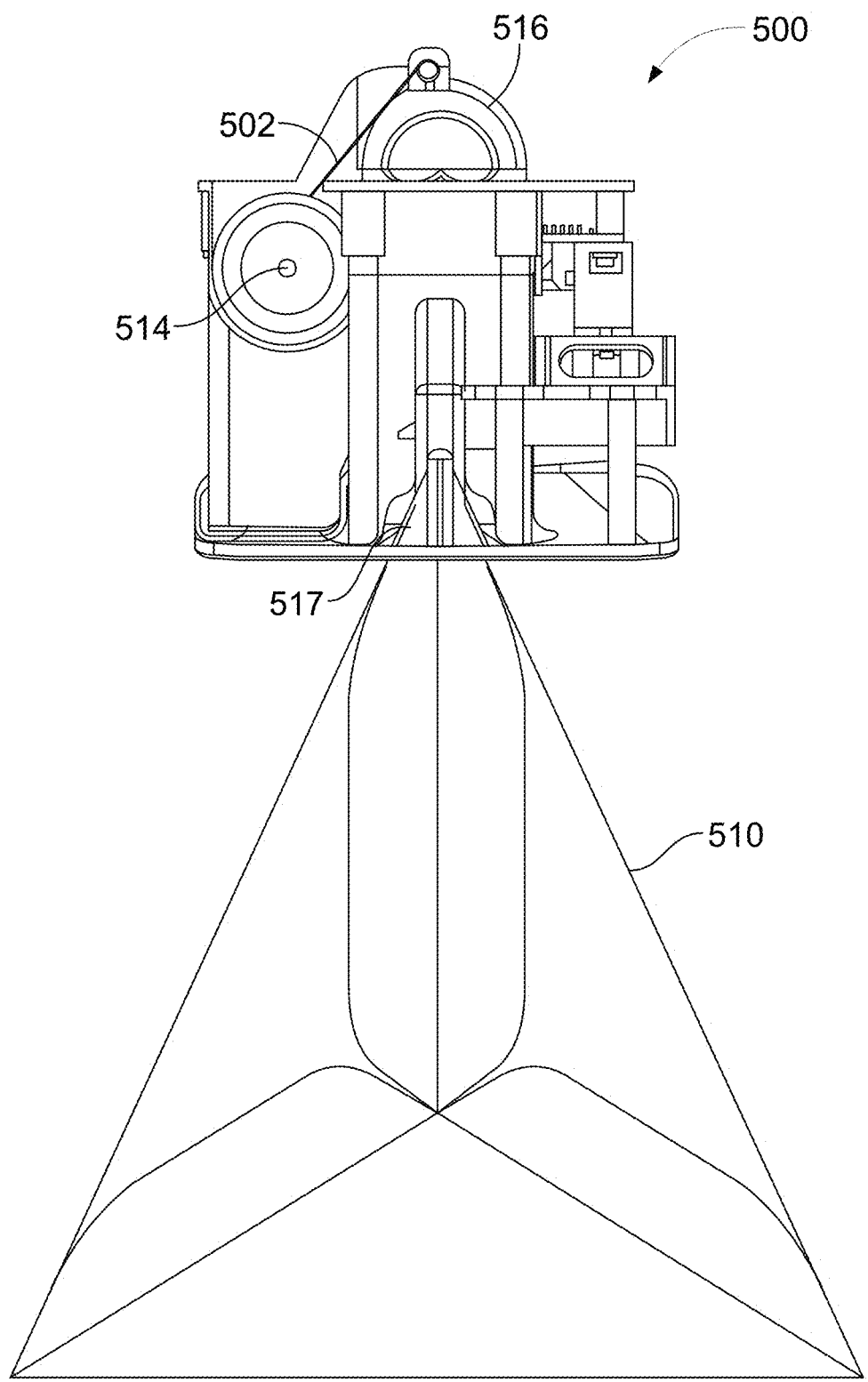
FIG. 5C is a side view of payload delivery apparatus 500 and payload 510 shown in FIGS. 5A and 5B.

FIG. 5C is a side view of payload delivery apparatus 500 and payload 510 shown in FIGS. 5A and 5B. The top portion 517 of payload 510 is shown positioned within the fuselage of the UAV. Winch 514 has been used to wind in tether 502 to position the payload coupling apparatus within payload coupling apparatus receptacle 516. FIGS. 5A-C disclose payload 510 taking the shape of an aerodynamic hexagonally-shaped tote, where the base and side walls are six-sided hexagons and the tote includes generally pointed front and rear surfaces formed at the intersections of the side walls and base of the tote providing an aerodynamic shape.

FIG. 6A is a perspective view of payload coupling apparatus 800, according to an example embodiment. Payload coupling apparatus 800 includes tether mounting point 802, and a slot 808 to position a handle of a payload handle in. Lower lip, or hook, 806 is positioned beneath slot 808. Also included is an outer protrusion 804 having helical cam surfaces 804a and 804b that are adapted to mate with corresponding cam mating surfaces within a payload coupling apparatus receptacle positioned with a fuselage of a UAV.

FIG. 6B is a side view of payload coupling apparatus 800 shown in FIG. 6A. Slot 808 is shown positioned above lower lip, or hook, 806. As shown lower lip or hook 806 has an outer surface 806a that is undercut such that it does not extend as far outwardly as an outer surface above slot 805 so that the lower lip or hook 806 will not reengage with the handle of the payload after it has been decoupled, or will not get engaged with power lines or tree branches during retrieval to the UAV.

FIG. 6C is a front view of payload coupling apparatus 800 shown in FIGS. 6A and 6B. Lower lip or hook 806 is shown positioned beneath slot 808 that is adapted for securing a handle of a payload.

Figure 7:
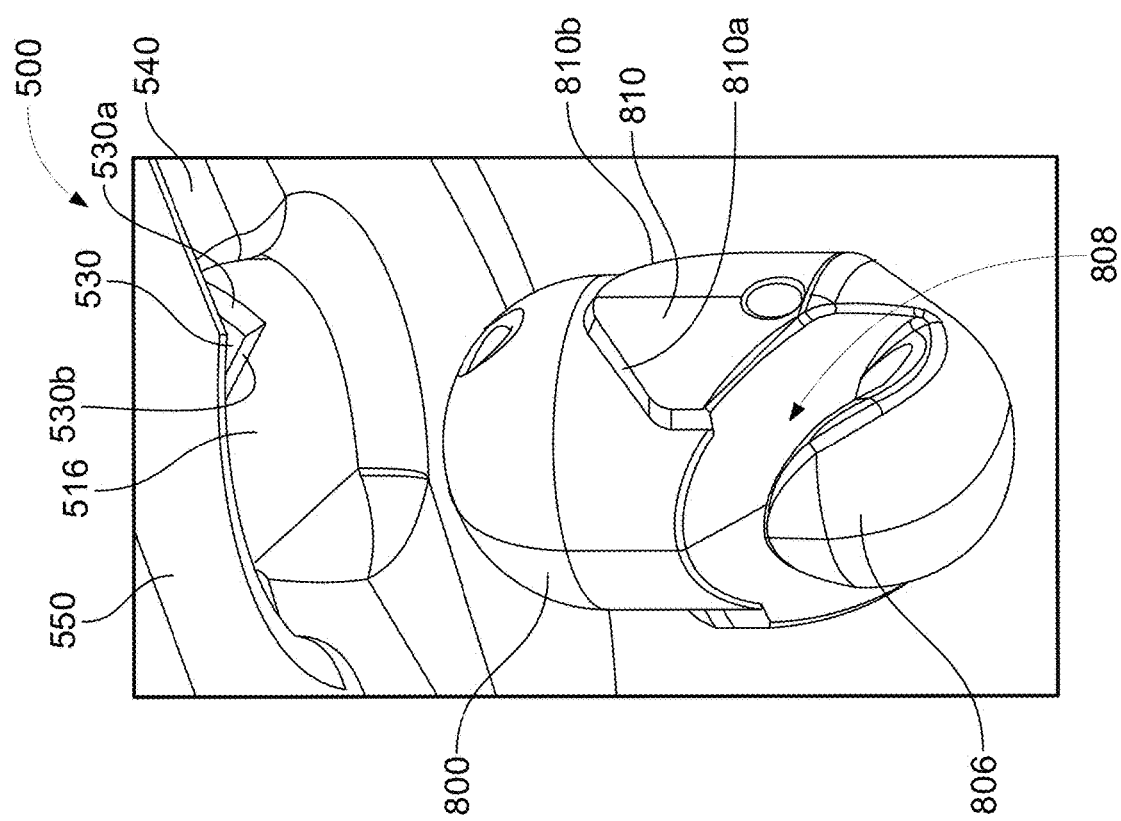
FIG. 7 is a perspective view of payload coupling apparatus 800 shown in FIGS. 6A-6C, prior to insertion into a payload coupling apparatus receptacle positioned in the fuselage of a UAV.

FIG. 7 is a perspective view of payload coupling apparatus 800 shown in FIGS. 6A-6C, prior to insertion into a payload coupling apparatus receptacle 516 positioned in the fuselage 550 of a UAV. As noted previously payload coupling apparatus 800 includes a slot 808 positioned above lower lip or hook 806, adapted to receive a handle of a payload. The fuselage 550 of the payload delivery system 500 includes a payload coupling apparatus receptacle 516 positioned within the fuselage 550 of the UAV. The payload coupling apparatus 800 includes an outer protrusion 810 have helical cammed surfaces 810a and 810b that meet in a rounded apex. The helical cammed surfaces 810a and 810b are adapted to mate with surfaces 530a and 530b of an inward protrusion 530 positioned within the payload coupling apparatus receptacle 516 positioned within fuselage 550 of the UAV. Also included is a longitudinal recessed restraint slot 540 positioned within the fuselage 550 of the UAV that is adapted to receive and restrain a top portion of a payload (not shown). As the payload coupling apparatus 800 is pulled into to the payload coupling apparatus receptacle 516, the cammed surfaces 810a and 810b of outer protrusion 810 engage with the cammed surfaces 530a and 530b within the payload coupling apparatus receptacle 516 and the payload coupling apparatus 800 is rotated into a desired alignment within the fuselage 550 of the UAV.

Figure 8:
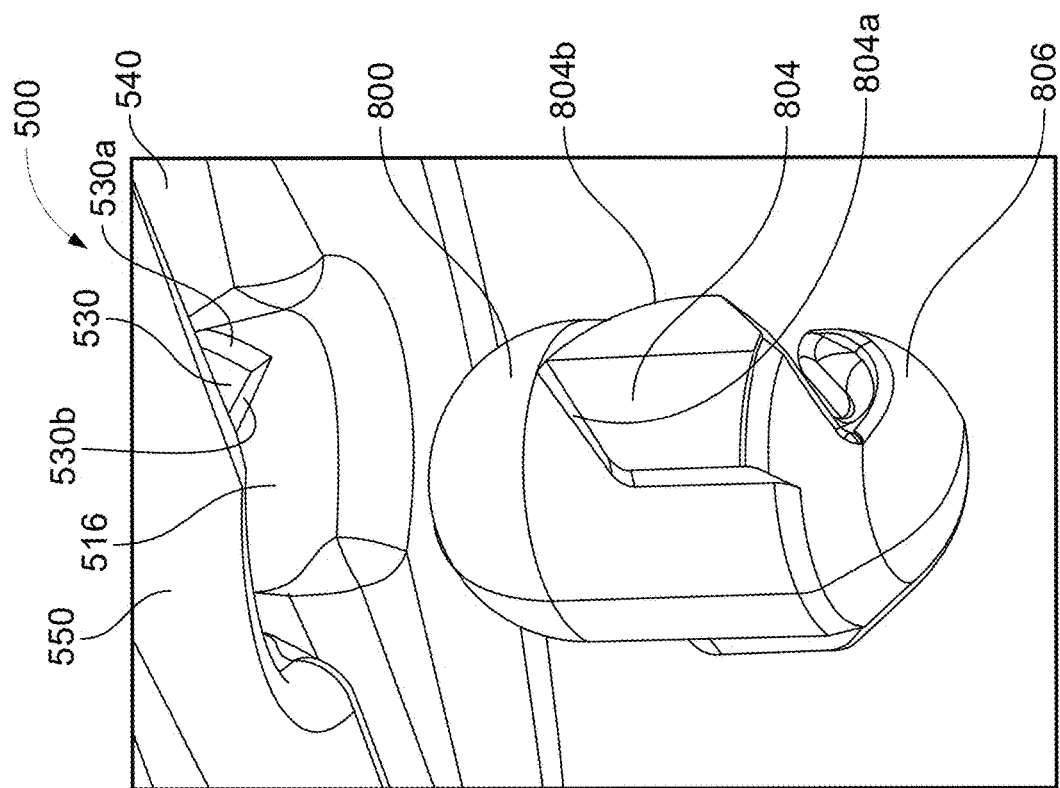
FIG. 8 is another perspective view of payload coupling apparatus 800 shown in FIGS. 6A-6C, prior to insertion into a payload coupling apparatus receptacle positioned in the fuselage of a UAV.

FIG. 8 is another perspective view of an opposite side of payload coupling apparatus 800 shown in FIGS. 6A-6C, prior to insertion into a payload coupling apparatus receptacle 516 positioned in the fuselage 550 of a UAV. As shown, payload coupling apparatus 800 include a lower lip or hook 806. An outer protrusion 804 is shown extending outwardly from the payload coupling apparatus having helical cammed surfaces 804a and 804b adapted to engage and mate with cammed surfaces 530a and 530b of inner protrusion 530 positioned within payload coupling apparatus receptacle 516 positioned within fuselage 550 of payload delivery system 500. It should be noted that the cammed surfaces 804a and 804b meet at a sharp apex, which is asymmetrical with the rounded or blunt apex of cammed surfaces 810a and 810b shown in FIG. 7. In this manner, the rounded or blunt apex of cammed surfaces 810a and 810b prevent possible jamming of the payload coupling apparatus 800 as the cammed surfaces engage the cammed surfaces 530a and 530b positioned within the payload coupling apparatus receptacle 516 positioned within fuselage 550 of the UAV. In particular, cammed surfaces 804a and 804b are positioned slightly higher than the rounded or blunt apex of cammed surfaces 810a and 810b. As a result, the sharper tip of cammed surfaces 804a and 804b engages the cammed surfaces 530a and 530b within the payload coupling apparatus receptacle 516 positioned within the fuselage 550 of payload delivery system 500, thereby initiating rotation of the payload coupling apparatus 800 slightly before the rounded or blunt apex of cammed surfaces 810a and 810b engage the corresponding cammed surfaces within the payload coupling apparatus receptacle 516. In this manner, the case where both apexes (or tips) of the cammed surfaces on the payload coupling apparatus end up on the same side of the receiving cams within the payload coupling apparatus receptacle is prevented. This scenario results in a prevention of the jamming of the payload coupling apparatus within the receptacle.

Figure 9:
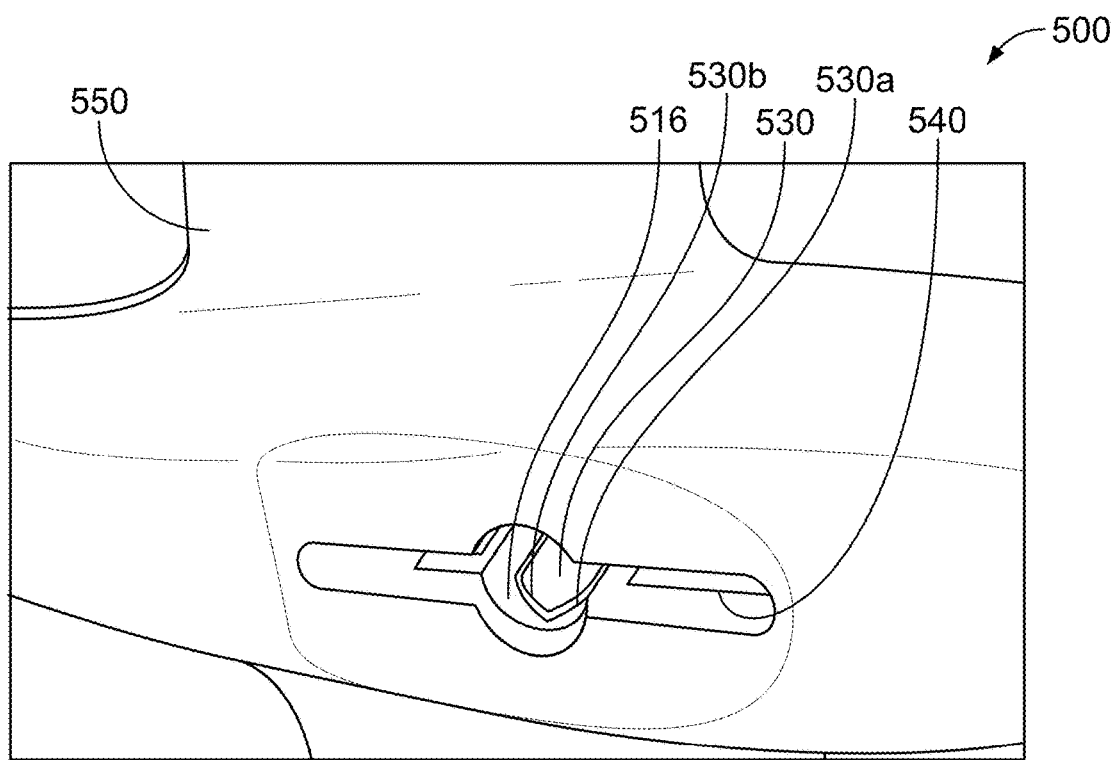
FIG. 9 shows a perspective view of a recessed restraint slot and payload coupling apparatus receptacle positioned in a fuselage of a UAV.

FIG. 9 shows a perspective view of a recessed restraint slot and payload coupling apparatus receptacle positioned in a fuselage of a UAV. In particular, payload delivery system 500 includes a fuselage 550 having a payload coupling apparatus receptacle 516 therein that includes inward protrusion 530 having cammed surfaces 530a and 530b that are adapted to mate with corresponding cammed surfaces on a payload coupling apparatus (not shown). Also included is a longitudinally extending recessed restrained slot 540 into which a top portion of a payload is adapted to be positioned and secured within the fuselage 550.

Figure 10A:
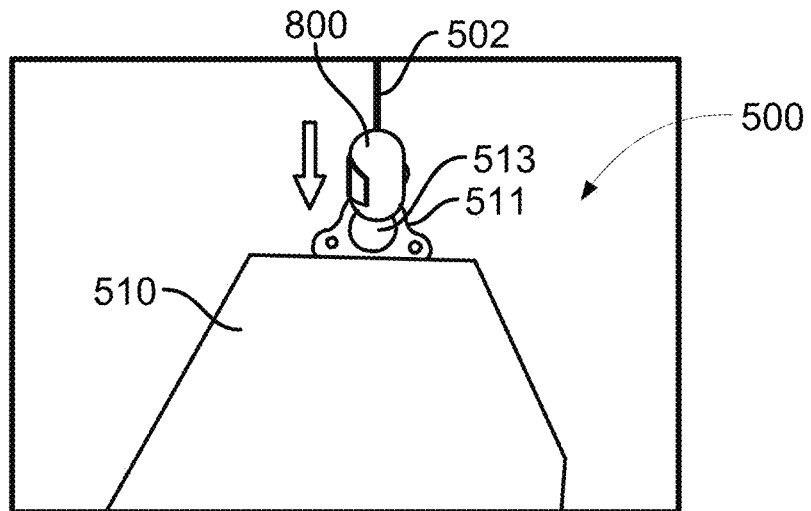
FIG. 10A shows a side view of a payload delivery apparatus 500 with a handle 511 of payload 510 secured within a payload coupling apparatus 800 as the payload 510 moves downwardly prior to touching down for delivery.

FIG. 10A shows a side view of a payload delivery apparatus 500 with a handle 511 of payload 510 secured within a payload coupling apparatus 800 as the payload 510 moves downwardly prior to touching down for delivery. Prior to payload touchdown, the handle 511 of payload 510 includes a hole 513 through which a lower lip or hook of payload coupling apparatus 800 extends. The handle sits within a slot of the payload coupling apparatus 800 that is suspended from tether 502 of payload delivery system 500 during descent of the payload 510 to a landing site.

Figure 10B:
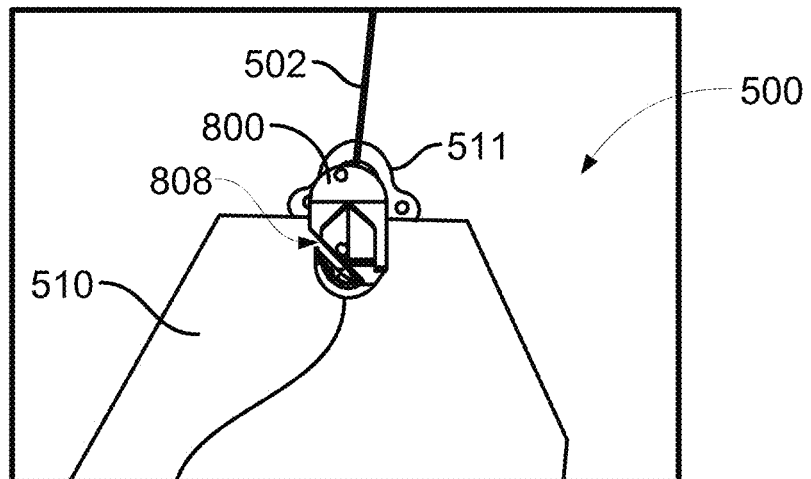
FIG. 10B shows a side view of payload delivery apparatus 500 after payload 510 has landed on the ground showing payload coupling apparatus 800 decoupled from handle 511 of payload 510.

FIG. 10B shows a side view of payload delivery apparatus 500 after payload 510 has landed on the ground showing payload coupling apparatus 800 decoupled from handle 511 of payload 510. Once the payload 510 touches the ground, the payload coupling apparatus 800 continues to move downwardly (as the winch further unwinds) through inertia or gravity and decouples the lower lip or hook 808 of the payload coupling apparatus 800 from handle 511 of payload 510. The payload coupling apparatus 800 remains suspended from tether 502, and can be winched back up to the payload coupling receptacle of the UAV.

Figure 10C:
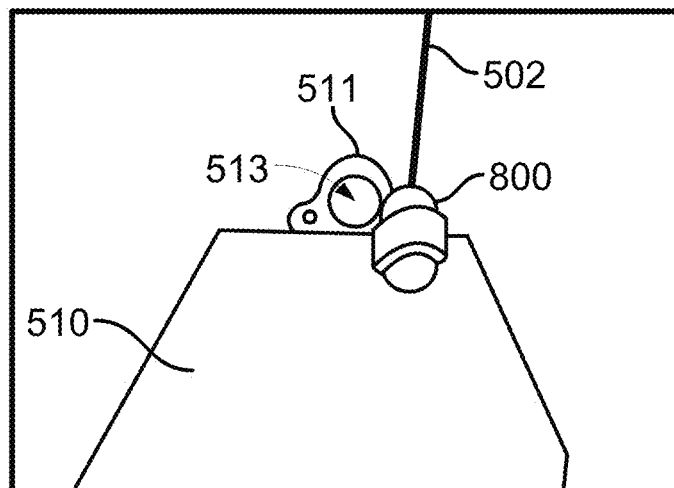
FIG. 10C shows a side view of payload delivery apparatus 500 with payload coupling apparatus 800 moving away from handle 511 of payload 510.

FIG. 10C shows a side view of payload delivery apparatus 500 with payload coupling apparatus 800 moving away from handle 511 of payload 510. Here the payload coupling apparatus 800 is completely separated from the hole 513 of handle 511 of payload 510. Tether 502 may be used to winch the payload coupling apparatus back to the payload coupling apparatus receptacle positioned in the fuselage of the UAV.

Figure 11A:
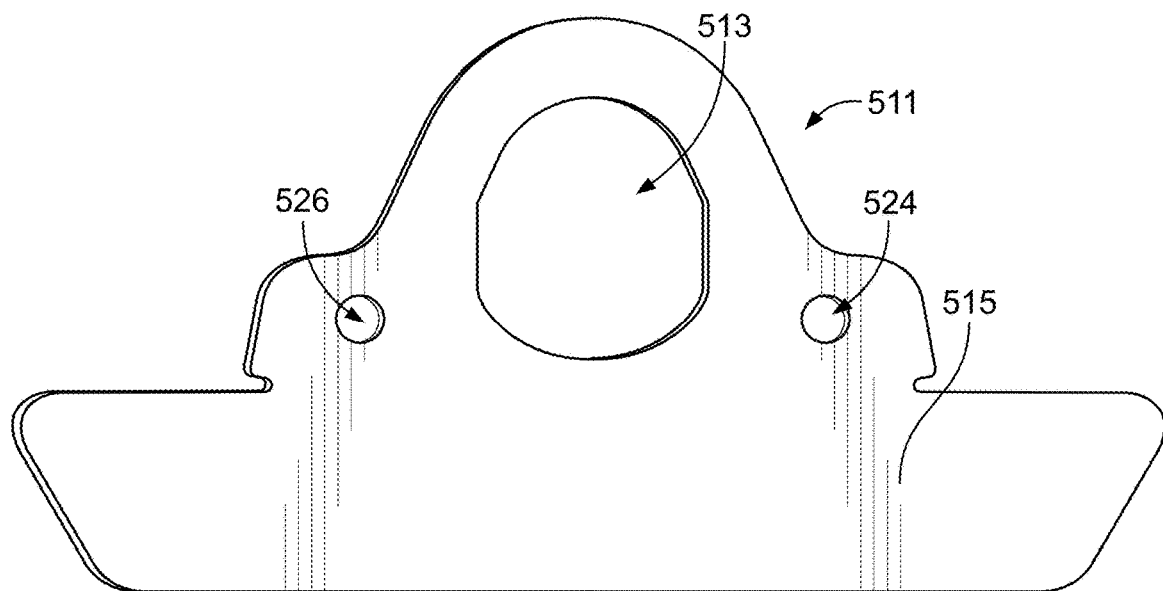
FIG. 11A is a side view of handle 511 of payload 510 having openings 514 and 516 adapted to receive pins positioned on a payload holder, according to an example embodiment.

FIG. 11A is a side view of handle 511 of payload 510. The handle 511 includes an aperture 513 through which the lower lip or hook of a payload coupling apparatus extends through to suspend the payload during delivery, or for retrieval. The handle 511 includes a lower portion 515 that is secured to the top portion of a payload. Also included are holes 524 and 526 through which locking pins positioned within the fuselage of a UAV, may extend to secure the handle and payload in a secure position during high speed forward flight to a delivery location. In addition, holes 524 and 526 are also designed for pins of a payload holder to extend therethrough to hold the payload in position for retrieval on a payload retrieval apparatus. The handle may be comprised of a thin, flexible plastic material that is flexible and provides sufficient strength to suspend the payload beneath a UAV during forward flight to a delivery site, and during delivery and/or retrieval of a payload. In practice, the handle may be bent to position the handle within a slot of a payload coupling apparatus. The handle 511 also has sufficient strength to withstand the torque during rotation of the payload coupling apparatus into the desired orientation within the payload coupling apparatus receptacle, and rotation of the top portion of the payload into position with the recessed restraint slot.

Figure 11B:
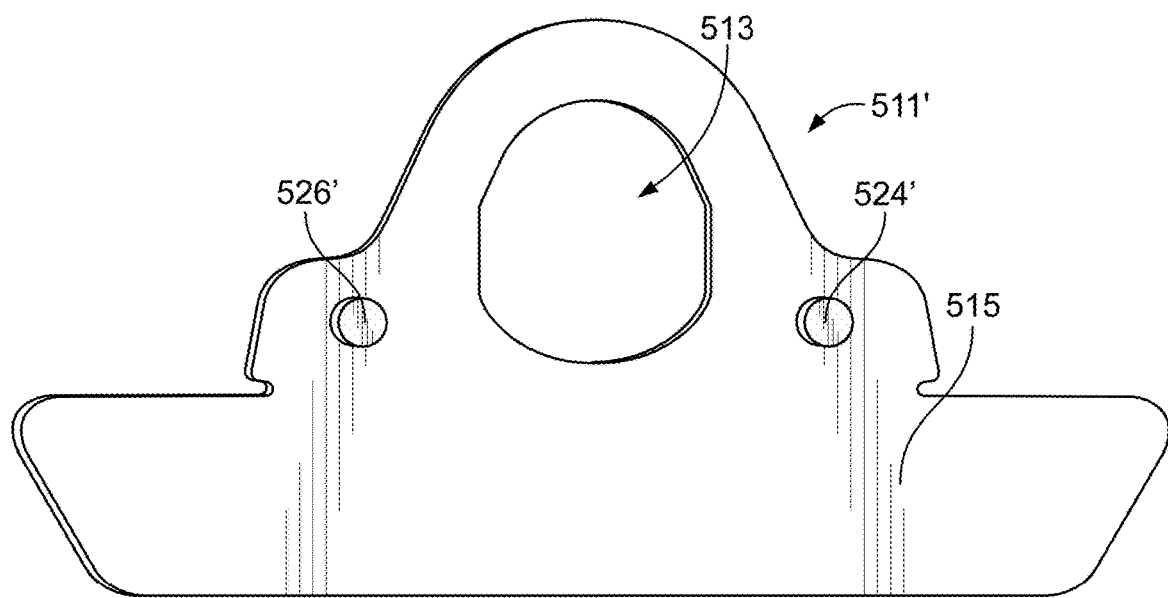
FIG. 11B is a side view of handle 511' of a payload having magnets 514' and 516' positioned thereon for magnetic engagement with a payload holder, according to an example embodiment.

FIG. 11B is a side view of handle 511' of payload 510. The handle 511' includes an aperture 513 through which the lower lip or hook of a payload coupling apparatus extends through to suspend the payload during delivery, or for retrieval. The handle 511' includes a lower portion 515 that is secured to the top portion of a payload. Also included are magnets 524' and 526' adapted for magnetic engagement with corresponding magnets (or a metal) of a payload holder to secure the payload to the payload holder in position for retrieval on a payload retrieval apparatus. In some examples, magnets 524' and 526' are provided on a handle (e.g., handle 511 or 511') in place of holes 524 and 526. In other examples, magnets 524' and 526' are provided in addition to holes 524 and 526.

Figure 12:
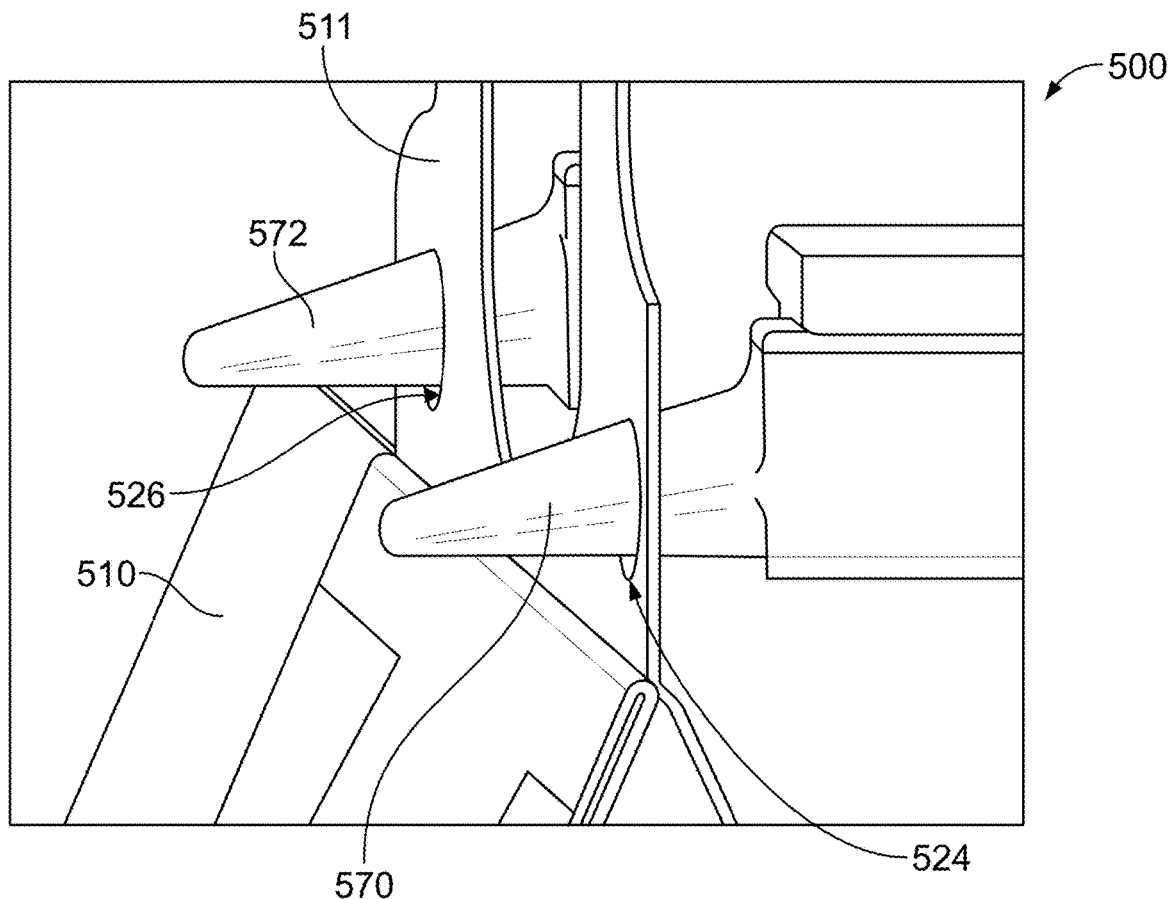
FIG. 12 shows a pair of locking pins 570, 572 extending through holes 514 and 516 in handle 511 of payload 510 to secure the handle 511 and top of payload 510 within the fuselage of a UAV, or to secure the handle 511 to a payload holder on a payload retrieval apparatus.

FIG. 12 shows a pair of pins 570, 572 extending through holes 524 and 526 in handle 511 of payload 510 to secure the handle 511 and top portion of payload 510 within the fuselage of a UAV, or to secure payload 510 to a payload holder of a payload retrieval apparatus. In this manner, the handle 511 and payload 510 may be secured within the fuselage of a UAV, or to a payload holder of a payload retrieval apparatus. In this embodiment, the pins 570 and 572 have a conical shape so that they pull the package up slightly or at least remove any downward slack present. In some embodiments the pins 570 and 572 may completely plug the holes 524 and 526 of the handle 511 of payload 510, to provide a secure attachment of the handle and top portion of the payload within the fuselage of the UAV, or to secure the payload to a payload retrieval apparatus. Although the pins are shown as conical, in other applications they may have other geometries, such as a cylindrical geometry.

Figure 13A:
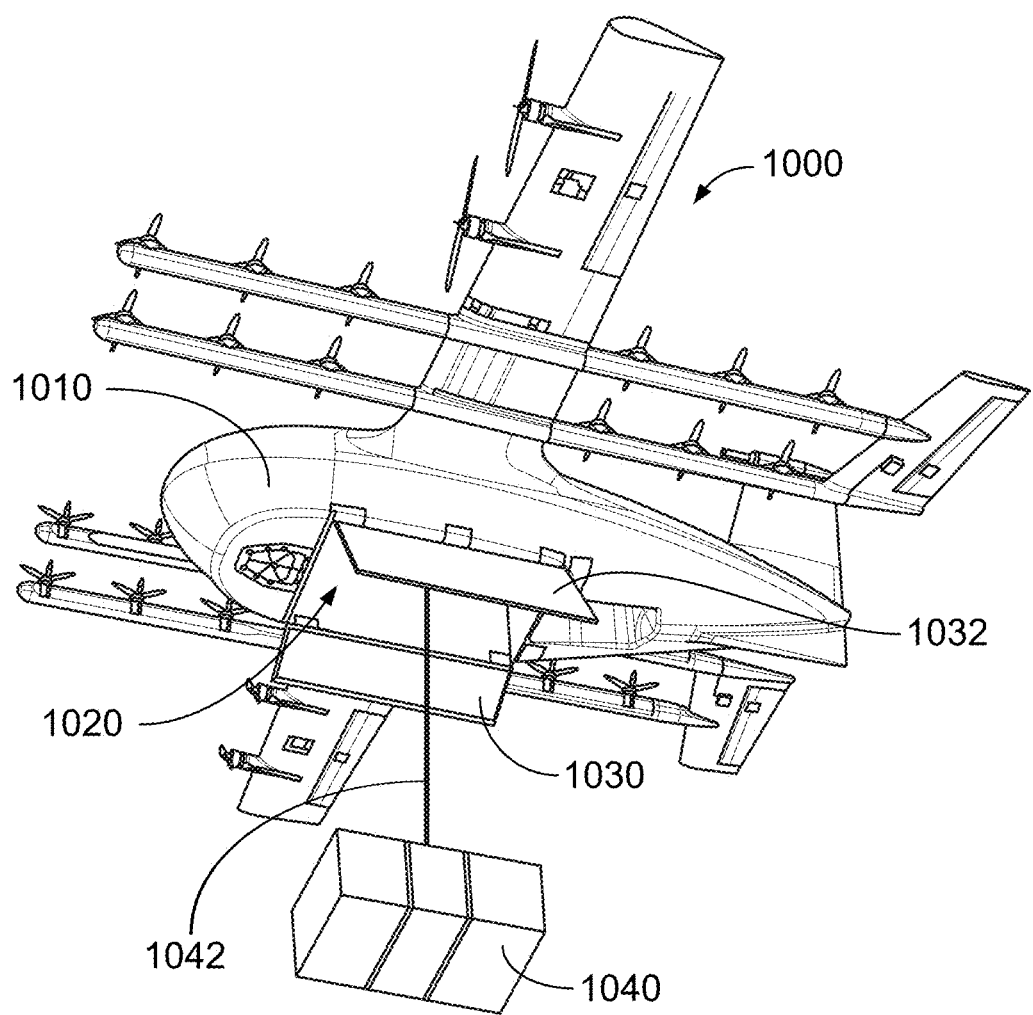
FIG. 13A is a perspective bottom view of UAV 1000 with a cargo bay 1020 for holding a payload 1040.

FIG. 13A is a bottom perspective view of UAV 1000 that includes a cargo bay 1020 formed by a cavity within a fuselage 1010 of UAV 1000. FIG. 13 shows cargo bay doors 1030 and 1032 in an open position with payload 1040 being lowered on a tether 1042 from cargo bay 1020. When transporting larger payloads, such as package 1040, the inclusion of a cargo bay 1020 in the UAV 1000 may help increase flight efficiency. For example, by containing the payload 1040 entirely inside the fuselage 1010 during flight, the cargo bay doors 1030 and 1032 may be closed. Accordingly, in such a configuration, drag associated with carrying a payload outside of the body of the UAV can be avoided, thereby reducing the aerodynamic load and increasing efficiency during flight.

FIG. 13A shows UAV 1000 during flight with payload 1040 being delivered. The payload 1040 is being lowered from the cargo bay 1020 on a tether 1042 through an access opening provided by cargo bay doors 1030 and 1032. A payload may also be loaded into the cargo bay 1020 by coupling the payload to tether 1042 and retracting the tether 1042 while UAV 1000 is in a hover flight mode. However, loading the payload into cargo bay 1020 while UAV 1000 is in flight consumes energy. Accordingly, there may be advantages in loading the payload into the cargo bay 1020 with the UAV 1000 in a landed position. On the other hand, in a typical landed position, the lower access opening to the cargo bay 1020, i.e., the access opening provided by the cargo bay doors 1030 and 1032 may typically be adjacent to the surface that is supporting the UAV. Therefore, embodiments of the disclosure provide a UAV that includes a second access opening for placing the payload into the cargo bay.

Figure 13B:
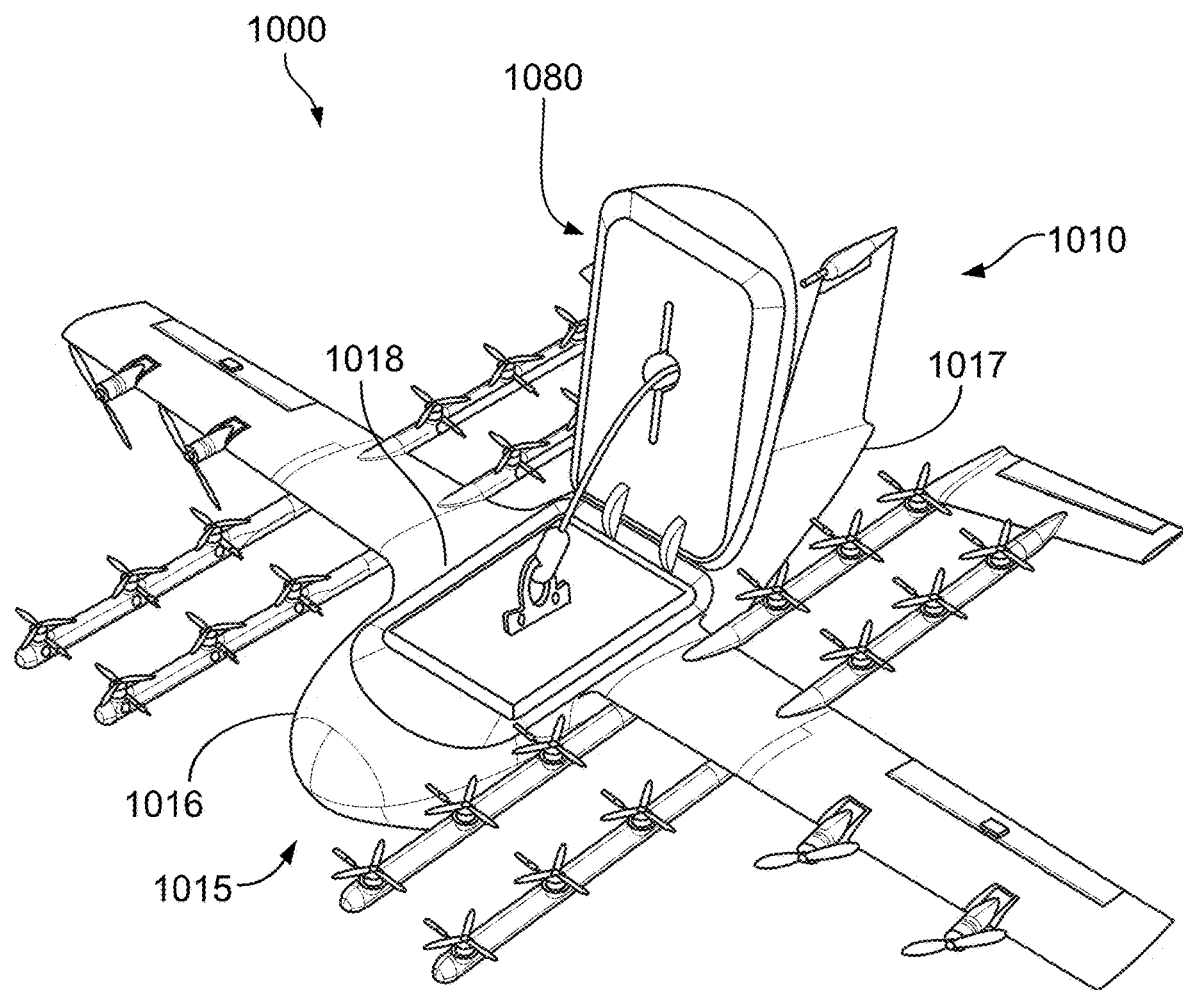
FIG. 13B is a perspective top view of UAV 1000 with an upper hatch door 1080 in an open position.

For example, as shown in FIG. 13B, UAV 1000 includes a fuselage 1010 that is formed by a fuselage body 1015 and a hatch door 1080 positioned on top of the fuselage body 1015. Fuselage body 1015 of UAV 1000 forms the nose 1016, the tail 1017, and the sides 1018 of the fuselage 1010. The hatch door 1080 forms the upper portion of fuselage 1010 and is associated with an upper access opening that provides access to a cavity within the fuselage body 1015.

Similar to UAV 1000, the cavity within the fuselage body 1015 forms a cargo bay 1020 that is also accessible through a lower access opening in the fuselage body 1015, which may be associated with a cargo bay door. Both the upper access opening and the lower access opening may be used to access the cavity that forms the cargo bay 1020, for example for inserting or removing a package or other payload from the cargo bay 1020.

Figure 14:
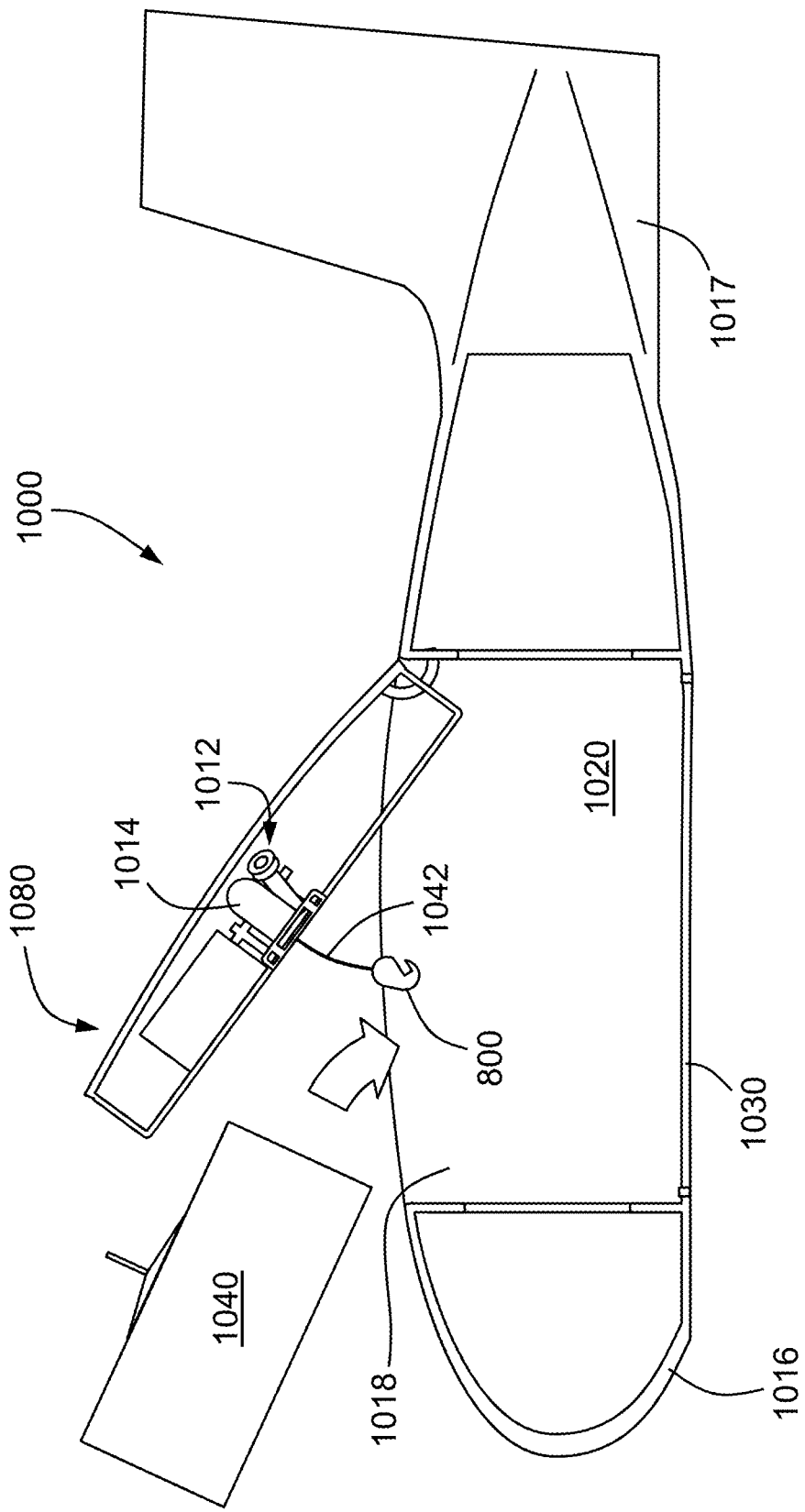
FIGS. 14-17 show a cross-sectional side view of the loading of UAV 1000 through the upper hatch door 1080.

FIGS. 14-17 illustrate an embodiment of a method of loading a payload in the form of package 1040 into the cargo bay 1020 of UAV 1000. FIGS. 14-17 are schematic cross sectional views that show the interior of the fuselage 1010 of UAV 1000. As illustrated in FIG. 14, the fuselage 1010 is formed by a fuselage body 1015, an upper hatch door 1080 and cargo bay doors 1030 (and 1032, shown in FIG. 13A). Further, as stated above, the fuselage body 1015 forms the nose 1016, tail 1017 and sides 1018 of the fuselage 1010.

Figure 15:
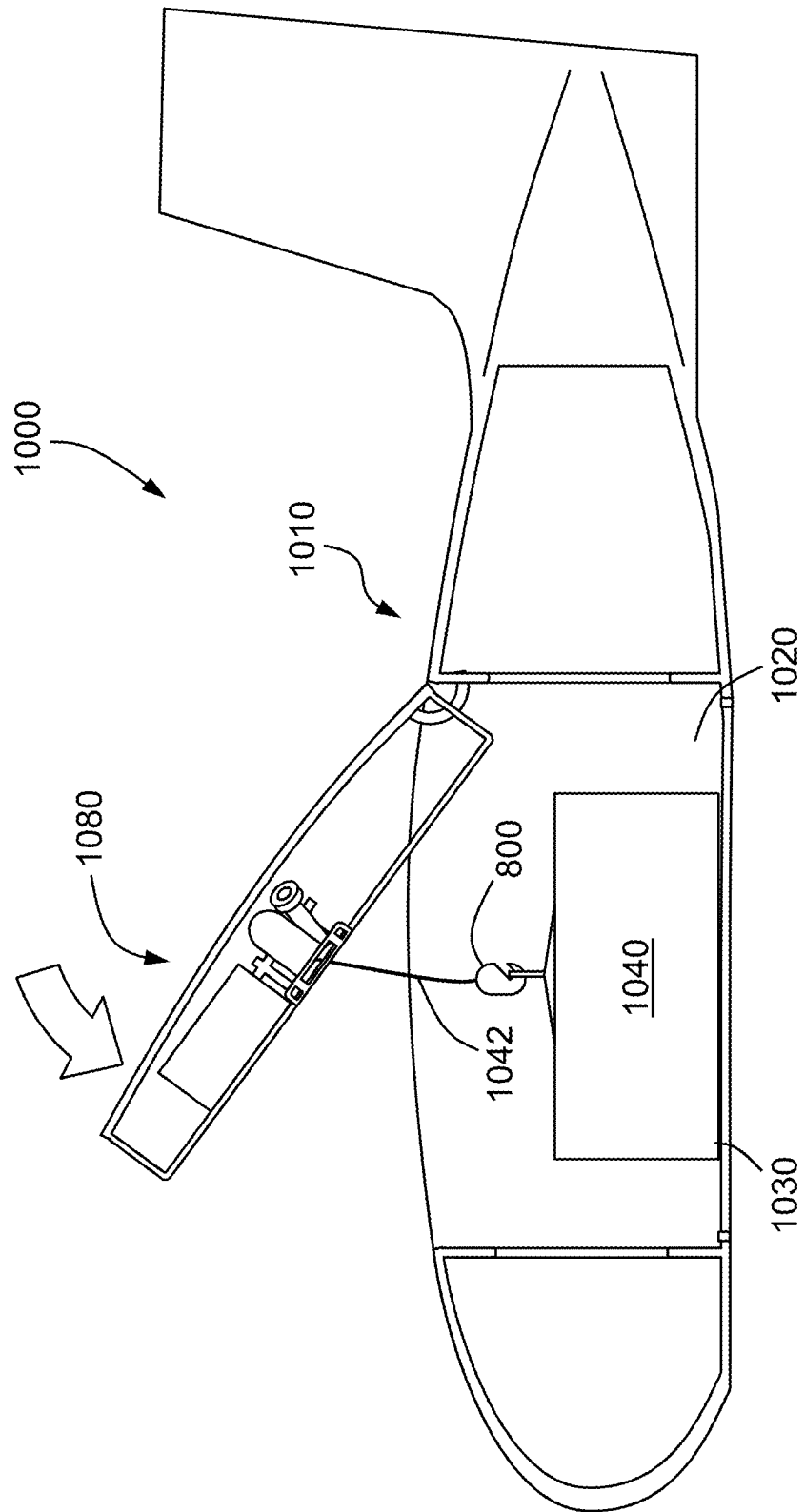
Figure 16:
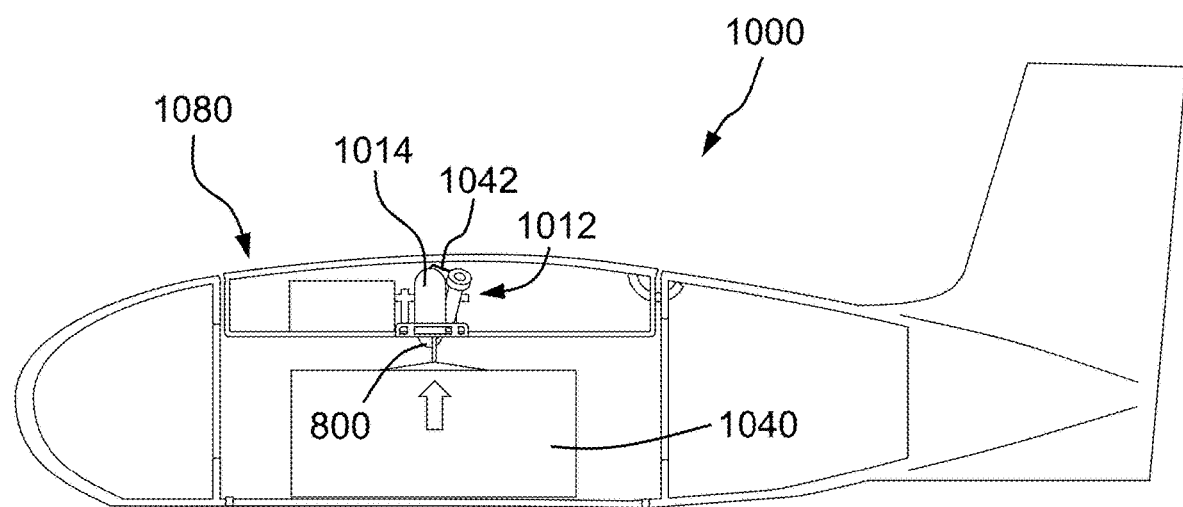

The upper hatch door 1080 is movable between an open position, as shown in FIG. 14, and a closed position, as shown in FIG. 16. With the upper hatch door 1080 in the open position, a path is provided through the upper access opening of fuselage body 1010, thereby allowing the package 1040 to be inserted into the cargo bay 1020, as shown in FIG. 14. Once the package 1040 is in place, the upper hatch door 1080 may then be moved to a closed position, as shown in FIGS. 15 and 16. With the upper hatch door 1080 in the closed positioned, the top of the fuselage 1010 may be enclosed, with the upper hatch door 1080 forming the upper portion of the fuselage 1010. Further, when the upper hatch door 1080 is enclosed, the upper access opening of the fuselage 1010 may be obstructed such that the package 1040 cannot be removed from the cargo bay 1020 through the upper access opening.

The upper hatch door 1080 includes a winch 1012 that may be used for securing a payload, such a package 1040, and for lowering the payload from the cargo bay 1020 using a tether 1042 in order to deliver the payload at a delivery site while the UAV is hovering. As described above, the winch may include a motor and a spool for winding and unwinding the tether 1042. Further, the tether may include a payload coupling apparatus 800, as described above, for securing the winch to the package 1040.

The inclusion of the winch 1012 within the hatch door 1080 may allow the winch to be positioned above the cargo bay 1020 without substantially obstructing the upper access opening of the fuselage body 1015 when the upper hatch door 1080 is open. Furthermore, the winch 1012 can be provided adjacent to a receptacle 1014 for the payload coupling apparatus 800. By positioning the winch 1012 next to the receptacle 1014, the distance between the winch 1012 and the receptacle 1014 is kept short, which avoids the need to have the tether extend around components or over significant distances within the fuselage 1010. This can help increase the efficiency of the winch motor when the tether is unwound and retracted. Further, keeping the distance between the winch 1012 and receptacle 1014 may also as reduce the likelihood of a tether snag occurring within the fuselage.

In some embodiments, the payload coupling apparatus receptacle 1014 may also be positioned within the door, as shown in UAV 1000. Such a configuration can keep the receptacle 1014 and winch 1012 close to one another when the winch is also positioned on the door 1080. On the other hand, in some embodiments, the payload coupling apparatus receptacle may be fixed with respect to the fuselage body while the door moves between open and closed positions, as explained in more detail below. In such an embodiment, the payload coupling apparatus receptacle may be secured to structural components secured to the fuselage body, to the main spar of the UAV, or another structure that is fixed with respect to the fuselage body.

As shown in FIG. 14, the package 1040 or other payload may be loaded into the cargo bay 1020 within the fuselage 1010 from above. For example, with the UAV 1000 located on a support surface, such as the ground or a landing platform, the upper hatch door 1080 may be lifted to an open position in order to provide a path through the upper access opening into the fuselage 1000. Accordingly, even if access to the cargo bay 1020 through the lower access opening associated with the cargo bay doors 1030, 1032 is inaccessible, the cargo bay 1020 may still be loaded with a payload 1040 through the upper access opening.

In the illustrated embodiment, as shown in FIG. 15, the package 1040 is positioned inside the cargo bay 1020 and initially supported by the cargo bay doors 1030, 1032. With the package 1040 in place within the cargo bay 1020, the payload coupling apparatus 800 may be secured to the package. For example, as explained above, the package 1040 may include a handle that can fit within a slot in the payload coupling apparatus 800 (FIGS. 6A-6C). In some embodiments, the payload coupling apparatus 800 may be secured to the package 1040 by the UAV control system, for example, by unwinding a portion of the tether and carrying out a sequence of steps to secure the payload coupling apparatus 800 to a handle of the package 1040. In other embodiments the user who loads the package 1040 into the cargo bay 1020 may manually secure the payload coupling apparatus 800 to the package 1040. Such a manual attachment of the payload coupling apparatus 800 to the package 1040 may also be carried out before the package 1040 is inserted into the cargo bay 1020. For example, the winch may be operated to provide sufficient slack on the tether 1042 that the user can pull the payload coupling apparatus 800 out of the cargo bay 1020 and secure it to the package 1040.

With the package 1040 attached to the payload coupling apparatus 800, the UAV can maneuver the package 1040 using the winch 1012 by unwinding or retracting the tether 1042. Such maneuvering of the package 1040 may occur when the package has already been loaded into the cargo bay 1020, as described above and with the cargo bay doors 1030, 1032 shut. In other words, the winch 1012 may be operated by the UAV control system to maneuver the package independent of any loading or delivery operations of the UAV. Such maneuvering of the package can be used for various purposes.

Figure 17:
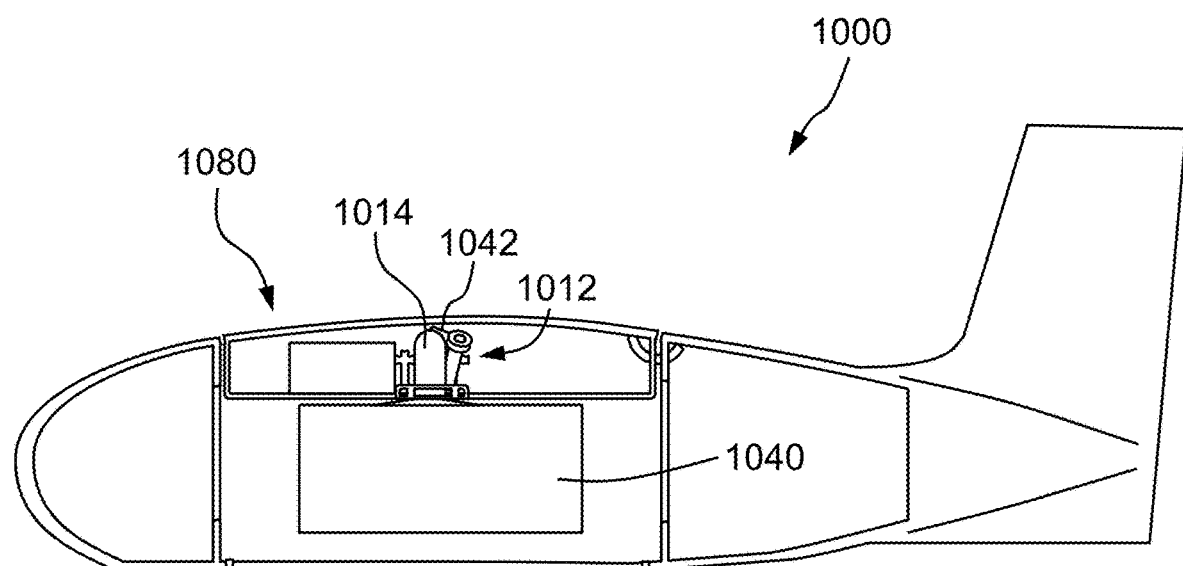

First, in some embodiments, the package 1040 may be hoisted up by the winch 1012 using the tether, as shown in FIGS. 16 and 17, in order to secure the package to attachment structures within the upper hatch door 1080. For example, in some embodiments, the package 1040 or other payload may be lifted by the winch 1012 and tether until the payload coupling apparatus 800 is securely positioned within the payload coupling apparatus receptacle 1014 and the handle of the package 1040 is secured to another component of the upper hatch door 1080. For example, the upper hatch door 1080 may include locking pins, such as those shown in FIG. 12, to secure the package 1040 to the UAV with a more robust fastening mechanism than that provided by the payload coupling apparatus alone. Attachment of the package 1040 to the locking pins may occur mechanically upon movement of the package 1040 toward the upper hatch door 1080, such as with a latch. Alternatively, the UAV control system may determine that the package has been moved to a predetermined position, such as by monitoring a position sensor or the operating current of the winch motor, and, in response to identifying the presence of the package, engage the locking pins with the package.

Maneuvering the package 1040 using the winch 1012 while the UAV is landed and before the UAV begins a flight operation can also be used by the UAV in order to confirm or verify information about the package 1040. For example, by retracting the tether 1042 using the winch 1012 so that the package 1040 is suspended above the lower access opening of the fuselage, the UAV control system may be able to determine whether a package has been properly secured in the cargo bay 1020. If the motor current of the winch is above a threshold and the length of the tether is within a predetermined range, the UAV control system may determine that a package is secured to the payload coupling apparatus and has been raised by the retracting of the tether. Furthermore, the UAV control system may be able to determine the weight of the package based on the required motor current to lift the package. Using the determined weight, the UAV control system can compare the measured weight with an expected weight value of the package to confirm that the correct package has been received in the UAV. In some embodiments, in response to identifying that a package is not attached to the payload, or that the attached package has an unexpected value, the UAV can take certain actions to initiate corrective action. For example, the UAV can broadcast an alarm, terminate the flight mission, or take other actions to indicate an error.

In the method described above, the package 1040 is initially loaded onto the cargo bay doors 1030, 1032 and is raised by the tether 1042 up to the upper hatch door 1080. As described above, the lifting of the package 1040 can be used to verify or confirm various information. However, in some embodiments, the package 1040 may initially be suspended from a structure coupled to the upper hatch door 1080. For example, in some embodiments, the payload may be loaded into the UAV by having a portion of the payload, such as a handle, be inserted into a slot in the upper hatch door, as described further below. In such an embodiment, the package may be held by an attachment system other than the payload coupling apparatus. In such an embodiment, this attachment system may be released in order to suspend the payload directly from the payload coupling apparatus. Once the attachment system is released, the presence of the package may be confirmed based on the motor current being utilized by the winch to suspend the payload.

Figure 47A:
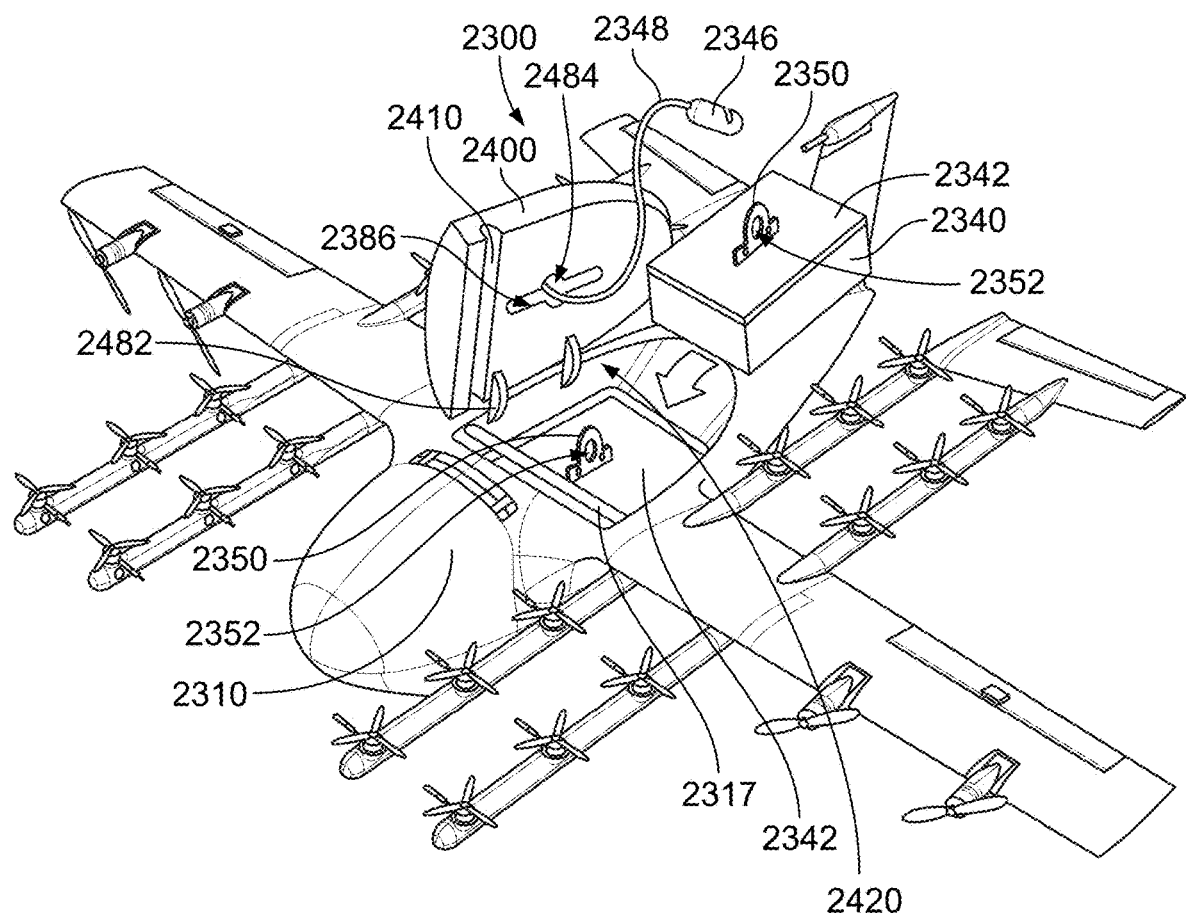
FIG. 47A is a perspective top view of UAV 2300 illustrating payload 2340 being inserted into cargo bay 2420 in fuselage body 2310 of UAV 2300.
Figure 47B:
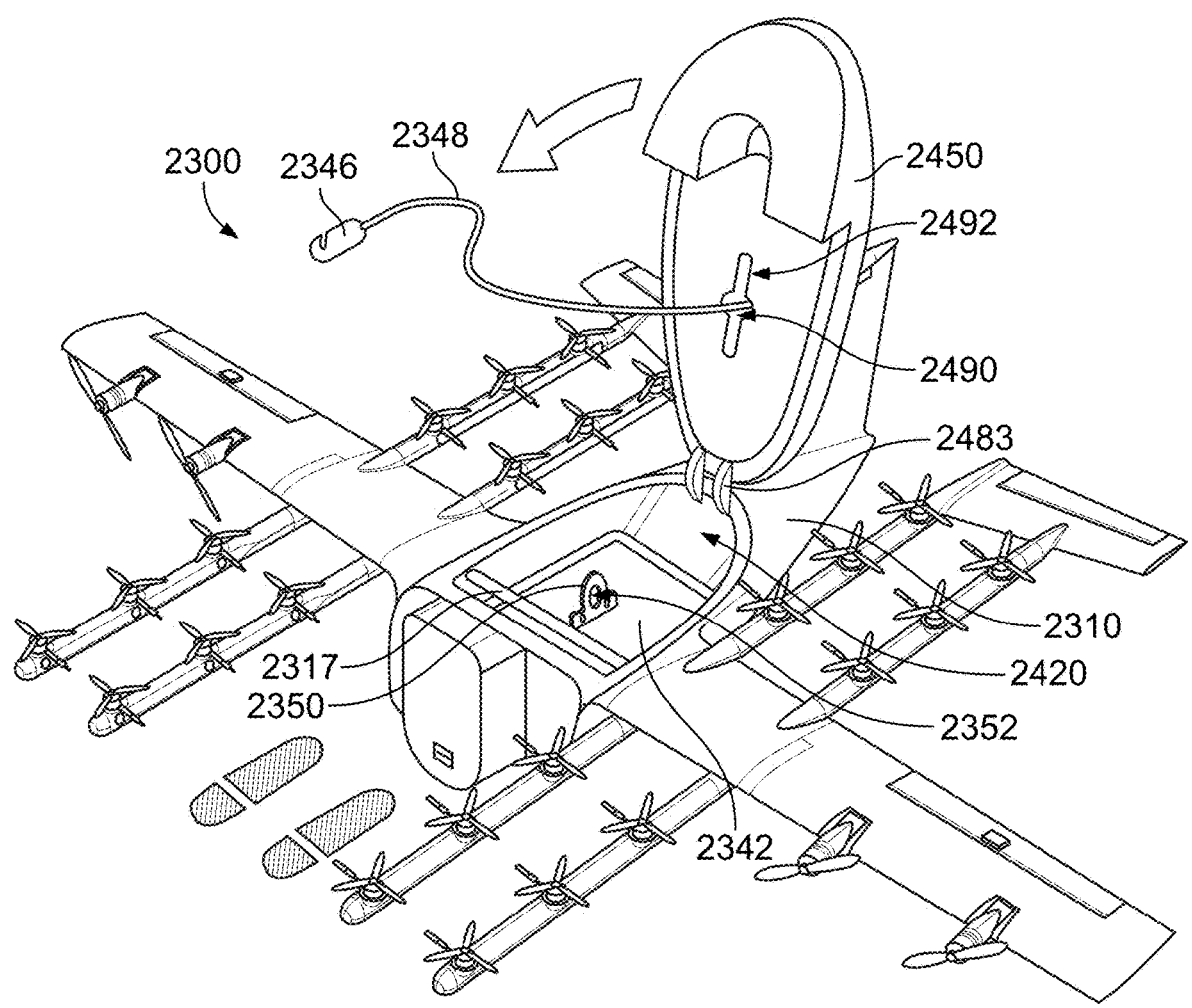
FIG. 47B is a perspective top view of UAV 2300 illustrating payload 2340 positioned in the fuselage body 2310 of UAV 2300.
Figure 50A:
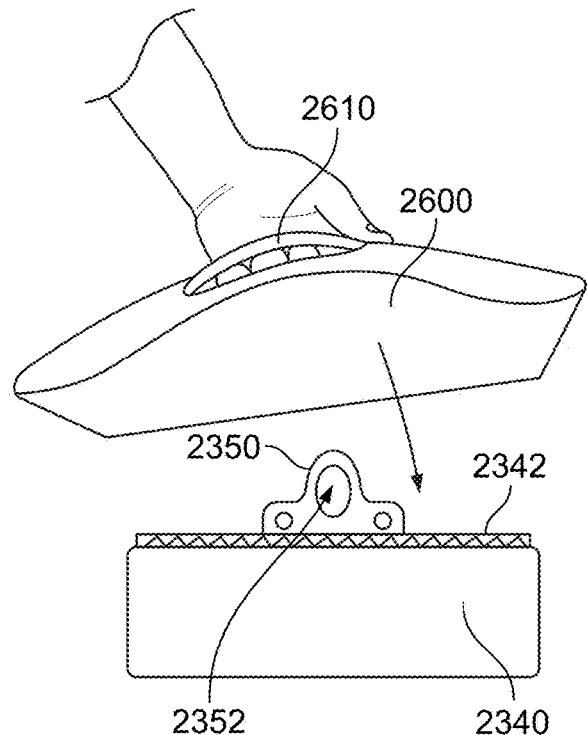
FIG. 50A is a perspective view illustrating hatch door 2600 being lowered onto payload 2340.
Figure 50B:
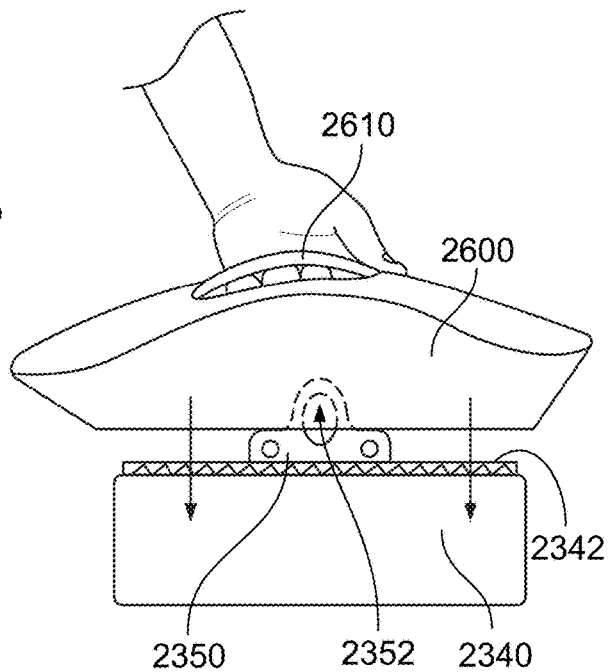
FIG. 50B is a perspective view illustrating hatch door 2600 being lowered onto payload 2340, with handle 2350 of payload 2340 entering a bottom surface of hatch door 2600.
Figure 50C:
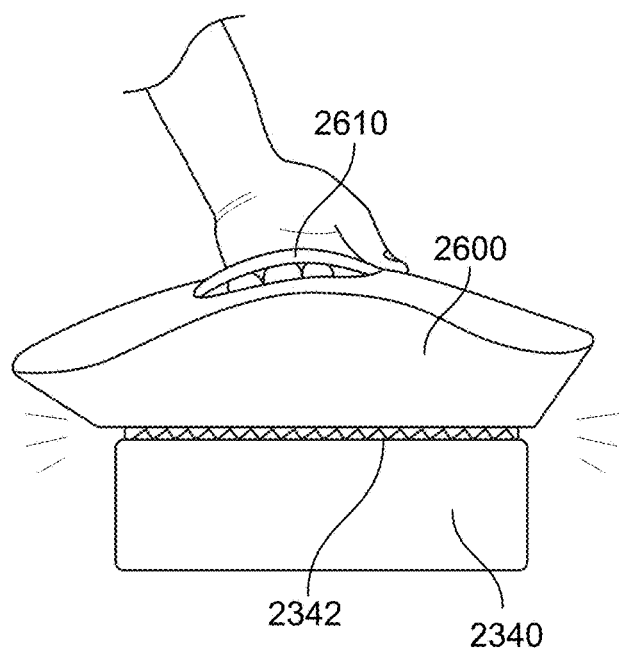
FIG. 50C is a perspective view of hatch door 2600 secured to payload 2340.

In UAV 1000 shown in FIGS. 13-17, the upper door 1080 only forms part of the upper portion of the fuselage 1010, while the fuselage body 1015 forms the nose 1016, tail 1017 and sides 1018. However, in other embodiments, the door that opens and closes the upper access opening may form a larger portion of the fuselage. For example, in some embodiments, the door may form part of the nose of the fuselage, as shown in FIG. 47B. In other embodiments, the door may form part of the tail of the fuselage. Further, while the upper door 1080 of UAV 1000 is secured to the fuselage body 1015 by a hinge located toward the rear of the fuselage, in other embodiments the hinge may be arranged toward the front of the fuselage, or on the side, as shown in FIG. 47A, described below. Further still, in some embodiments, the door may be connected to the fuselage body by another mechanism, such as sliding or rotating arms. Moreover, in some embodiments, the upper door may be entirely removable from the fuselage body, as shown in FIGS. 50A-50C. Other arrangements are also possible, such as the door having multiple sections that open in the middle.

In some embodiments, the path into the cargo bay that is provided through the upper access opening is vertical, such that a payload inserted into the fuselage may be dropped into the cargo bay. In other embodiments, the upper door may be positioned toward the nose or tail of the fuselage, such that the path through the upper access opening is angled downward from one end of the fuselage.

In some embodiments, the UAV may be configured to close the upper door without assistance from a user. For example, in some embodiments, the door may include an actuator for closing the door. Further, in some embodiments, the UAV may be configured such that the winch may be used to close the door. Such a UAV is shown in FIGS. 18-21, which illustrate an operation that uses a winch and tether to close the upper door. UAV 1200 includes a upper door 1280 that provides access to a cargo bay inside the fuselage of the UAV 1200. Similar to UAV 1000, the upper door 1280 includes a winch 1212 configured to raise and lower a payload on a tether 1242 for receiving or delivering the payload through a bottom access opening of the fuselage.

Figure 18:
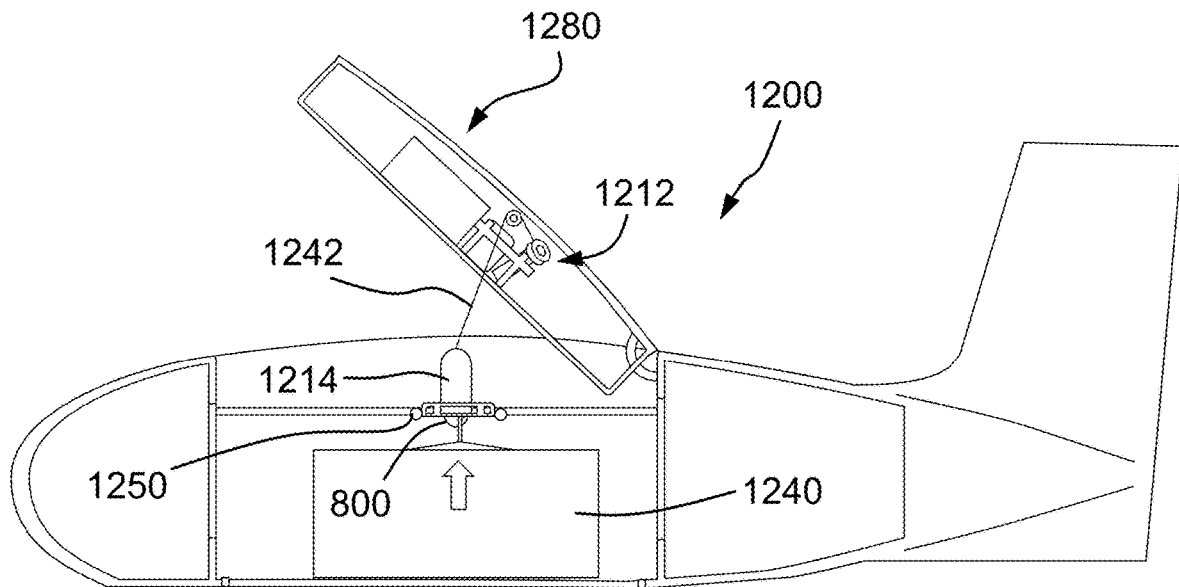
FIGS. 18-21 show a cross-sectional side view of the loading of a UAV 1200 through an upper hatch door 1280.
Figure 19:
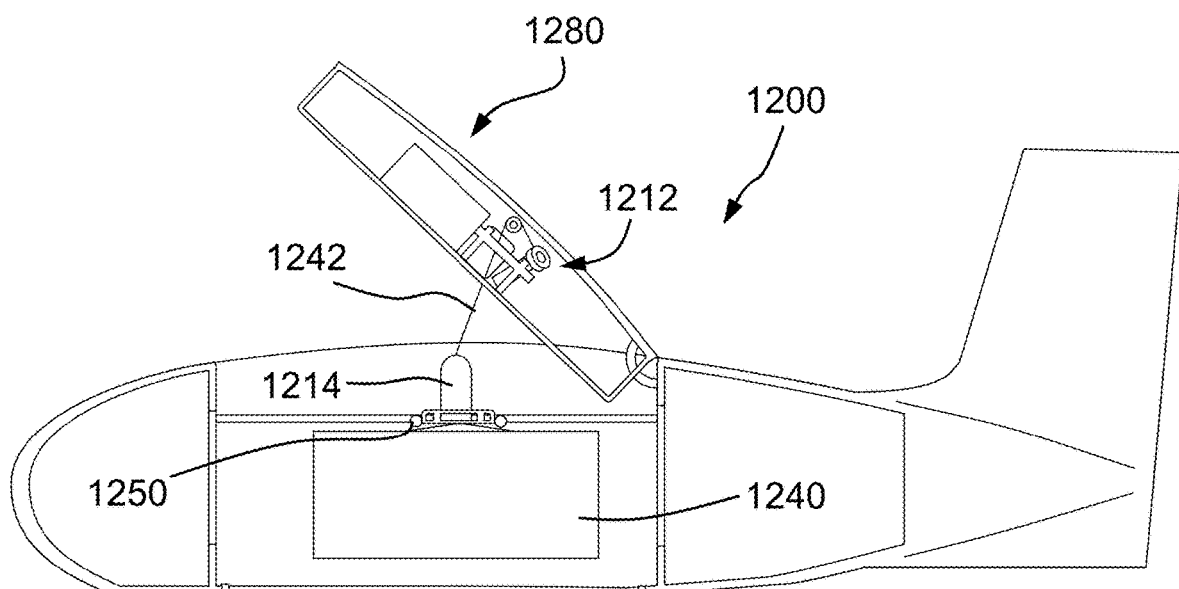
Figure 20:
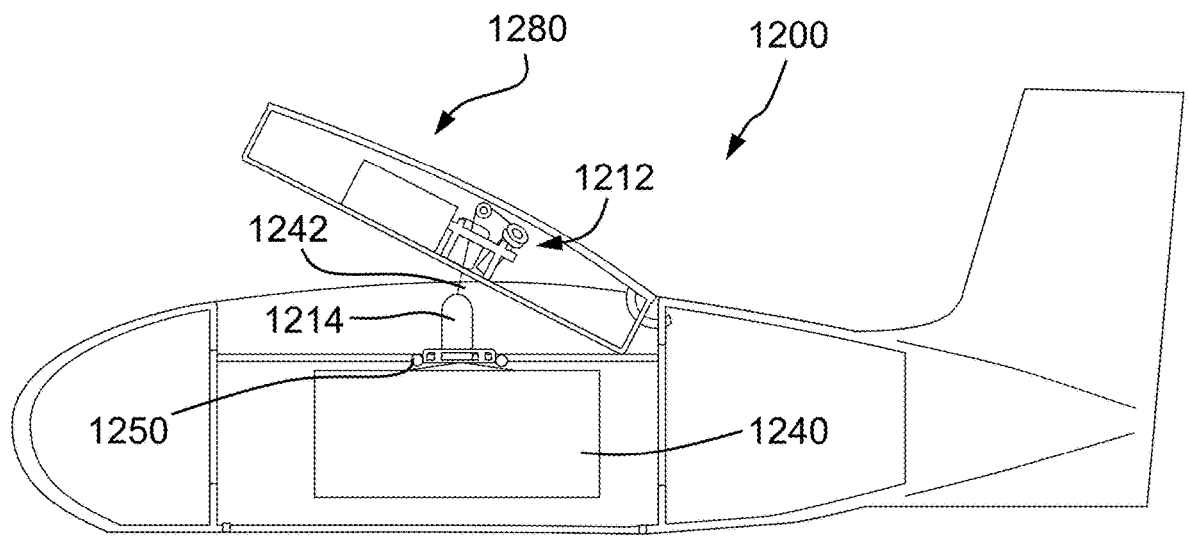
Figure 21:
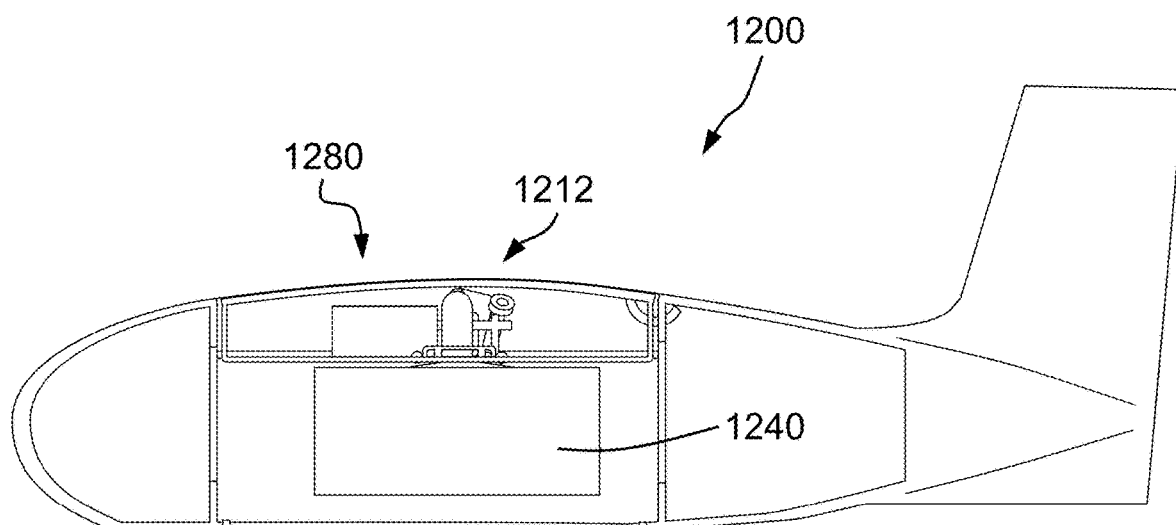

FIG. 18 illustrates the UAV 1200 with a package 1240 loaded into the cargo bay and secured to a payload coupling apparatus 800. In order to close the upper door 1280, the winch 1212 arranged in upper door 1280 is operated to retract the tether 1242 so that the package 1240 is hoisted above the floor of the UAV 1200 (formed by cargo bay doors). As the tether 1242 is retracted, the package 1240 moves upward and the payload coupling apparatus 800 is secured into receptacle 1214. In UAV 1200, the payload coupling apparatus receptacle 1214 is attached to the fuselage body of the UAV 1200. Accordingly, the payload coupling apparatus receptacle 1214 forms a barrier 1250 that hinders upward movement of the package 1240. Therefore, once the payload coupling apparatus 800 is fully seated in the receptacle 1214, as shown in FIG. 19, the distal end of the tether 1242 is restrained, thereby preventing further upward retraction of the tether. As shown in FIGS. 20 and 21, with the distal end of the tether 1242 restrained by the barrier 1250, further operation of the winch 1212 to retract the tether 1242 causes the upper door 1280 and associated winch 1212 to move toward the barrier, thereby closing the upper door 1280.

In the illustrated embodiment, the barrier 1250 includes the payload coupling apparatus receptacle 1214, such that the tether is restrained when the payload coupling apparatus is seated in the receptacle 1214. In other embodiments, the barrier may be formed by another structure. For example, in some embodiments, the barrier may be a different obstacle with a small hole to prevent passage of the payload coupling apparatus. In other embodiments, the barrier may engage the package, rather than payload coupling apparatus, and restrain the tether by blocking upward movement of the package. Other barrier structures are also possible.

While the embodiment depicted in FIGS. 18-21 moves the door to a closed position after the payload has been raised up to the barrier, in some instances, the weight of the payload may be greater than the force required to close the door. In such scenarios retracting the tether may result in the door closing before the payload is lifted up to the payload coupling apparatus receptacle or the barrier.

FIGS. 22A-22F illustrate another embodiment of a UAV 1300 that includes a winch 1312 which is configured to move in order to provide enlarged access to a cargo bay 1320 of the UAV 1300. The UAV 1300 includes a fuselage 1310 that surrounds a cavity which forms a cargo bay 1320. The fuselage 1310 is formed by a fuselage body 1315, cargo bay doors 1330 and an upper hatch door 1380. The upper hatch door 1380 corresponds to an upper access opening 1384 into the cargo bay 1320, which may be used to load a package 1340 into the cargo bay 1320 from above. The winch 1312 is secured to a main spar 1330 of the UAV 1300 and is configured to pivot about the spar 1330 from a lower operating position to an upper unobstructing position, in which the winch 1312 is moved out of the path through the upper access opening 1384. Accordingly, when the winch 1312 is in the upper position, it may be easier to place larger packages into the cargo bay 1320.

Figure 22A:
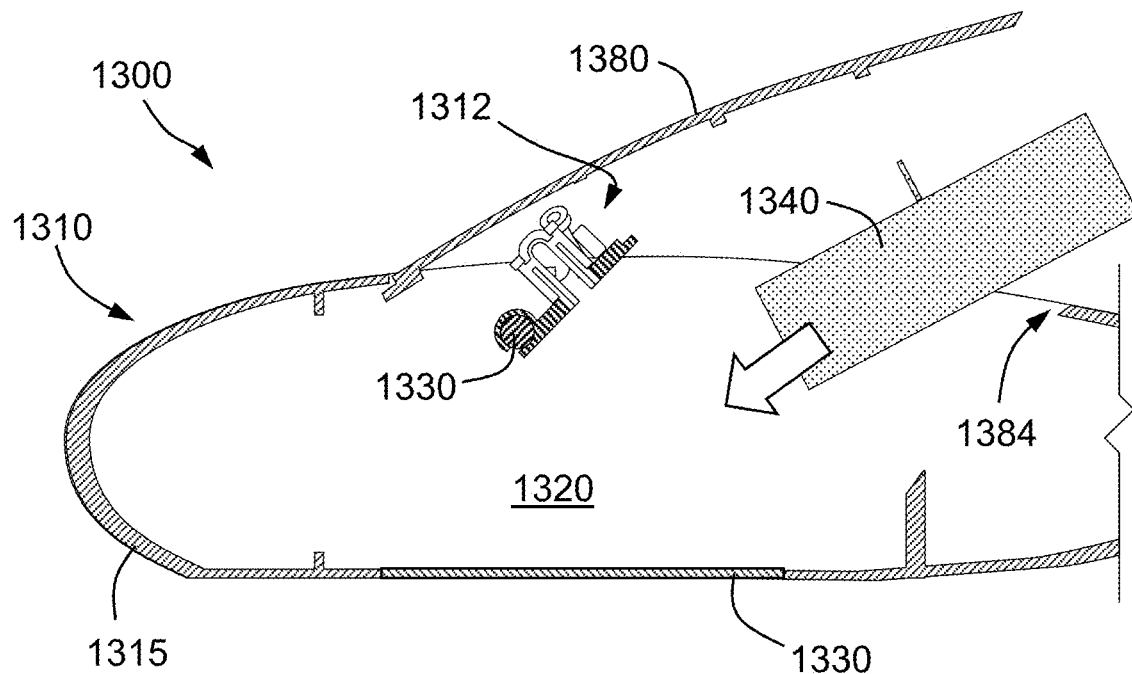
FIGS. 22A-22F show a cross-sectional side view of the loading of a UAV 1300 through an upper hatch door 1380.
Figure 22B:
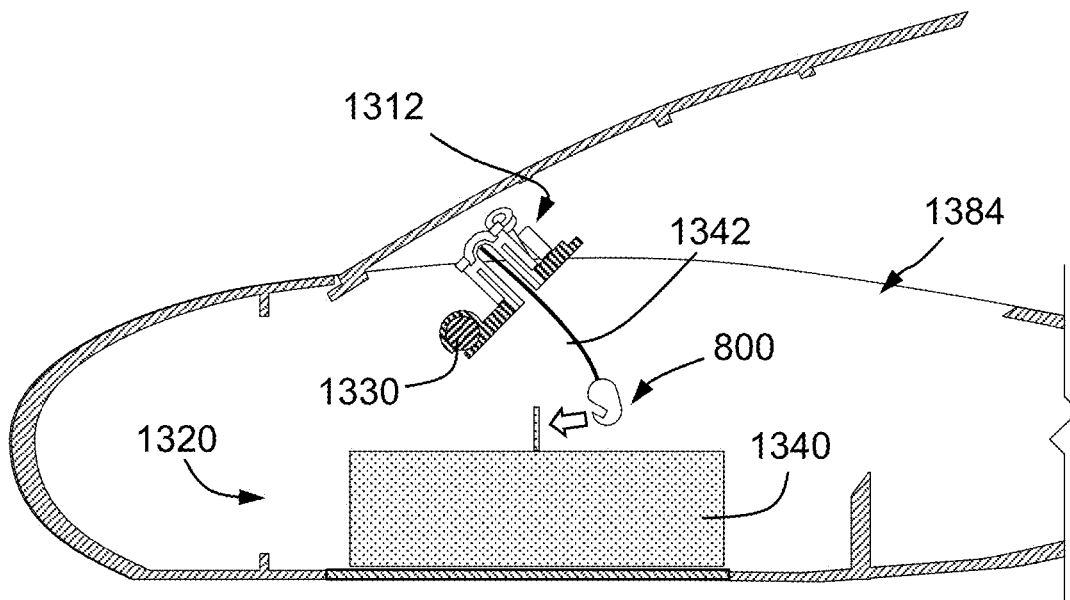

FIG. 22A illustrates a package 1340 being loaded into the cargo bay 1320 of the UAV 1300 while the winch 1312 is rotated about the spar 1330 to be in an upper position. Accordingly, the path through upper access opening 1384 is sufficiently large to receive the package 1340. As shown in FIG. 22B, in connection with placing the package 1340 into the cargo bay 1320, a payload coupling apparatus 800 at the end of a tether 1342 may be secured to a portion of the package 1340, such as a handle. While FIG. 22B shows the payload coupling apparatus 800 being secured to the package 1340 after the package has been placed in the cargo bay 1320, it is also possible to secure the payload coupling apparatus 800 to the package 1340 before it is inserted into the cargo bay 1320. For example, the winch 1312 may provide additional slack on the tether 1342 so that the payload coupling apparatus 800 can be pulled out of the fuselage 1310 and attached to the package 1340. Once the payload coupling apparatus 800 is secured to the package 1340, the winch 1312 may provide light tension on the tether 1342 in order to retract excess length of the tether 1342.

Figure 22C:
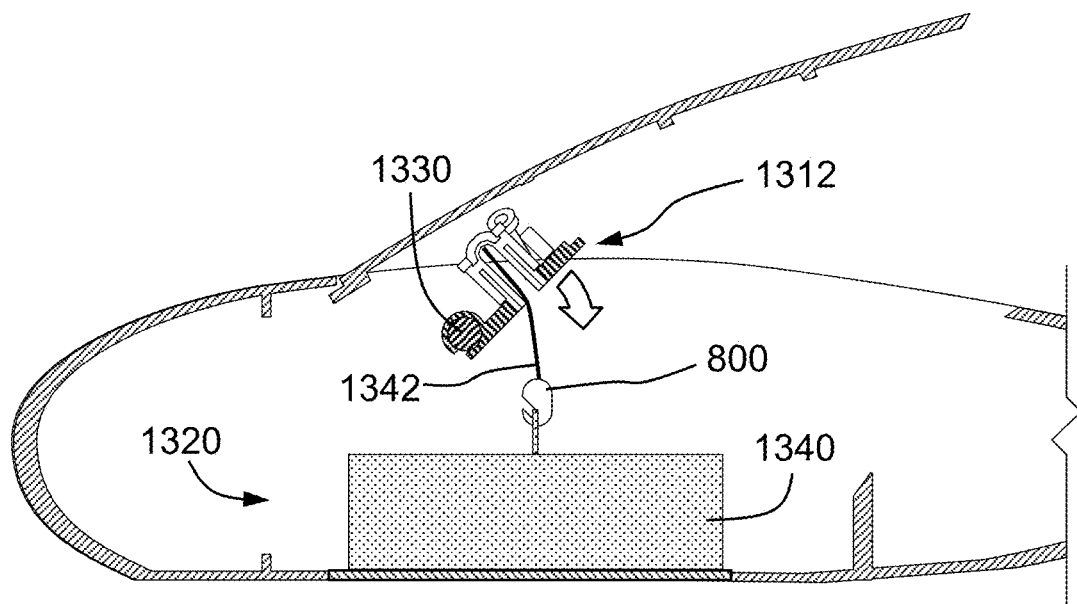
Figure 22D:
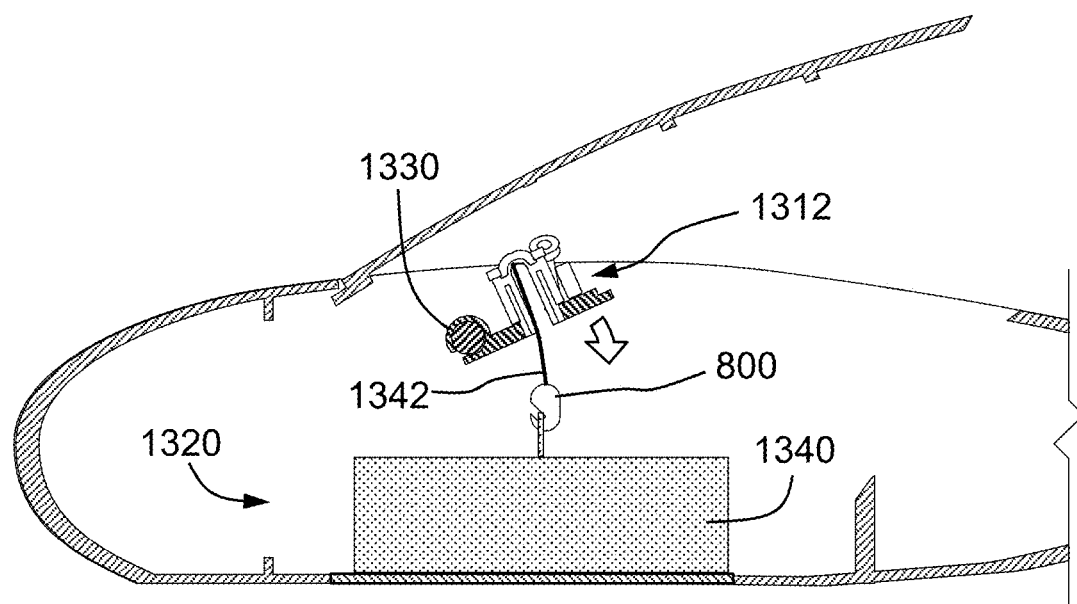

With the package 1340 in place within the cargo bay 1320 and the payload coupling apparatus 800 secured to the package 1340, the winch 1312 may be operated by the UAV control system to retract the tether 1342. As shown in FIGS. 22C and 22D, as the length of the unwound tether is reduced, the winch 1312 is pivoted downward toward an operating position. Once the winch 1312 reaches the operating position, further lowering of the winch 1312 may be prevented. For example, the support structure of the winch 1312 may contact a stop that hinders further downward movement of the winch 1312. Such a stop may be provided on the spar 1330 and contact the attachment structure on the spar, or the stop may be coupled to the fuselage and be configured to contact the support structure of the winch 1312.

Figure 22E:
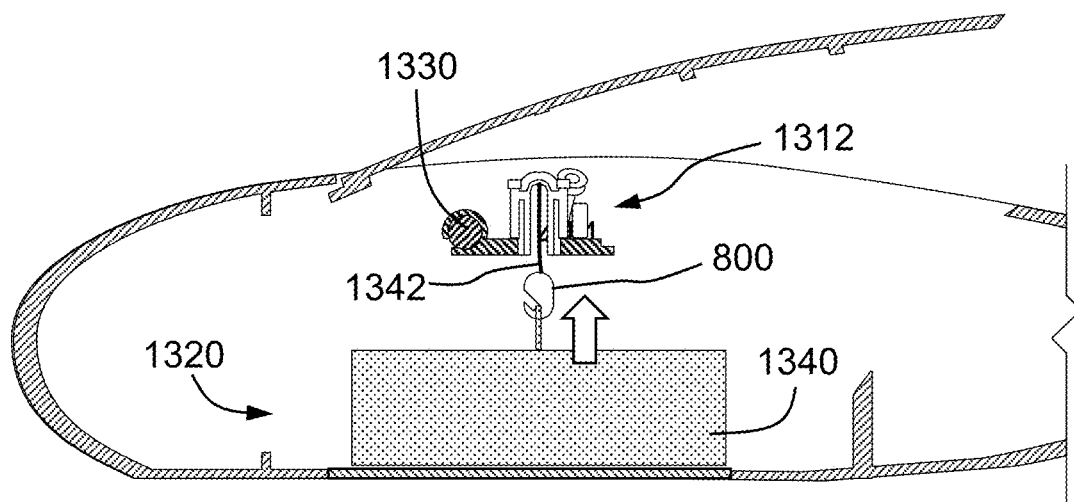
Figure 22F:
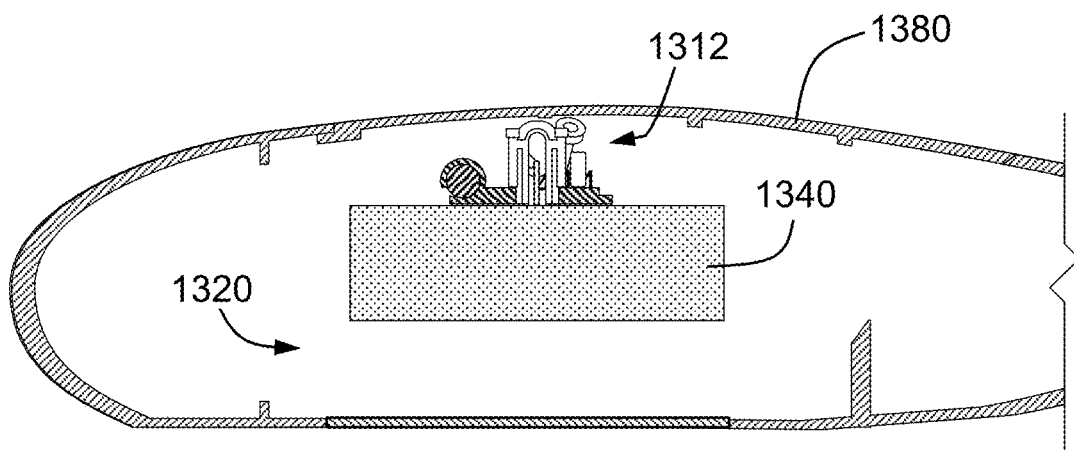

Once the winch 1312 reaches the lower operating position, further retraction of the tether 1342 by the winch 1312 raises the package 1340 until it is secured in place for flight, as shown in FIGS. 22E and 22F. For example, the payload coupling apparatus 800 may be received in a receptacle and/or other attachment structures, such as locking pins, may secure the package 1340 in place.

In some embodiments, the winch 1312 may be biased toward the upper open position, such that when there is no weight on the tether 1342 and the upper hatch door 1380 is open, the winch 1312 moves to the upper open position. For example, the attachment between the winch 1312 and the spar 1330 may utilize a rotational spring that biases the winch 1312 upward. Similarly, a spring may be provided between the winch 1312 and either the upper hatch door 1380 or the fuselage to bias the winch 1312 upward. Likewise, a counterweight may be used to bias the winch upward. Alternatively, in some embodiments, the winch 1312 may be manually movable to a desired position and held in the position by friction. For example, with slight friction between the winch 1312 and the spar 1330, a user may be able to move the winch 1312 to the upper open position and have the winch 1312 be held in place by friction while the package 1340 is loaded.

While the upper hatch door 1380 shown in UAV 1300 includes a hinged connection to the fuselage body 1315 at the front end of the upper hatch door 1380, in other embodiments, the door may be hinged on the side or at a rear end thereof. Further, in some embodiments, the door may be entirely removable from the fuselage body.

FIGS. 23-32 illustrate an embodiment of a UAV 1400 that includes a movable stage 1470 that is configured to hold a payload. As shown in FIG. 23A, UAV 1400 includes a fuselage 1410 with an interior cavity that forms a cargo bay 1420. A movable stage 1470 is coupled to the fuselage 1410 and is movable over a range of heights within the cargo bay 1420 (FIGS. 23-32). In other words, the movable stage 1470 is configured to move up and down with respect to the rest of the fuselage 1410. The movable stage 1470 includes an opening 1472 that allows at least a tether 1442 to pass through the movable stage 1470. Accordingly, as discussed below, the tether can raise and lower a payload with respect to the movable stage 1470.

Figure 23A:
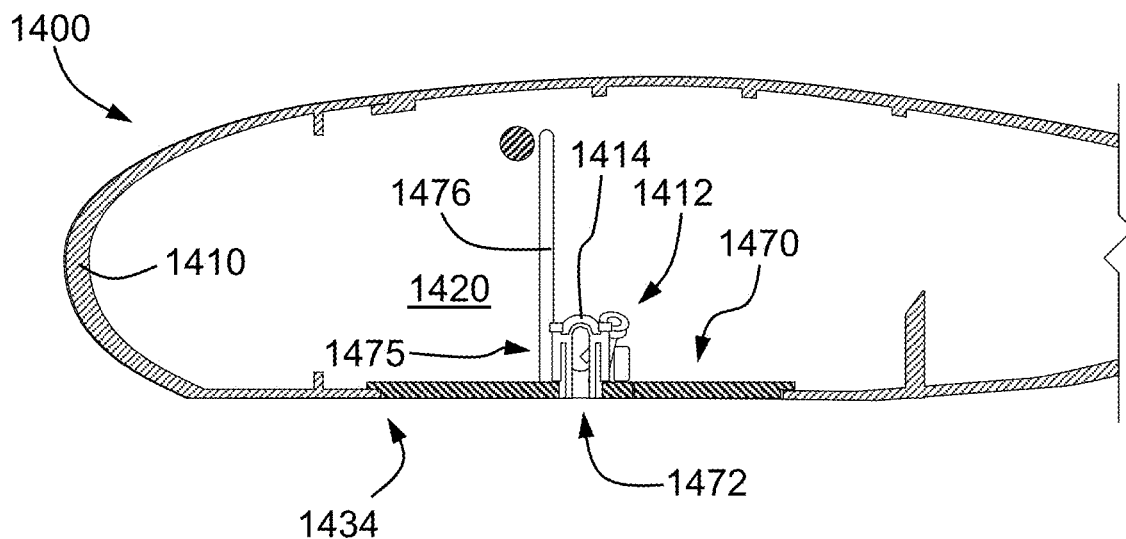
FIG. 23A is a cross-sectional side view of a UAV 1400 with a movable stage 1470 in a lower position.
Figure 23B:
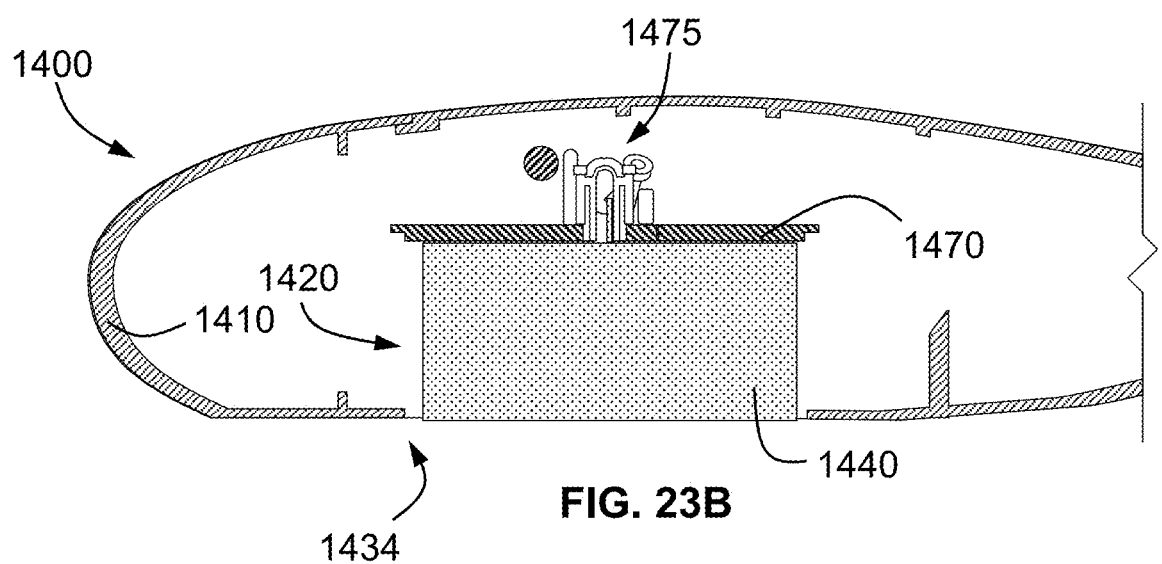
FIG. 23B is a cross-section side view of the UAV 1400 with a package 1440A secured against the movable stage 1470.
Figure 23C:
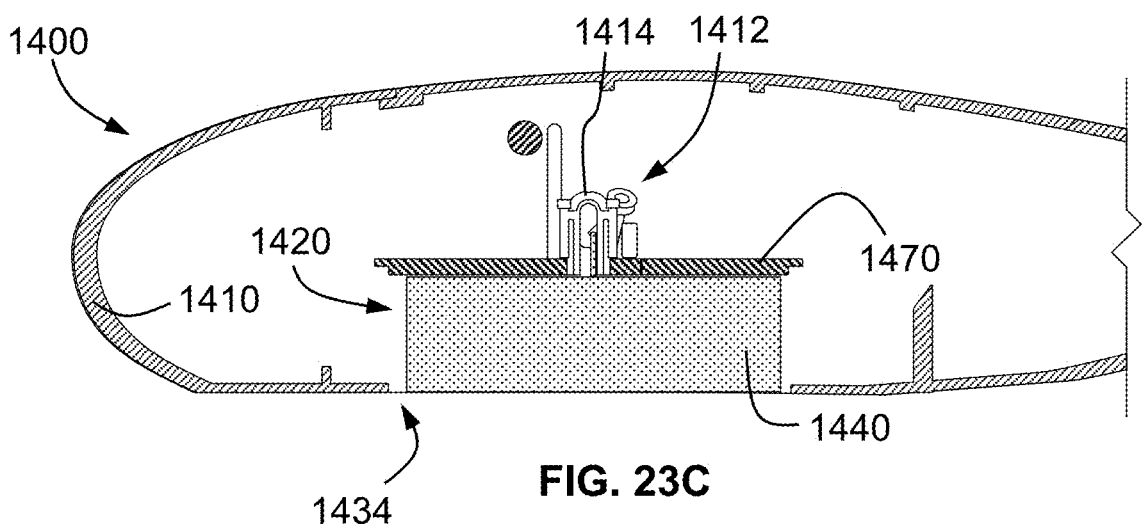
FIG. 23C is a cross-sectional side view of the UAV 1400 with another package 1440B secured against the movable stage 1470.

As shown in FIG. 23A, when the movable stage 1470 is in a lower position, the movable stage 1470 may form the lower part of the fuselage 1410. For example, when in the lower position, the outer edges of the movable stage 1470 may be positioned adjacent to the edge of a lower access opening 1434, so that the lower access opening 1434 is effectively closed by the movable stage 1470. However, as shown in FIGS. 23B, 23C, the movable stage 1470 may also move to elevated positions that provide access to the cargo bay 1420, i.e., so that the movable stage 1470 is above the cargo bay 1420.

In some embodiments, an attachment structure 1475 for securing a package to the UAV may be coupled to the movable stage 1470. For example, the movable stage 1470 of UAV 1400 includes a payload coupling apparatus receptacle 1414 is accessible from under the movable stage 1470. The receptacle 1414 may receive a payload coupling apparatus 800 that is attached to a package in order to secure the package against the movable stage 1470. In other embodiments, the attachment structure may include locking pins or other attachment devices for securing a handle or another portion of a payload to the UAV.

With a package secured to the attachment structure 1475, raising and lowering the movable stage may also change the position of the payload. Accordingly, when the UAV is carrying a package, the movable stage 1470 and corresponding attachment structure 1475 may be moved to a flight position that corresponds to a particular height in which the bottom of the package is flush with the lower access opening 1434 of the fuselage 1410. By placing the bottom of the package at the lower access opening 1434, a surface of the package may form part of the aerodynamic exterior of the fuselage 1410 and occupy the lower access opening to the cargo bay 1420. Such positioning of the package within the lower access opening 1434 can help reduce drag on the UAV that may otherwise result from the low pressure area formed by an open cargo bay. FIGS. 23A and 23B illustrate the UAV 1400 with package of different sizes that are each positioned in an appropriate flight position to be flush with the lower access opening 1434. For example, FIG. 23A illustrates the movable stage 1470 at a first position near the top of the fuselage 1410. A relatively large package 1440A is secured against the movable stage 1470 with the bottom of the package positioned flush with the lower access opening

1434. In contrast, in FIG. 23B, the UAV 1400 is carrying a relatively smaller package 1440B, which is secured against the movable stage 1470. To hold the bottom of package 1440B flush with the lower access opening 1434, the movable stage 1470 is located at an intermediate position within the fuselage 1410.

In some embodiments, the winch is secured to the movable stage and moves up and down with the fuselage along with the movable stage. Such positioning can help the efficiency of the winch motor and limit the length of the tether that is routed inside the fuselage, as discussed above. In other embodiments, the winch may be secured to the body of the fuselage, such that the movable stage moves with respect to the winch.

In some embodiments, the movable stage 1470 may be secured in the fuselage on a guide 1476, such as a rod or rail, in order to control the movement of the movable stage. Further, in some embodiments, the UAV may include an actuator for raising and lowering the movable stage. For example, in some embodiments the UAV may include a dedicated motor for moving the stage up and down. In other embodiments, movement of the stage may be facilitated using a shared motor. For example, in some embodiments, the winch may be used to raise or lower the movable stage. By winding the tether around a pulley that is secured to the fuselage or to a structural component attached to the fuselage, such as the main spar, the stage may be moved by retracting or unwinding the tether. For example, if the tether is wound over a pulley at the top of the fuselage, once the tether is retracted to such an extent that the payload coupling is held within the receptacle, further retracting of the tether may shorten the length of tether that loops around the pulley, thereby raising the movable stage.

While the movable stage may be used to move certain packages into the cargo bay of the fuselage during flight, in some embodiments, the UAV may hold the movable stage at the lower position during flight, and keep the package on the outside of the fuselage. Such a method may be useful in various scenarios, such as where the package is too large for the cargo bay, is too small to justify opening the cargo bay, or has some other configuration where raising the movable stage will result in greater drag on the UAV than maintaining the movable stage at the lower position.

Figure 24:
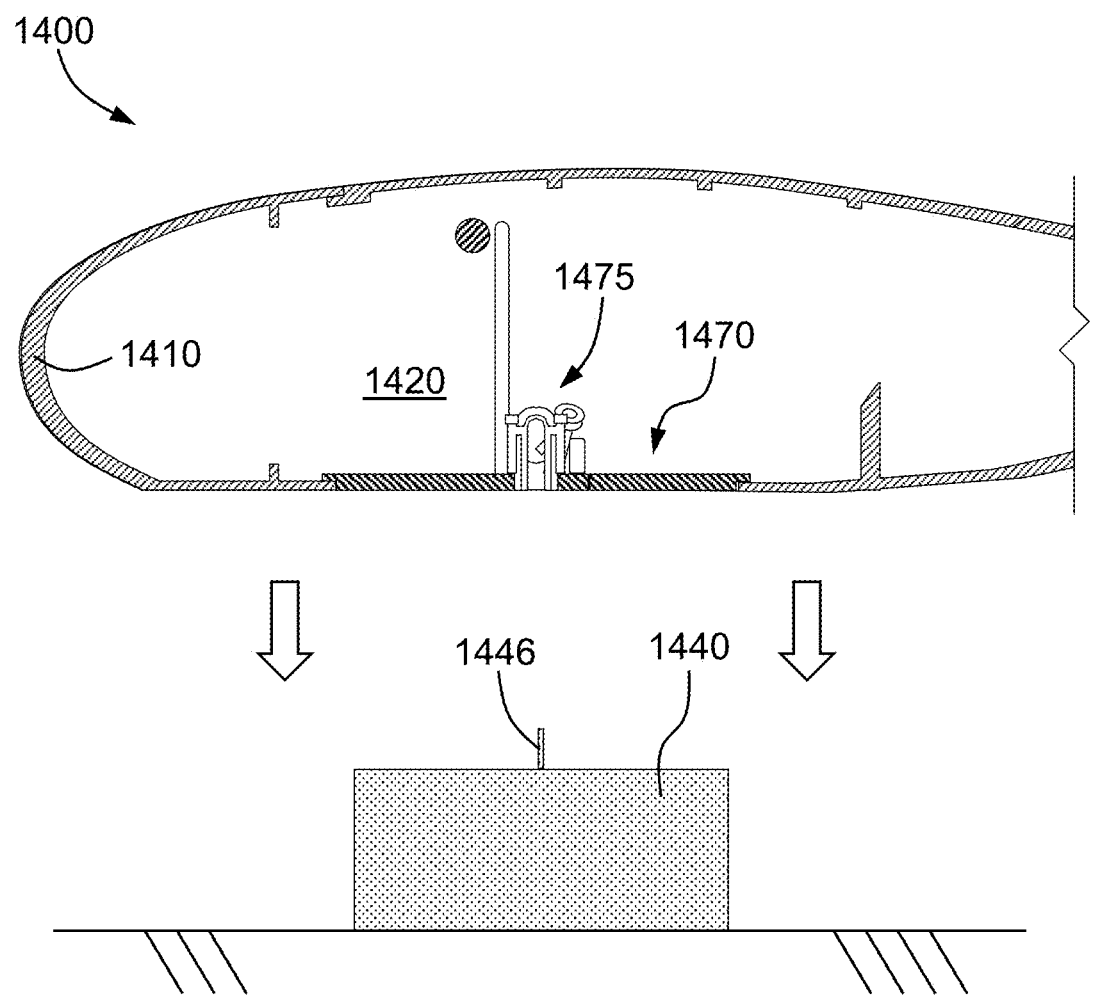
FIGS. 24-27 show a cross-sectional side view of an embodiment of loading the UAV 1400 by moving the movable stage 1470.
Figure 25:
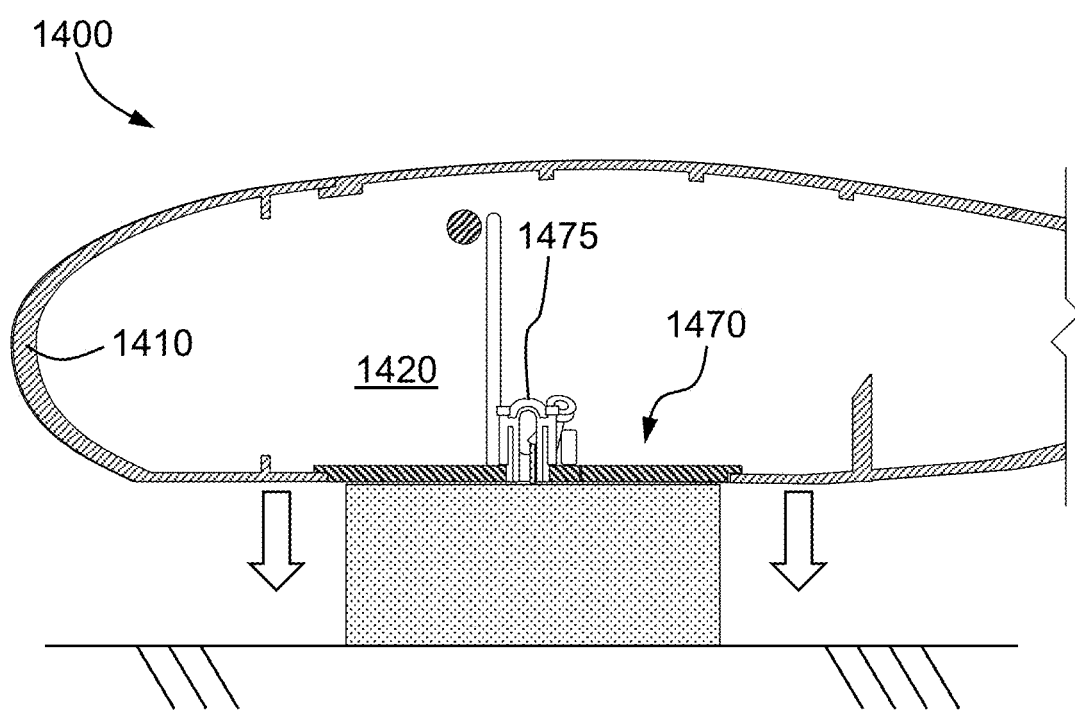
Figure 26:
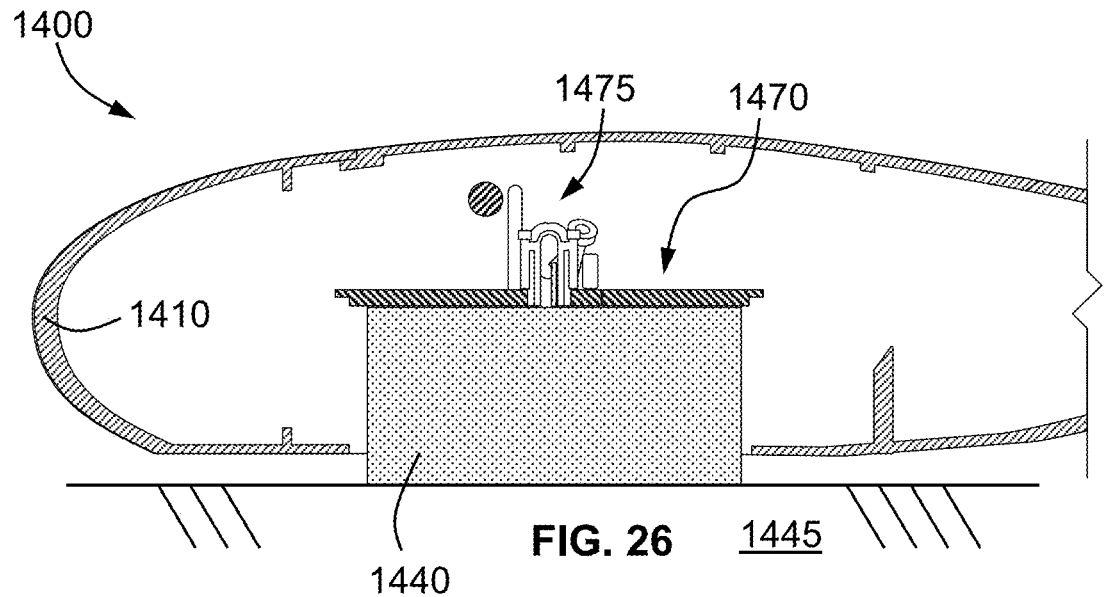
Figure 27:
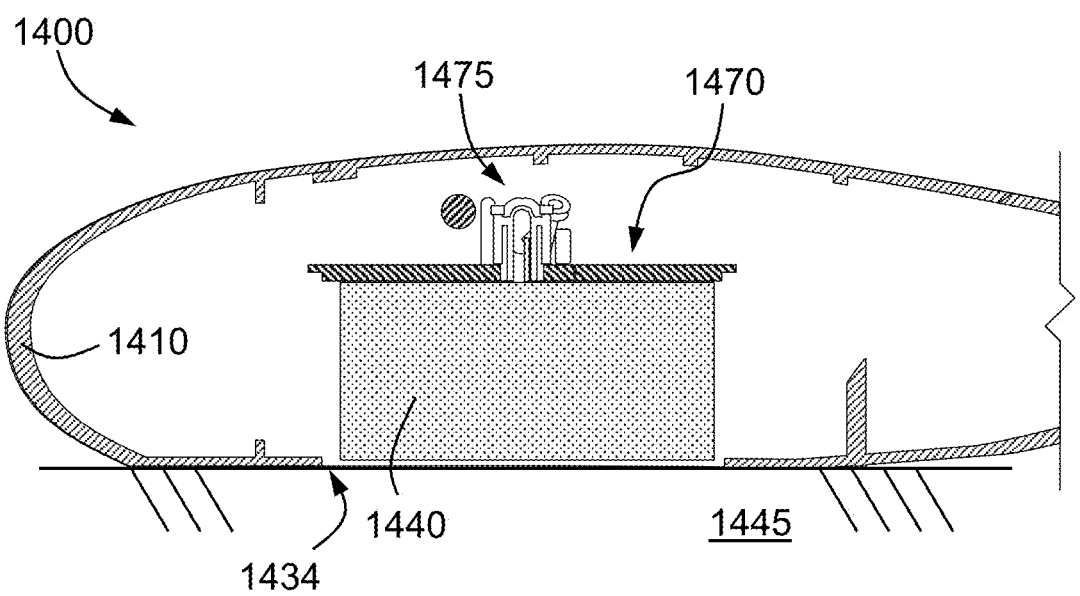

Various methods may be used to load a package into the cargo bay through movement of the movable stage. FIGS. 24-27 illustrate an embodiment of loading a package 1440 into the cargo bay 1420 of UAV 1400. As shown in FIG. 24, the package 1440 is initially positioned on a support surface 1445, such as the ground. The UAV 1400 is then positioned over the package 1440 and, as shown in FIG. 25, lowered onto the package so that the movable stage 1470 rests on the upper surface of the package 1440. This operation may also be used to secure a portion of the package, such as handle 1446, to the attachment structure 1475, so that the package is secured to the movable stage 1470. As shown in FIG. 26, the movable stage 1470 may then be raised with respect to the fuselage 1410 using a motor, such that the package 1440 moves into the cargo bay 1420 and the fuselage 1410 is lowered around the package 1440. Once the UAV 1400 contacts the support surface 1445, further raising of the movable stage 1470 with respect to the fuselage 1410 will raise the package 1440 with respect to the support surface 1445. When the transition from lowering the fuselage 1410 around the package 1440 to raising the package 1440 within the fuselage 1410 occurs, the load on the motor that operates the movable stage 1470 may change. Accordingly, by monitoring the motor current of the actuator that moves the movable stage, the UAV control system may determine that the height of the movable stage 1470 at which the package 1440 was flush with the lower access opening 1434. This height may then be used as a flight position for the movable stage 1470 while carrying the package.

Figure 28:
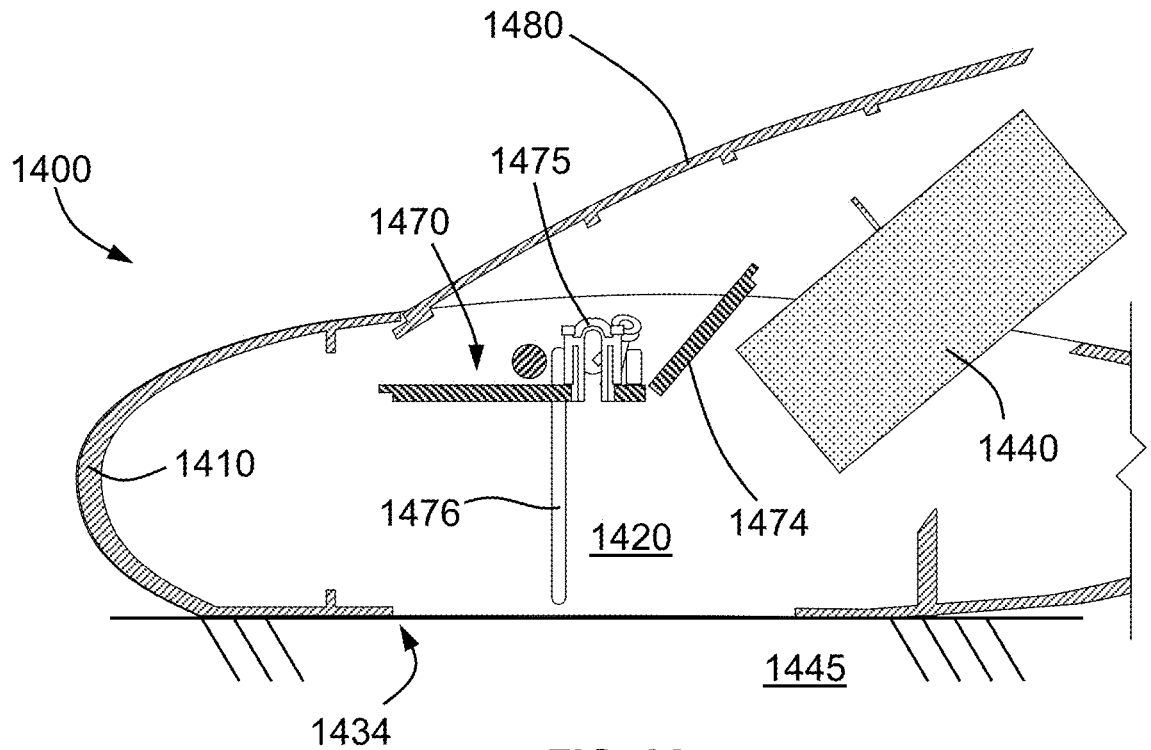
FIGS. 28-31 show a cross-sectional side view of another embodiment of loading the UAV 1400 by moving the movable stage 1470.
Figure 29:
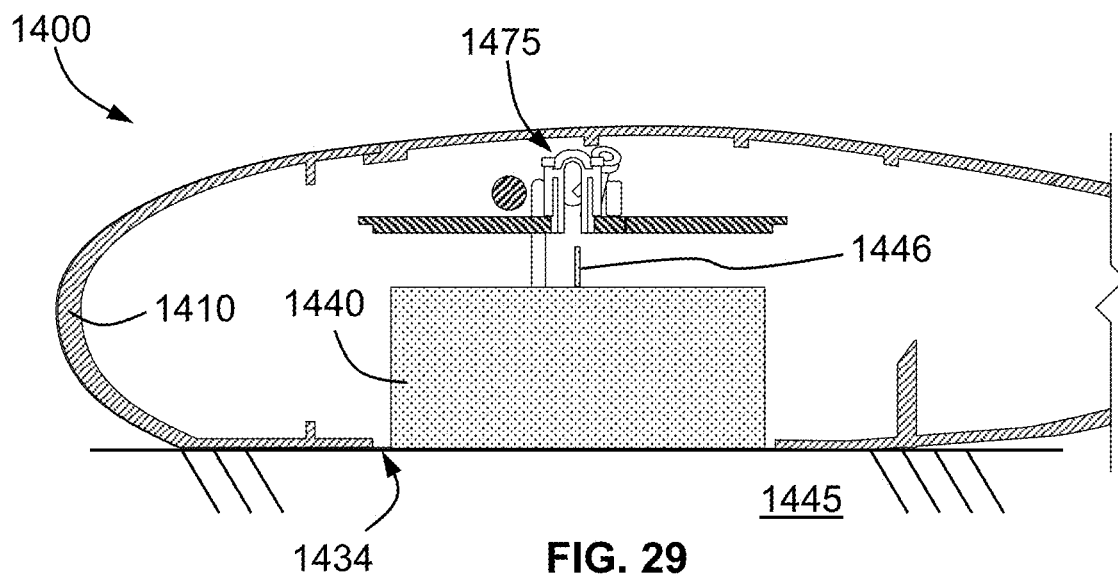

FIGS. 28 to 31 illustrate another embodiment of loading a package 1440 into the cargo bay 1420 of UAV 1400. In FIG. 28, the UAV 1400 is positioned on a support surface 1445 and a package 1440 is loaded into the fuselage 1410 through an upper access opening 1484 by opening an upper door 1480. Further, an articulating portion 1474 of movable stage 1470 is moved from a horizontal operating position to an angled position in which a path into the cargo bay 1420 is clear. As shown in FIG. 29, the package 1440 is positioned inside the cargo bay 1420 and under the movable stage 1470. Notably, the package 1440 is supported directly by the support surface 1445, and is not yet coupled to the UAV 1400.

Figure 30:
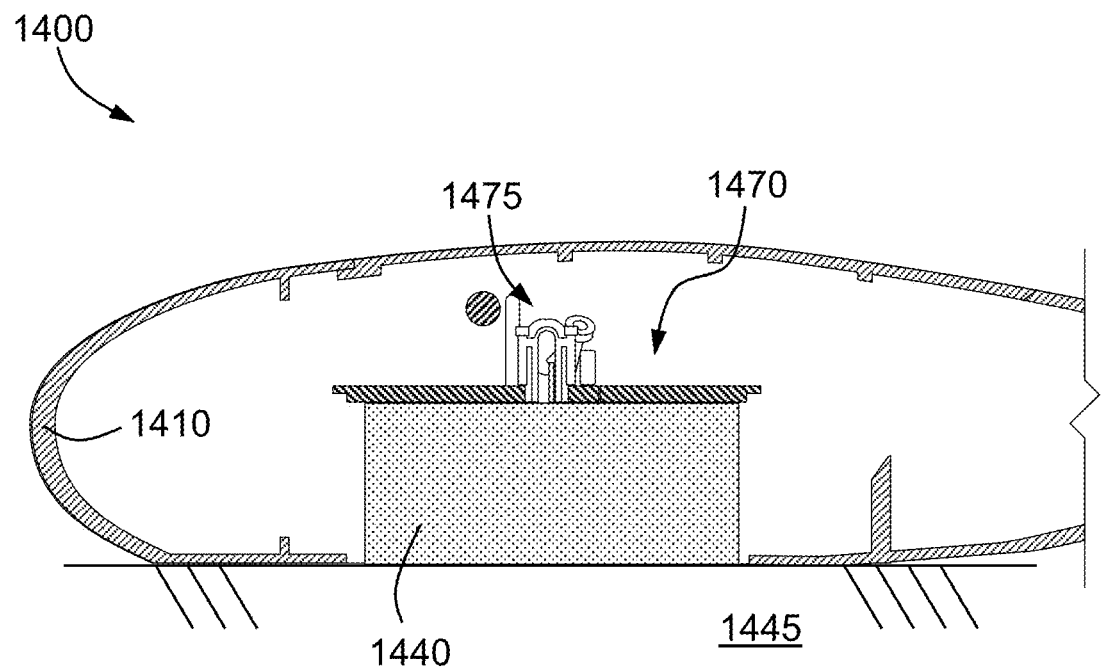
Figure 31:
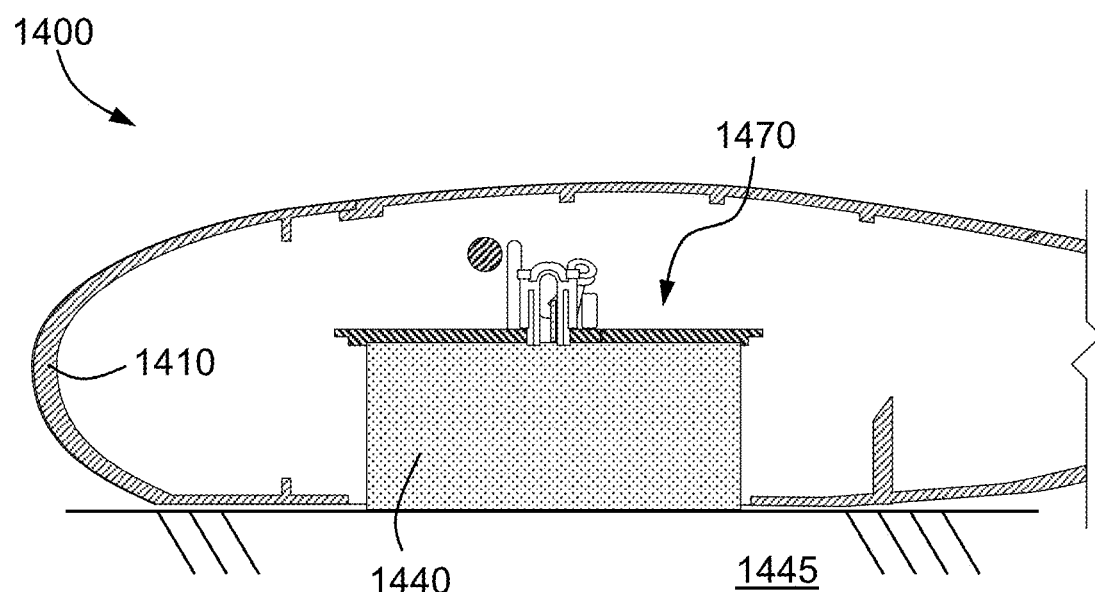

To secure the package 1440 to the UAV 1400, the movable stage 1470 is lowered, as shown in FIG. 30, until the attachment structure 1475 on movable stage 1470 couples to a portion of the package, such as the handle 1442. Once the package is connected to the attachment structure 1475 and the movable stage 1470 is secured against the upper surface of the package 1440, further lowering of the movable stage 1470 will begin to raise the fuselage 1410 (and the rest of the UAV) above the support surface 1445. Again, the transition from lowering the movable stage 1470 toward the package to raising the UAV 1400 above the support surface fuselage 1410 will cause a significant change in the load on the motor that operates the movable stage 1470. Accordingly, by monitoring the motor current of the actuator that moves the movable stage, the UAV control system may determine that the height of the movable stage 1470 at which the package 1440 was flush with the lower access opening 1434. Again, this height may then be used as a flight position for the movable stage 1470 while carrying the package.

Figure 32A:
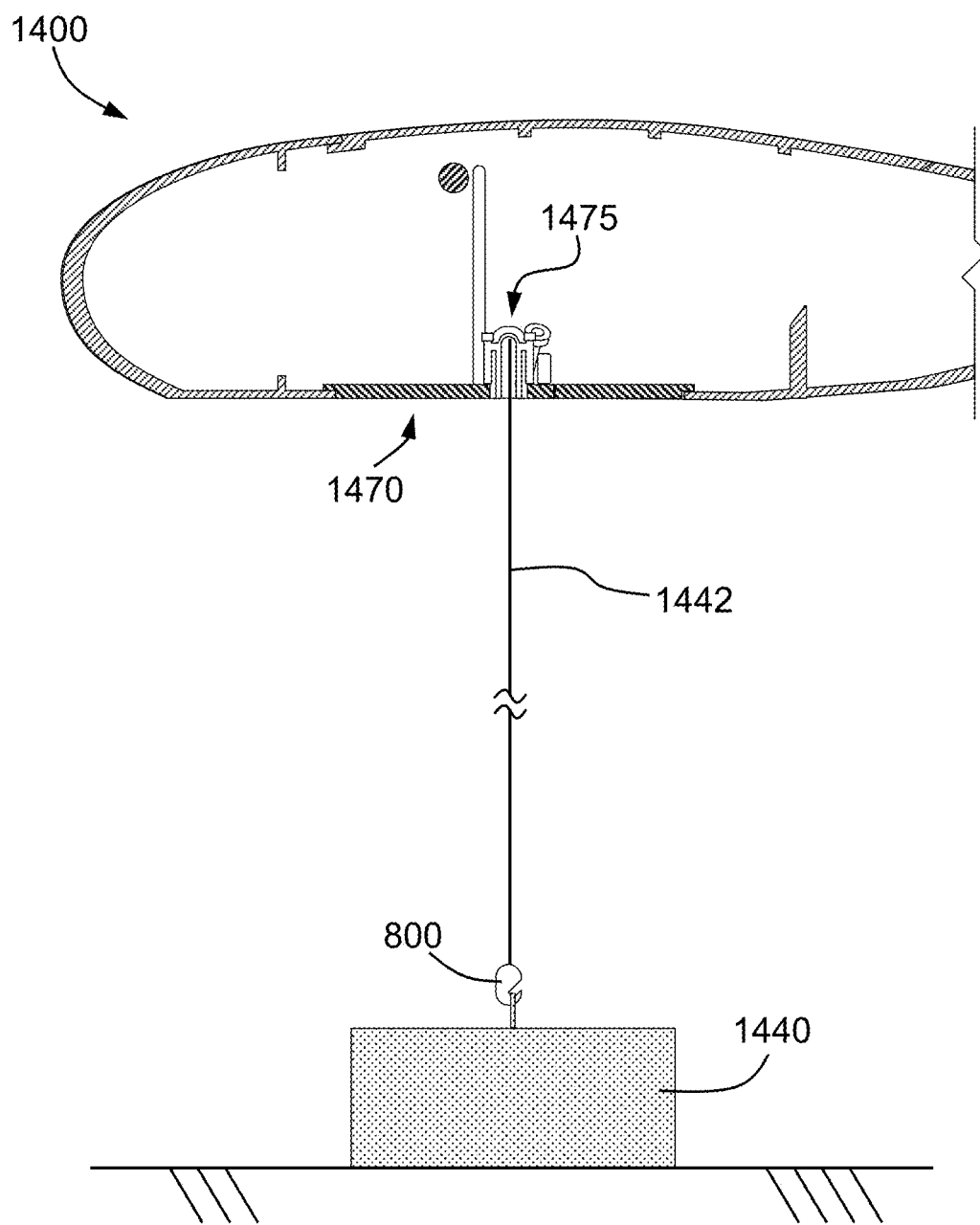
FIGS. 32A-32D show a cross-sectional side view of another embodiment of loading the UAV 1400 by moving the movable stage 1470.
Figure 32B:
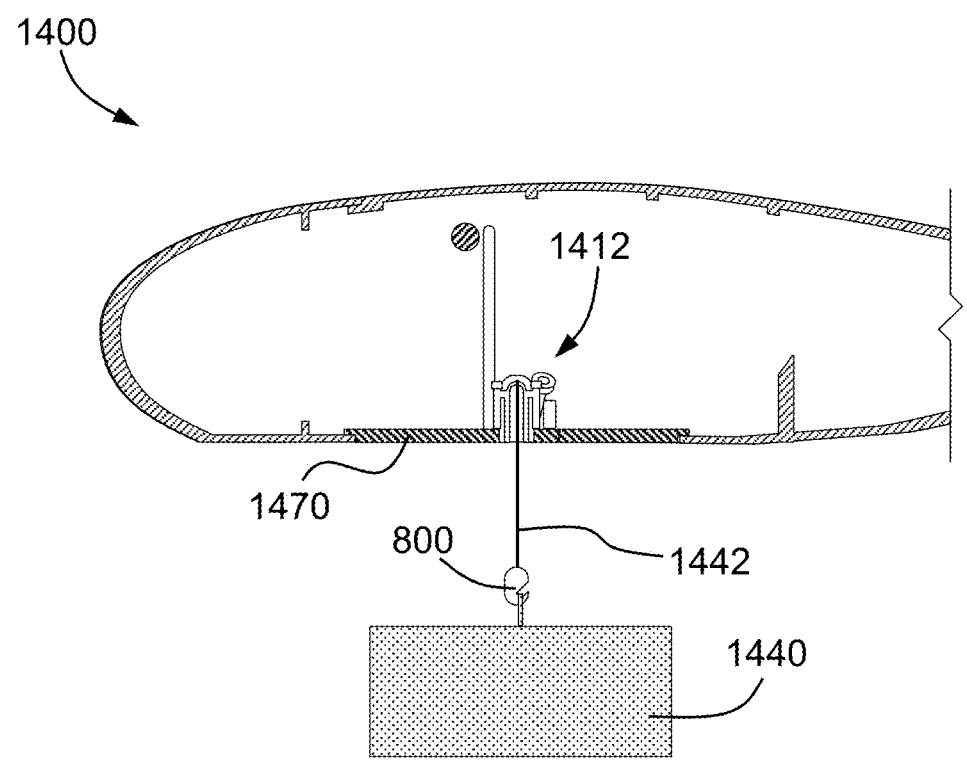
Figure 32C:
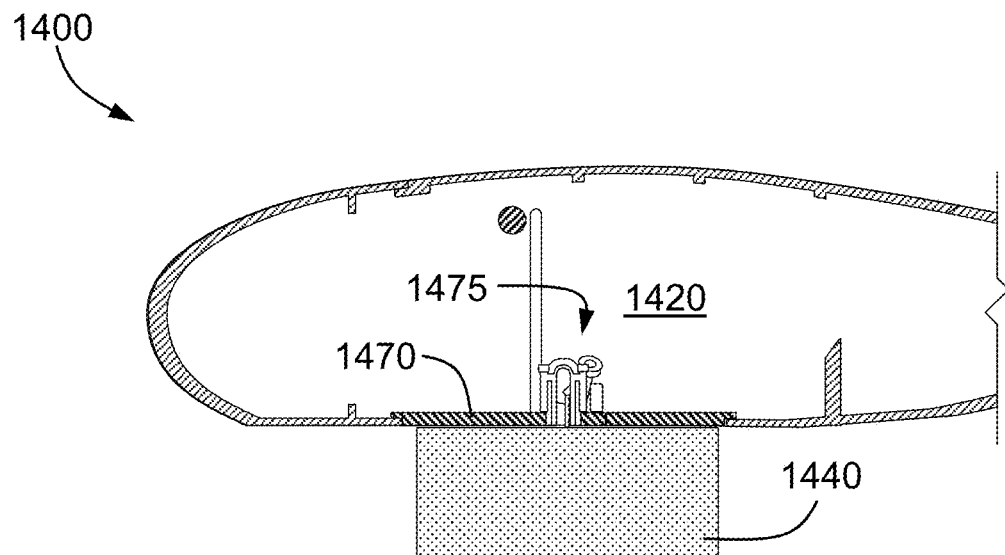
Figure 32D:
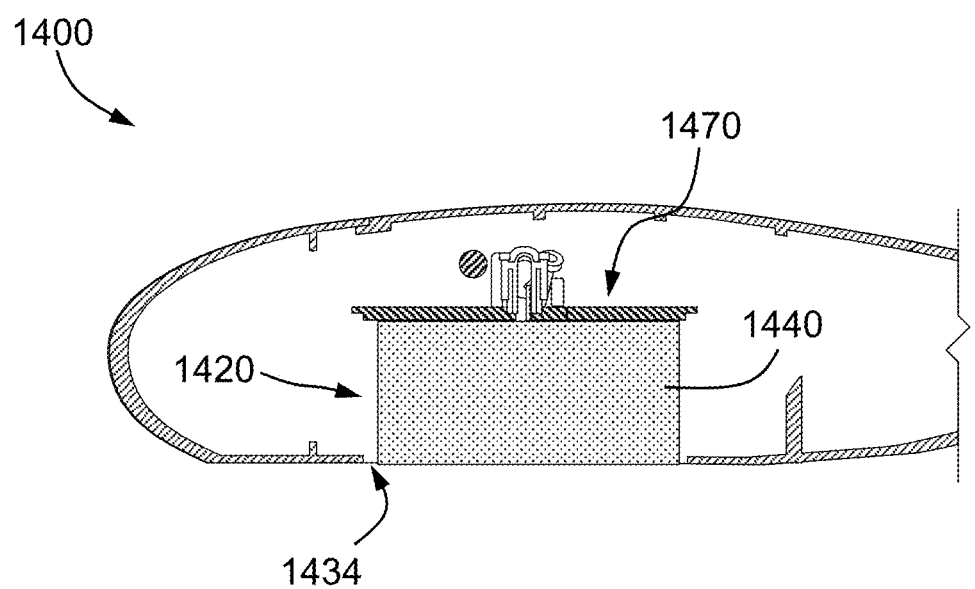

FIGS. 32A-32D illustrate another embodiment of loading a package 1440 into the cargo bay 1420 of UAV 1400. In the embodiment illustrated in FIGS. 32A-32D, the UAV is in a hover flight mode above a support surface. As shown in FIG. 32A, the package 1440 is initially on the support surface 1445, while UAV 1400 is elevated above the support surface 1445. The payload coupling apparatus 800 at the end of tether 1442 is secured to the package 1440. As shown in FIG. 32B, the tether 1442 is then retracted by the winch 1412 to raise the package 1440 toward the UAV 1400. Once the package 1440 reaches the UAV 1400, the package coupling apparatus 800 moves into the receptacle so that the package 1440 can be secured to the attachment structure 1475, as shown in FIG. 32C.

Once the package 1440 is secured against the movable stage 1470, the movable stage 1470 is raised so that the package 1440 moves into the cargo bay 1420. The movable stage 1470 then moves upward until the bottom surface of the package 1440 is flush with the edge of the lower access opening 1434. In some embodiments, a sensor may be used to determine the position of the package 1440 in order to place the package at the desired position. In other embodiments, the UAV control system may monitor the drag on the UAV during flight and adjust the position of the movable stage and attached package to reduce drag.

Figure 33:
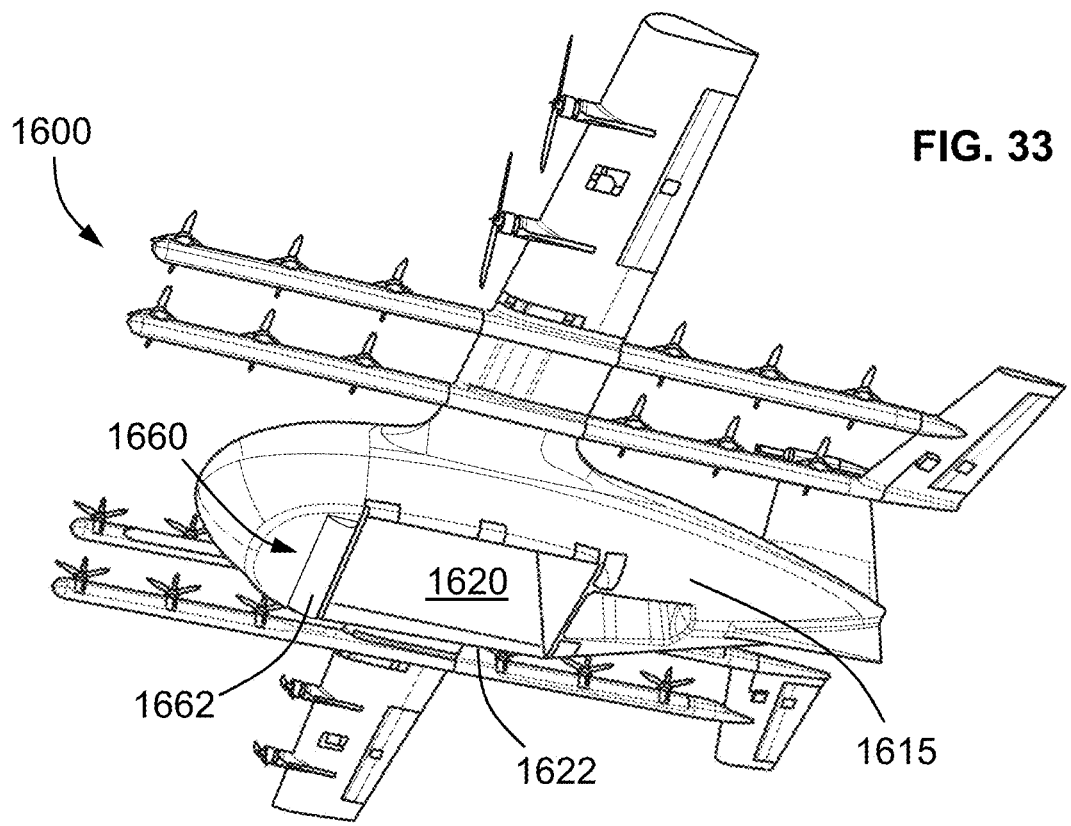
FIG. 33 is a perspective bottom view of a UAV 1600 with an open cargo bay 1620.

FIG. 33 illustrates an embodiment of a UAV 1600 that includes an open cargo bay 1620 formed by a cavity within the fuselage body 1615 of the UAV 1600. The cargo bay 1620 is referred to as open, in that the cargo bay 1620 does not include a door for closing the lower access opening 1622 of the fuselage of the UAV 1600. For example, the UAV 1600 is configured to fly while the lower access opening 1622 is open and accessible. In order to prevent drag associated with the low pressure associated with the opening to the cargo bay 1620, the UAV includes an aerodynamic feature 1660 positioned along the front edge of the lower access opening 1622. In UAV 1600, the aerodynamic feature 1660 is in the form of a ramp 1662 that is angled downward with respect to the lower surface of the fuselage. In some embodiments, the ramp has an angle in a range of 1° to 20°, such as about 1°, about 2°, about 3°, about 5°, about 8°, about 10°, about 15° or about 20°. The ramp may assist in directing airflow over the open lower access opening 1622.

Figure 34:
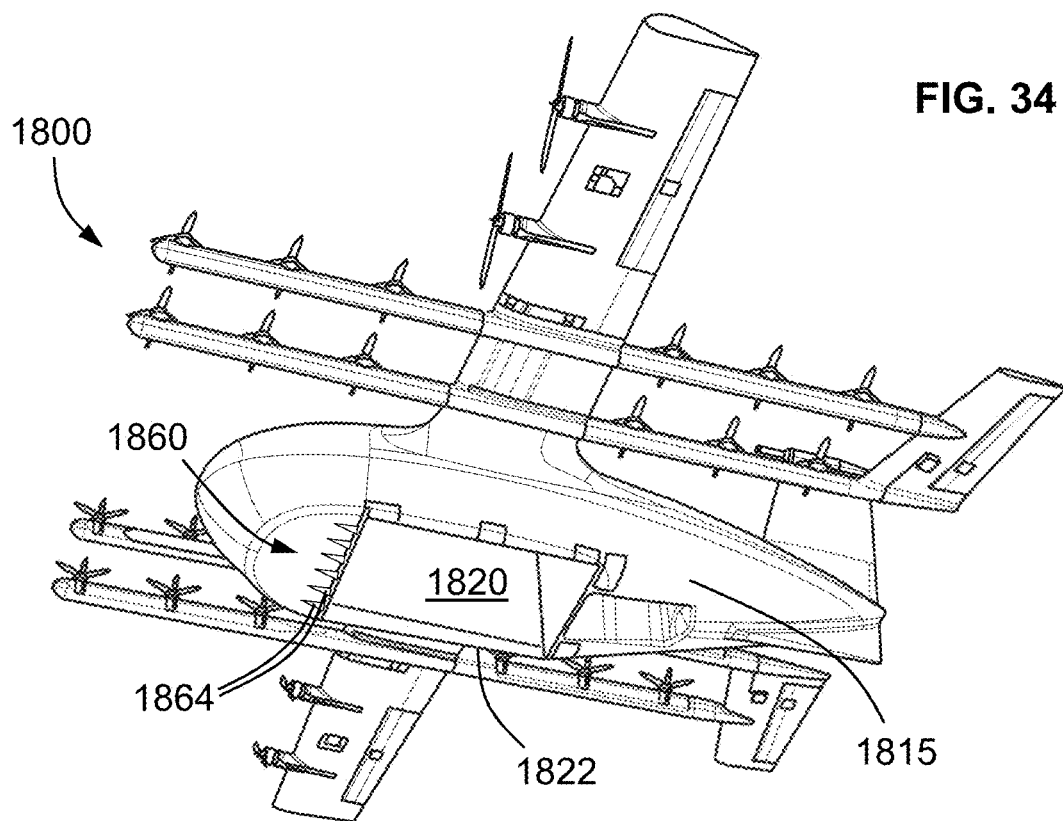
FIG. 34 is a perspective button view of another UAV 1800 with an open cargo bay 1820.

In other embodiments, the aerodynamic feature may have another configuration. For example, FIG. 34 shows a UAV 1800 that includes an open cargo bay 1820 formed within the fuselage body 1815. The outer surface of the fuselage body 1815 includes an aerodynamic feature 1860 along the front edge of the lower access opening 1822. The aerodynamic feature 1860 is formed by a plurality of vortex generators 1864 that are positioned in front of the open cargo bay 1820 with respect to the air flow during flight. The vortex generators 1864 may be configured to mix the air within the boundary layer with the surrounding higher energy air so that the air flow can extend past the open cargo bay 1820 and avoid extensive drag caused by the low pressure open cargo bay. Further, in some embodiments, the aerodynamic feature may include a plurality of turbulators positioned along the front edge of the lower access opening.

Figure 35:
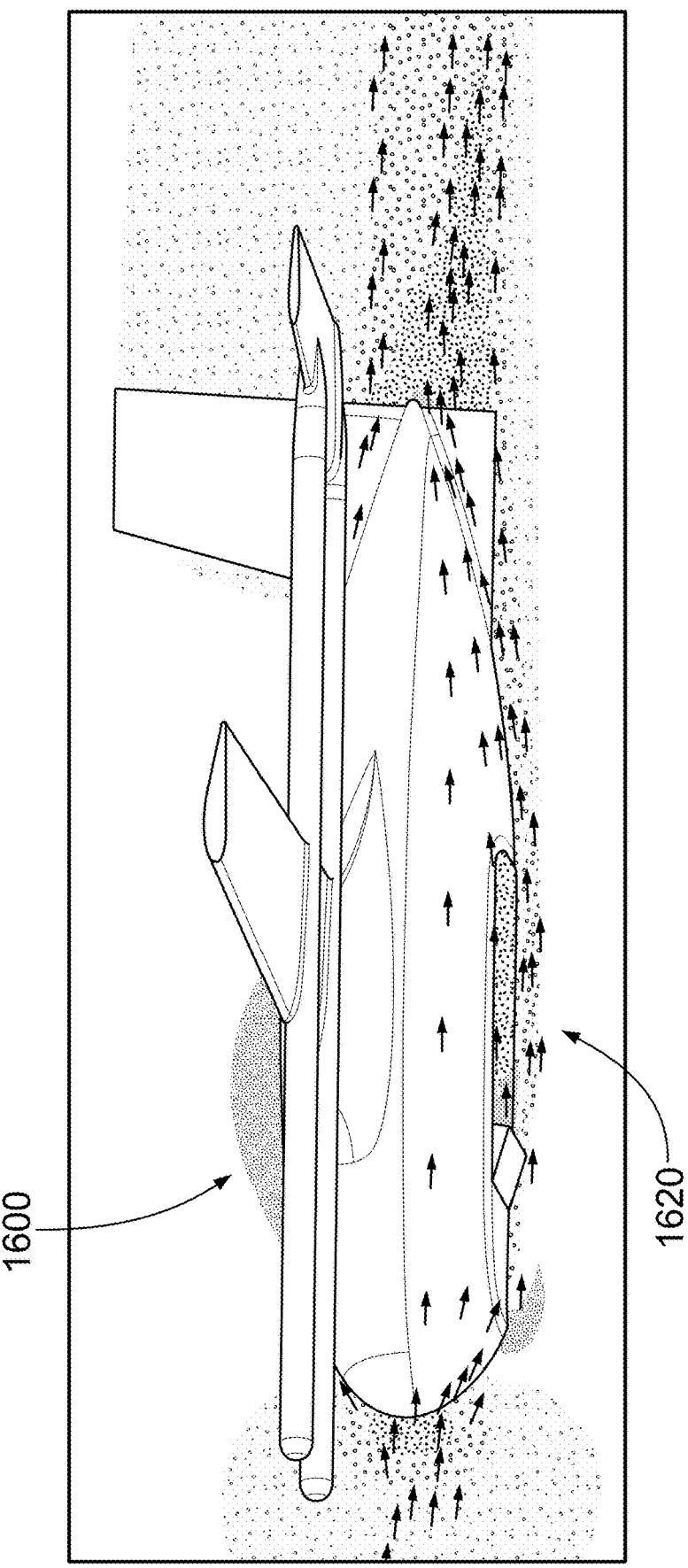
FIG. 35 is a side view showing the air flow dynamics around the fuselage of the UAV 1600.

FIG. 35 illustrates the airflow around the UAV 1600 while the UAV 1600 is in a forward flight mode. The ramp positioned along the front edge of the open cargo bay 1620 directs the airflow under the open cargo bay 1620 so that the low pressure within the cargo bay 1620 does not cause large disturbances in the airflow that lead to increased drag.

Figure 36A:
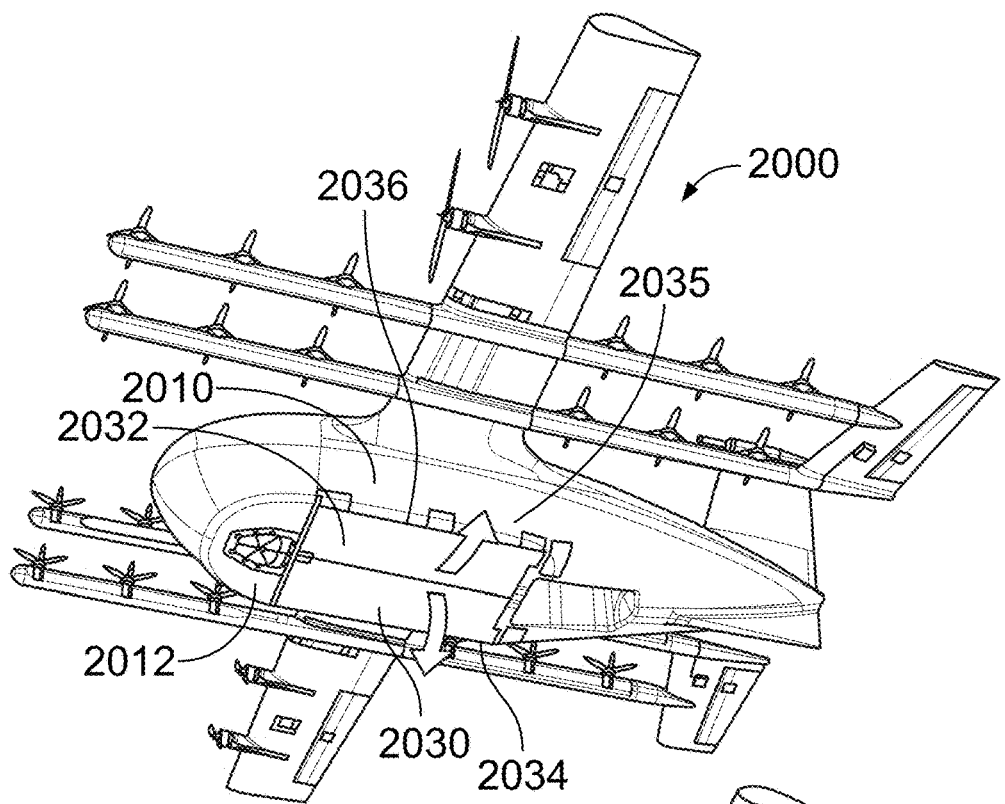
FIG. 36A is a perspective bottom view of UAV 2000 with cargo bay doors 2030 and 2032 in a closed position on bottom surface 2012 of fuselage 2010.
Figure 36B:
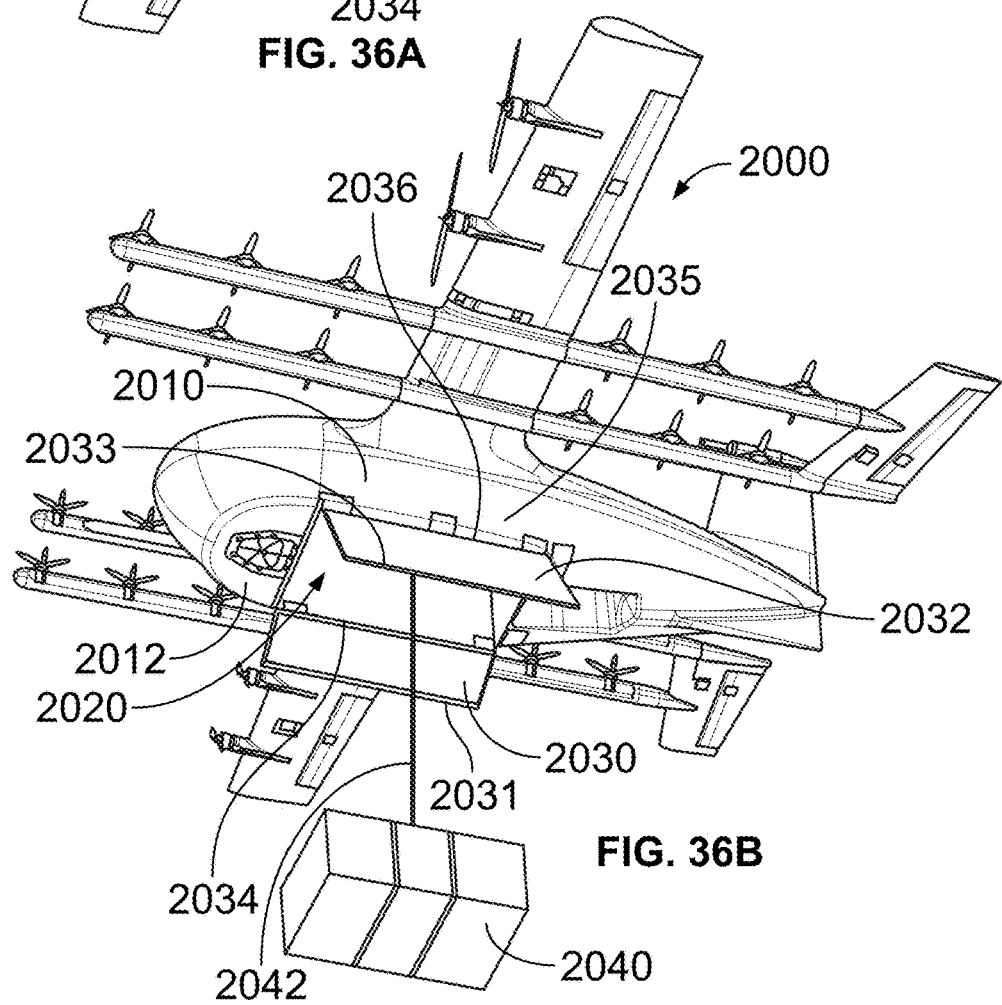
FIG. 36B is a perspective bottom view of UAV 2000 with cargo bay doors 2030 and 2032 in an open position on bottom surface 2012 of fuselage 2010.

FIG. 36A is a perspective bottom view of UAV 2000 with cargo bay doors 2030 and 2032 in a closed position on bottom surface 2012 of fuselage 2010, FIG. 36B is a perspective bottom view of UAV 2000 with cargo bay doors 2030 and 2032 in an open position on bottom surface 2012 of fuselage 2010. The UAV 2000 is designed to carry a large payload 2040 within a cavity within the fuselage 2010 that provides a cargo bay 2020. Cargo bay 2020 may accommodate a payload 2040 having a weight of 3 kg or more including payload 2040 and its contents. In a preferred embodiment, cargo bay 2020 may accommodate a payload having the dimensions of 315 mm×197 mm×445 mm, or larger. The payload 2040 is secured to and suspended from a first end of tether 2042, and a second end of tether 2042 is attached to a winch system positioned within the fuselage 2010 of UAV 2100.

FIG. 36A shows first cargo bay door 2030 and second cargo bay door 2032 in a closed position on bottom surface 2012 of fuselage 2010 to block access to cargo bay 2020. A first edge of first cargo bay door 2030 is rotatably attached to bottom surface 2012 with first longitudinal hinge 2034, and a first edge of second cargo bay door 2032 is rotatably attached to bottom surface 2012 with second longitudinal hinge 2036. First longitudinal hinge 2034 is positioned at an intersection between side 2035 of fuselage 2010 and bottom surface 2012 of fuselage 2010, and second longitudinal hinge 2036 is attached at an intersection of an opposite side of fuselage 2010 from side 2035. FIG. 36B shows first cargo bay door 2030 and second cargo bay door 2032 in an open position such that tether 2042 may be used to lower payload 2040 through a lower access opening in cargo bay 2020 to a landing site. In the open position, a second edge 2031 of first cargo bay door 2030 extends downwardly and a second edge 2033 of second cargo bay door 2032 extends downwardly.

The first cargo bay door 2030 and second cargo bay door 2032 may advantageously be opened and closed using a motor, such as a servo motor. With a servo motor, the cargo bay doors may be direct driven, geared, or use a leveraged linkage. A servo motor, gear, linear or rotary actuator etc. may be used to move the leveraged linkage to open and close the doors. A single servo motor may be used to open and close both of the cargo bay doors. Alternately, there may be cases to use two redundant servo motors, one for each cargo bay door. The servo motor(s) (or other types of actuators) may be located fore or aft of the cargo bay and may be located fore or aft of bulkheads of the cargo bay. In addition, the servo motor(s) may include a cam to open the cargo bay door(s) and the cargo bay doors may be sprung closed, to allow for a fail close situation in case of a failure of the servo motor(s). For example, an oblong cam be secured to a linkage mechanism in an offset manner, where upon movement of the cam 90 degrees, the linkage mechanism may be moved to open and close the cargo bay doors. In addition, a servo motor (or other actuator) may be used to actuate the bottom cargo bay doors using a linkage mechanism. However, by moving the rack of the linkage mechanism upwards, it is possible to check to see if the cargo bay door(s) is successfully latched and the upper portion of the cargo bay may be propped open slight to provide an indication that the UAV is ready for a payload to be loaded. A cargo bay door monitor may be used to determine whether the payload 2040 is applying a weight to first cargo bay door 2030 and/or second cargo bay door 2032, which may provide an indication that the payload 2040 is no longer secured to the first end of tether 2042 and/or the tether 2042 has lowered the payload 2040 onto the cargo bay doors 2030 and/or 2032. The cargo bay door monitor may be in the form of measuring a current of the motor (which may be a servo motor), such that a rise in the current of the motor may provide the indication that the payload 2040 is applying weight to the first cargo bay door 2030 and/or second cargo bay door 2032, and therefore payload 2040 may no longer be suspended from or secured to tether 2042 and/or the tether 2042 has lowered the payload 2040 onto the cargo bay doors 2030 and 2032. The first cargo bay door 2030 and/or second cargo bay door 2032 may also extend inwardly into the cargo bay 2020 to determine whether the payload 2040 is positioned within the cargo bay. In this regard, if payload 2040 is positioned within cargo bay 2020, second edge 2031 of first cargo bay door 2030 and/or second edge 2033 of second cargo bay door 2032 will contact the payload 2040, resulting in a rise in the current of the motor, thereby providing an indication that payload 2040 is positioned within cargo bay 2020. The cargo bay door monitor may also take other forms such as a strain gauge on the cargo bay door, or an optical sensor such as a laser. Other sensors may also be used such as a contact switch or a limit switch which can provide for a low-cost payload presence monitor.

The cargo bay door may include a latch which can be monitored to ensure that the cargo bay door is in a closed position. The latch may take multiple forms including a pin driven by a servo motor where the pin which can retain one cargo bay door which may overlap a second cargo bay door such that the one cargo bay door retains the second cargo bay door in a closed position. Alternately, a linear or rotary actuator, rather than a servo motor, may be used to drive the pin to retain the cargo bay doors in a closed position. In addition, a passive sprung latch could be used that allows for the cargo bay door(s) to passively close, but would require actuation to open the cargo bay doors. An electrical contact on a lip or switch may be used to monitor whether the cargo bay door(s) are open or closed. A slant cut latch pin may be used to detect loading on the cargo bay door(s). If the cargo bay doors are loaded enough, the motor (which may be a servo motor) may provide force feedback to keep the cargo bay door(s) in a closed position. In addition to using a motor, or servo motor, a lead screw, linear actuator, wire, or hydraulic or pneumatic cylinders may also be used to open and close the cargo bay door(s).

The cargo bay door may take various configurations other than that shown in FIGS. 36A and 36B. Different configurations of the cargo bay door(s) are illustrated in FIGS. 37A-43B described below. The cargo bay door monitor described above may be used in each of the embodiments shown in FIGS. 37A-43B, and operate in the same manner as described above.

Figure 37A:
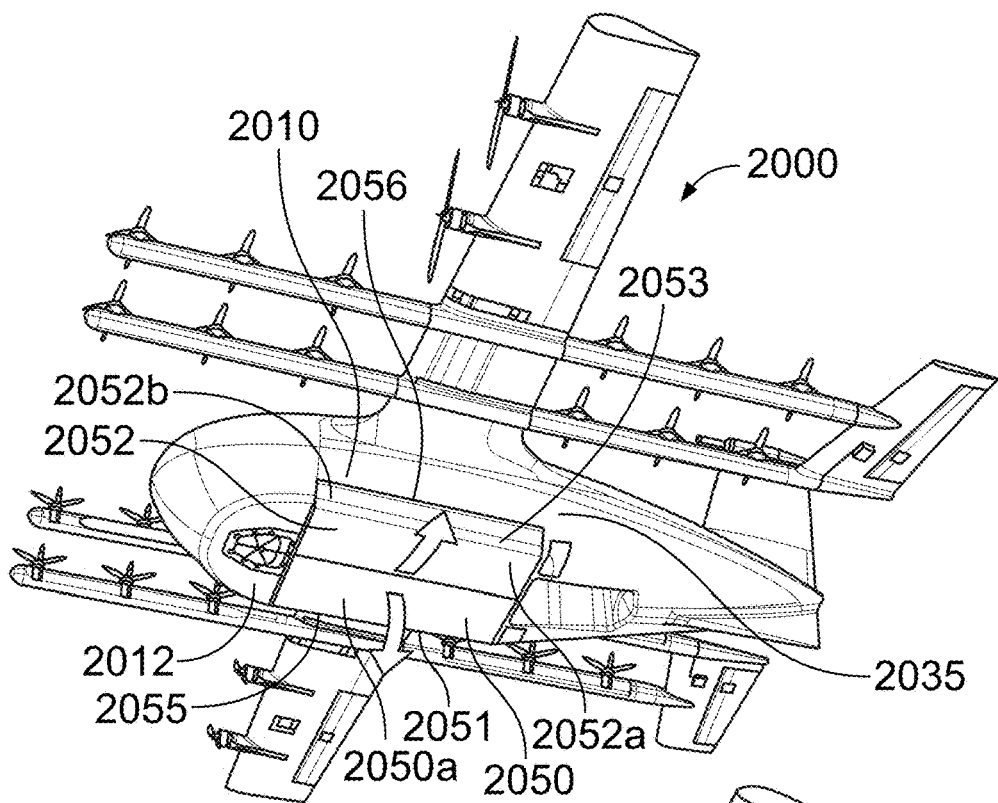
FIG. 37A is a perspective bottom view of UAV 2000 with cargo bay doors 2050 and 2052 in a closed position on bottom surface 2012 of fuselage 2010.
Figure 37B:
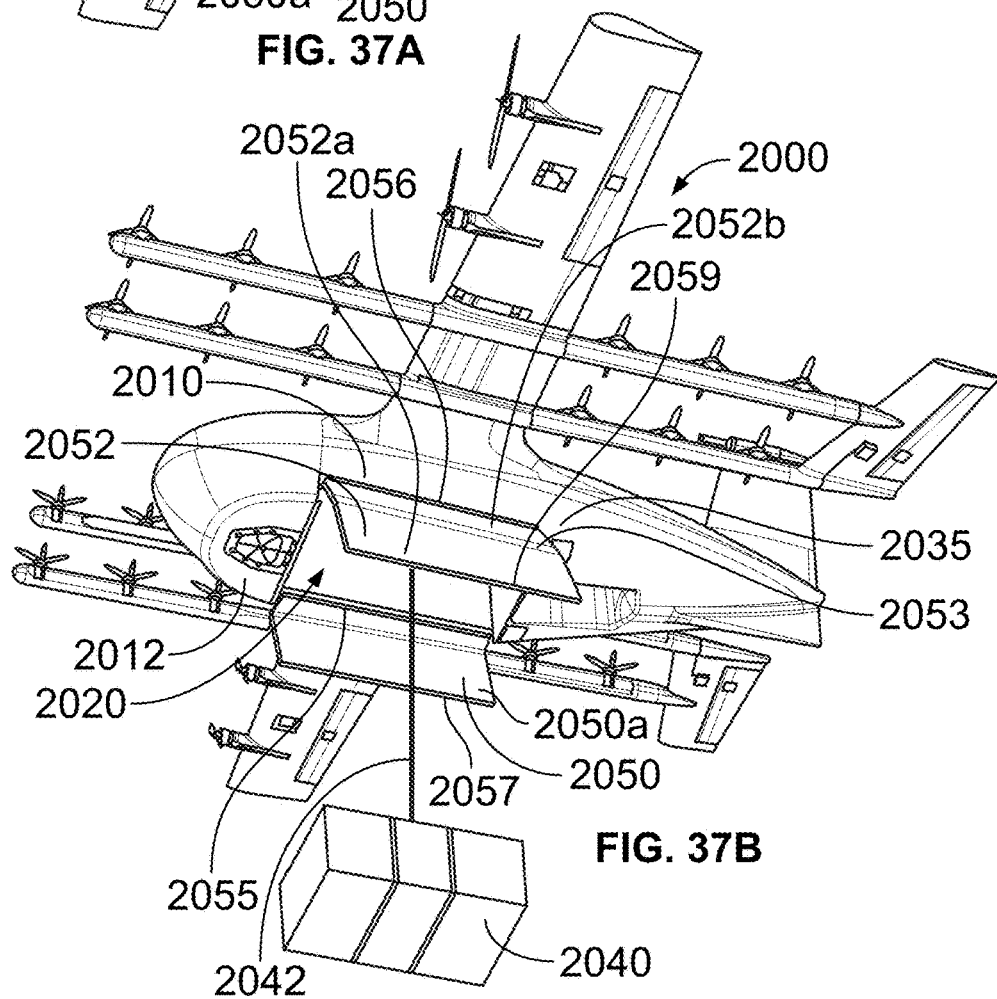
FIG. 37B is a perspective bottom view of UAV 2000 with cargo bay doors 2050 and 2052 in an open position on bottom surface 2012 of fuselage 2010.

FIG. 37A is a perspective bottom view of UAV 2000 with cargo bay doors 2050 and 2052 in a closed position on bottom surface 2012 of fuselage 2010, and FIG. 37B is a perspective bottom view of UAV 2000 with cargo bay doors 2050 and 2052 in an open position on bottom surface 2012 of fuselage 2010. FIG. 37A shows first cargo bay door 2050 and second cargo bay door 2052 in a closed position on bottom surface 2012 of fuselage 2010 to block access to cargo bay 2020. A first edge of second cargo bay door 2052 is rotatably attached to side 2035 of fuselage 2010 with second longitudinal hinge 2056, and a first edge of first cargo bay door 2050 is rotatably attached to an opposite side of fuselage 2010 from side 2035 with a first longitudinal hinge. FIG. 37B shows first cargo bay door 2050 and second cargo bay door 2052 in an open position such that tether 2042 may be used to lower payload 2040 through a lower access opening in cargo bay 2020 to a landing site. In the open position, a second edge 2057 of first cargo bay door 2050 extends downwardly and a second edge 2059 of second cargo bay door 2052 extends downwardly.

First cargo bay door 2050 includes a first section 2050a hingedly attached to a second section allowing cargo bay door 2050 to swing wide open when in the open position shown in FIG. 37B. Similarly, second cargo bay door 2052 includes a first section 2052a hingedly attached to a second section 2052b allowing cargo bay door 2052 to swing wide open when in the open position shown in FIG. 37B. The first and second sections of the first and second cargo bay doors 2050 and 2052 may be hingedly attached to each other using a living hinge.

Figure 38A:
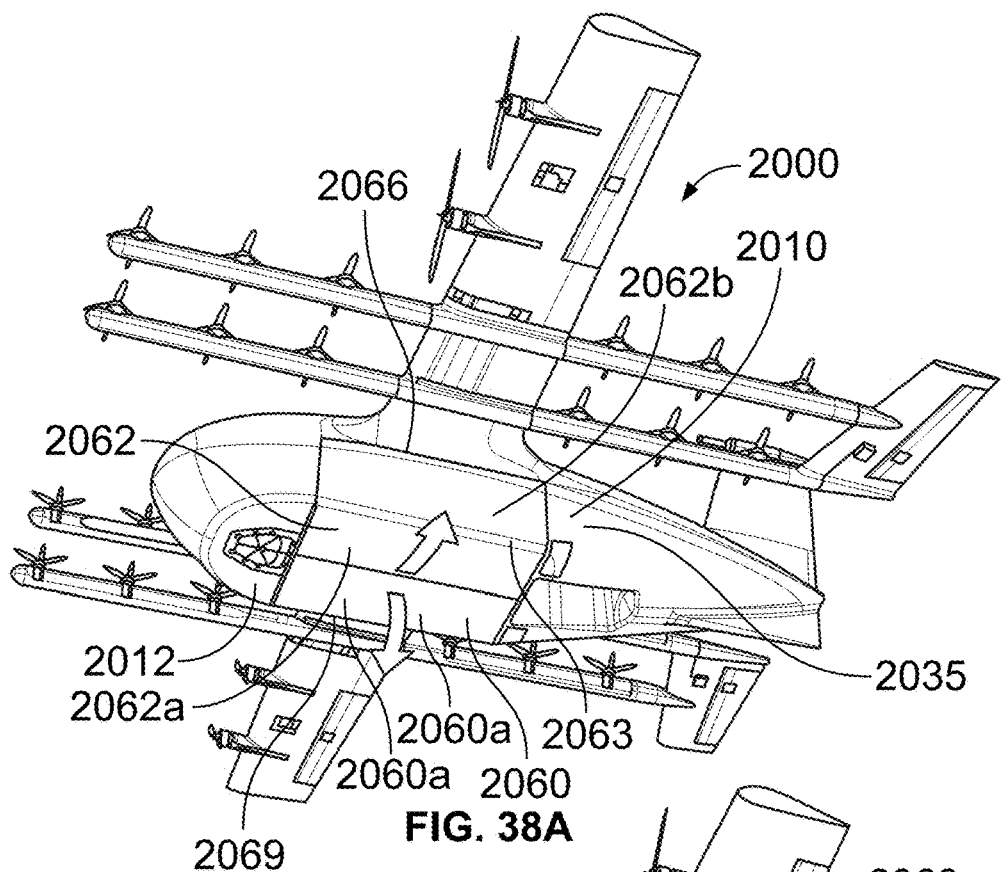
FIG. 38A is a perspective bottom view of UAV 2000 with cargo bay doors 2060 and 2062 in a closed position on bottom surface 2012 of fuselage 2010.
Figure 38B:
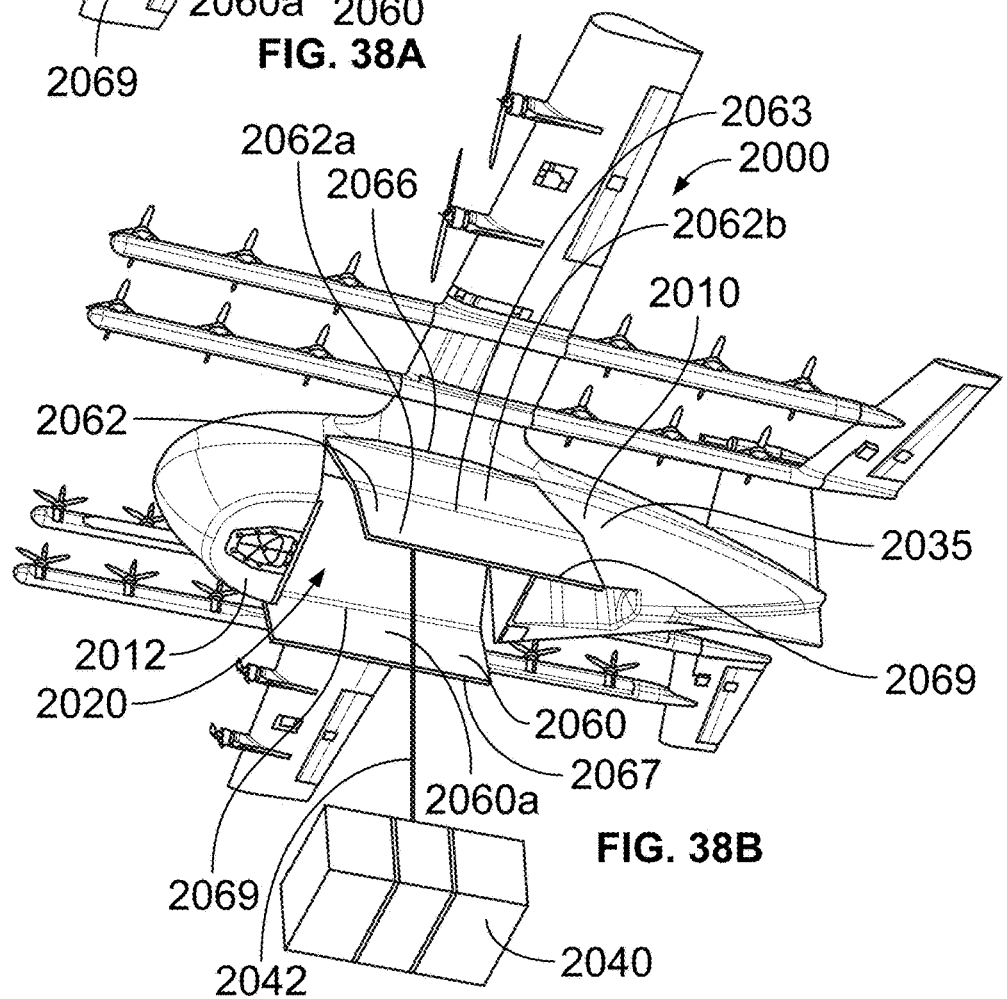
FIG. 38B is a perspective bottom view of UAV 2000 with cargo bay doors 2060 and 2062 in an open position on bottom surface 2012 of fuselage 2010.

FIG. 38A is a perspective bottom view of UAV 2000 with cargo bay doors 2060 and 2062 in a closed position on bottom surface 2012 of fuselage 2010, and FIG. 38B is a perspective bottom view of UAV 2000 with cargo bay doors 2060 and 2062 in an open position on bottom surface 2012 of fuselage 2010. FIG. 38A shows first cargo bay door 2060 and second cargo bay door 2062 in a closed position on bottom surface 2012 of fuselage 2010 to block access to cargo bay 2020. A first edge of second cargo bay door 2062 is rotatably attached to side 2035 of fuselage 2010 with second longitudinal hinge 2066, and a first edge of first cargo bay door 2060 is rotatably attached to an opposite side of fuselage 2010 from side 2035 with a first longitudinal hinge. FIG. 368 shows first cargo bay door 2060 and second cargo bay door 2062 in an open position such that tether 2042 may be used to lower payload 2040 through a lower access opening in cargo bay 2020 to a landing site. In the open position, a second edge 2067 of first cargo bay door 2060 extends downwardly and a second edge 2069 of second cargo bay door 2062 extends downwardly. The first and second longitudinal hinges used attached to first cargo bay door 2060 and second cargo bay door 2062 are positioned higher up on the sides of the fuselage than in FIGS. 37A and 37B.

First cargo bay door 2060 includes a first section 2060a hingedly attached to a second section allowing cargo bay door 2060 to swing wide open when in the open position shown in FIG. 37B. Similarly, second cargo bay door 2062 includes a first section 2062a hingedly attached to a second section 2062b allowing cargo bay door 2062 to swing wide open when in the open position shown in FIG. 38B. The first and second sections of the first and second cargo bay doors 2060 and 2062 may be hingedly attached to each other using a living hinge.

Figure 39A:
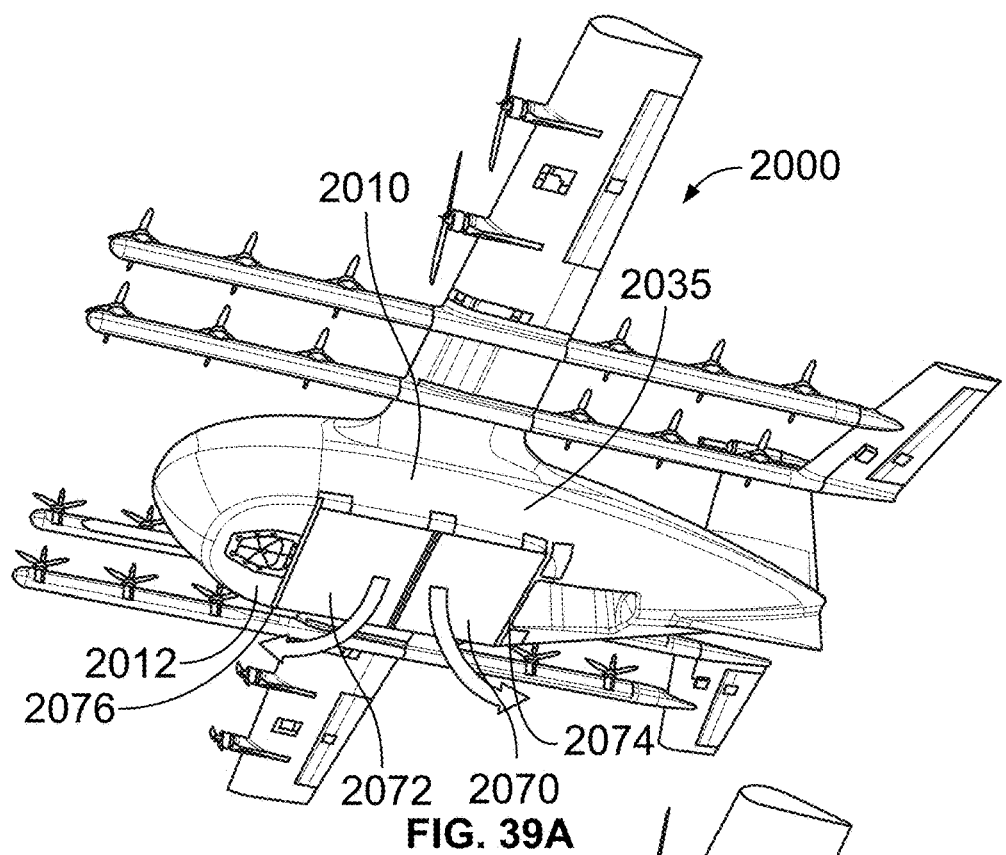
FIG. 39A is a perspective bottom view of UAV 2000 with cargo bay doors 2070 and 2072 in a closed position on bottom surface 2012 of fuselage 2010.
Figure 39B:
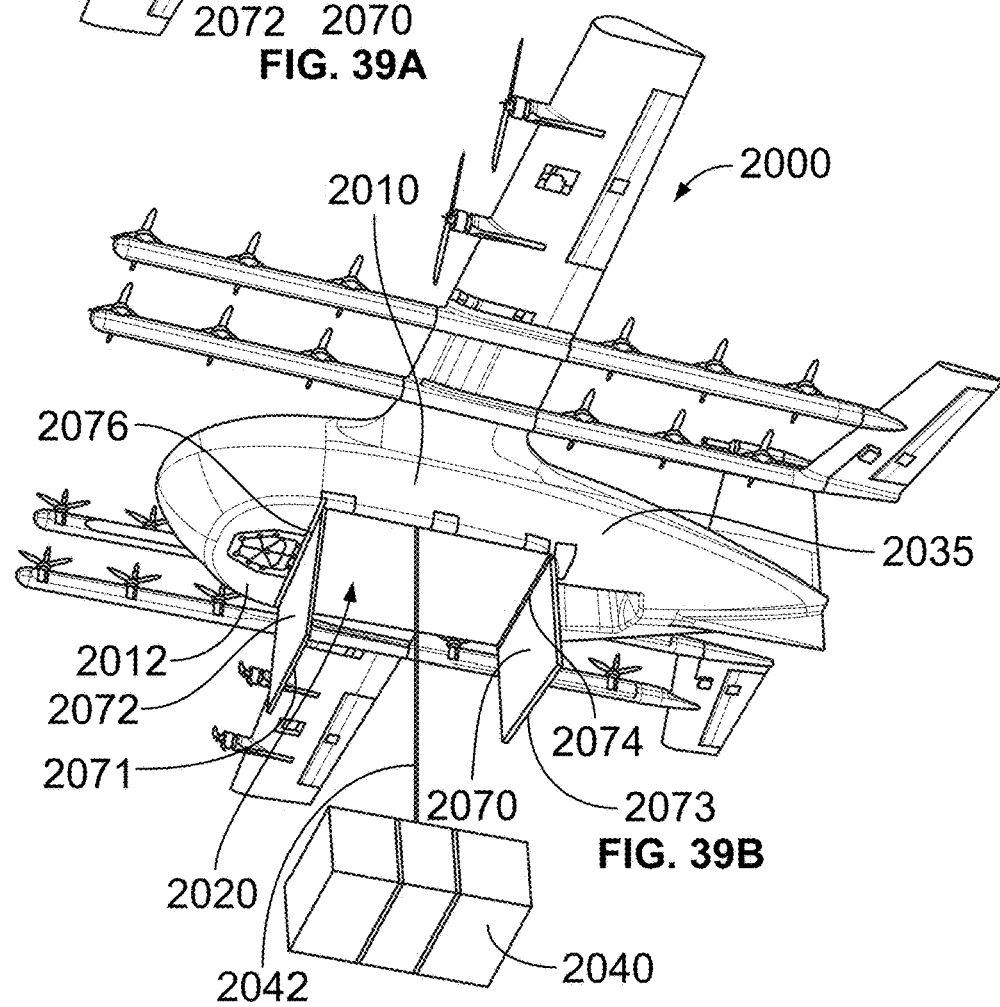
FIG. 39B is a perspective bottom view of UAV 2000 with cargo bay doors 2070 and 2072 in an open position on bottom surface 2012 of fuselage 2010.

FIG. 39A is a perspective bottom view of UAV 2000 with cargo bay doors 2070 and 2072 in a closed position on bottom surface 2012 of fuselage 2010, and FIG. 39B is a perspective bottom view of UAV 2000 with cargo bay doors 2070 and 2072 in an open position on bottom surface 2012 of fuselage 2010. FIG. 39A shows first cargo bay door 2070 and second cargo bay door 2072 in a closed position on bottom surface 2012 of fuselage 2010 to block access to cargo bay 2020. A first edge of first cargo bay door 2070 is rotatably attached to bottom surface 2012 with first lateral hinge 2074, and a first edge of second cargo bay door 2072 is rotatably attached to bottom surface 2012 with second lateral hinge 2076. FIG. 39B shows first cargo bay door 2070 and second cargo bay door 2072 in an open position such that tether 2042 may be used to lower payload 2040 through a lower access opening in cargo bay 2020 to a landing site. In the open position a second edge 2071 of first cargo bay door 2070 extends downwardly and a second edge 2073 of second cargo bay door 2072 extends downwardly.

Figure 40A:
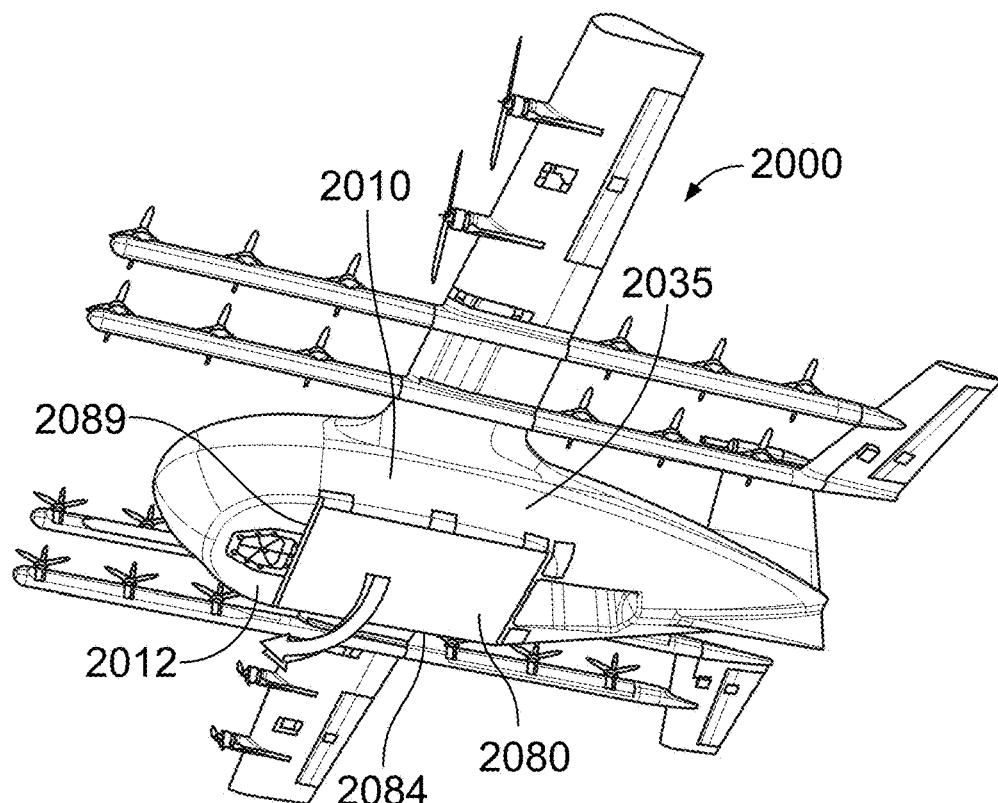
FIG. 40A is a perspective bottom view of UAV 2000 with cargo bay door 2080 in a closed position on bottom surface 2012 of fuselage 2010.
Figure 40B:
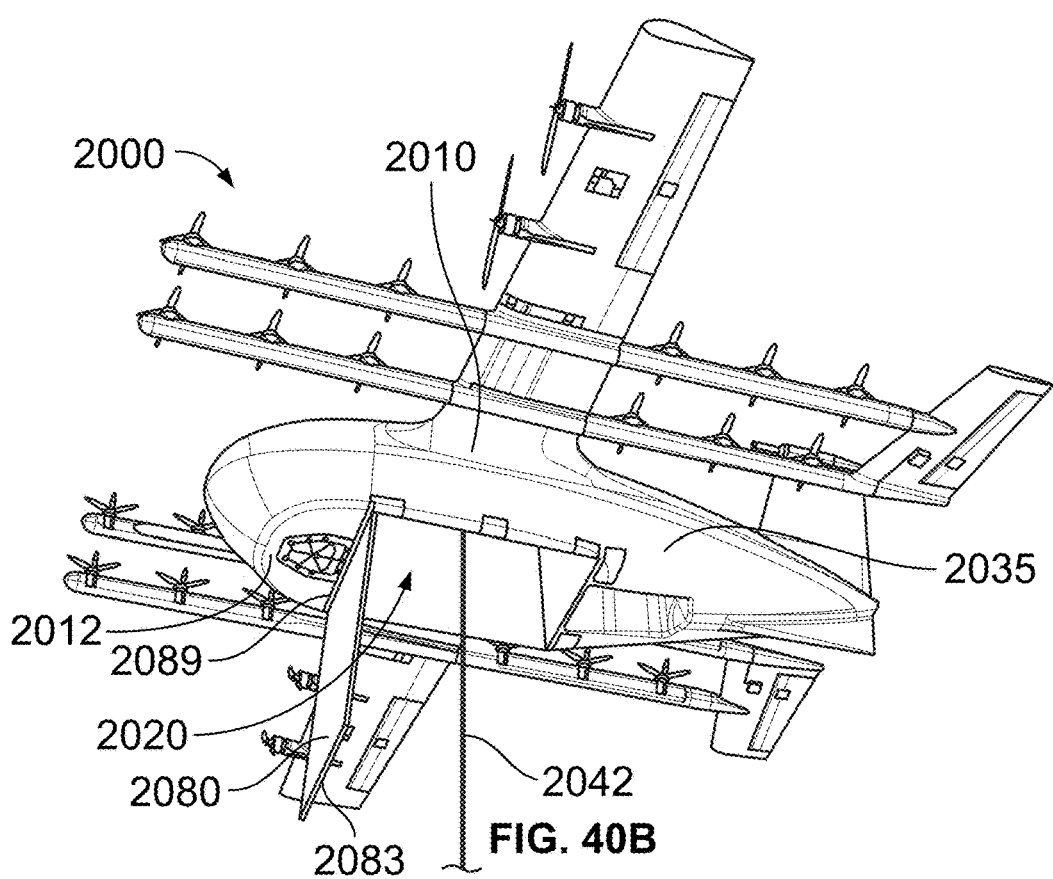
FIG. 40B is a perspective bottom view of UAV 2000 with cargo bay door 2080 in an open position on bottom surface 2012 of fuselage 2010.
Figure 40C:
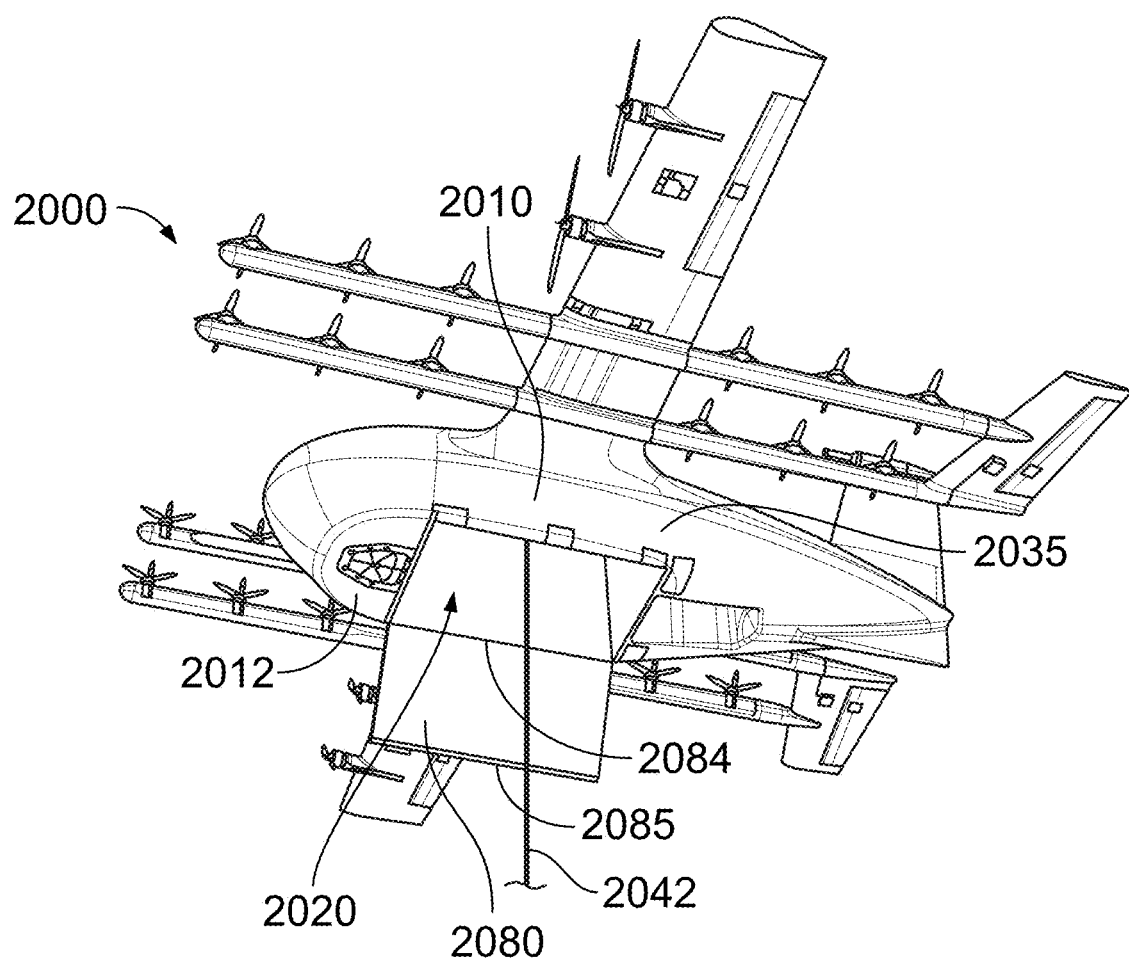
FIG. 40C is a perspective bottom view of UAV 2000 with cargo bay door 2080 in an open position on bottom surface 2012 of fuselage 2010.

FIG. 40A is a perspective bottom view of UAV 2000 with cargo bay door 2080 in a closed position on bottom surface 2012 of fuselage 2010, FIG. 40B is a perspective bottom view of UAV 2000 with cargo bay door 2080 in an open position on bottom surface 2012 of fuselage 2010, and FIG. 40C is a perspective bottom view of UAV 2000 with cargo bay door 2080 in an open position on bottom surface 2012 of fuselage 2010. FIG. 40A shows cargo bay door 2080 in a closed position on bottom surface 2012 of fuselage 2010 to block access to cargo bay 2020. A first edge of first cargo bay door 2070 is rotatably attached to bottom surface 2012 with lateral hinge 2084. FIG. 40B shows cargo bay door in an open position such that tether 2042 may be used to lower payload 2040 through a lower access opening in cargo bay 2020 to a landing site. In the open position, a second edge 2089 of cargo bay door 2080 extends downwardly. FIG. 40C shows cargo bay door 2080 in an open position such that tether 2042 may be used to lower payload 2040 through a lower access opening in cargo bay 2020 to a landing site. In the open position, a second edge 2085 of cargo bay door 2080 extends downwardly. In FIG. 40C cargo bay door 2080 is rotatably attached to bottom surface 2012 of fuselage 2010 with longitudinal hinge 2084 located at an intersection of a side of fuselage 2010 and bottom surface 2012 of fuselage 2010.

Figure 41A:
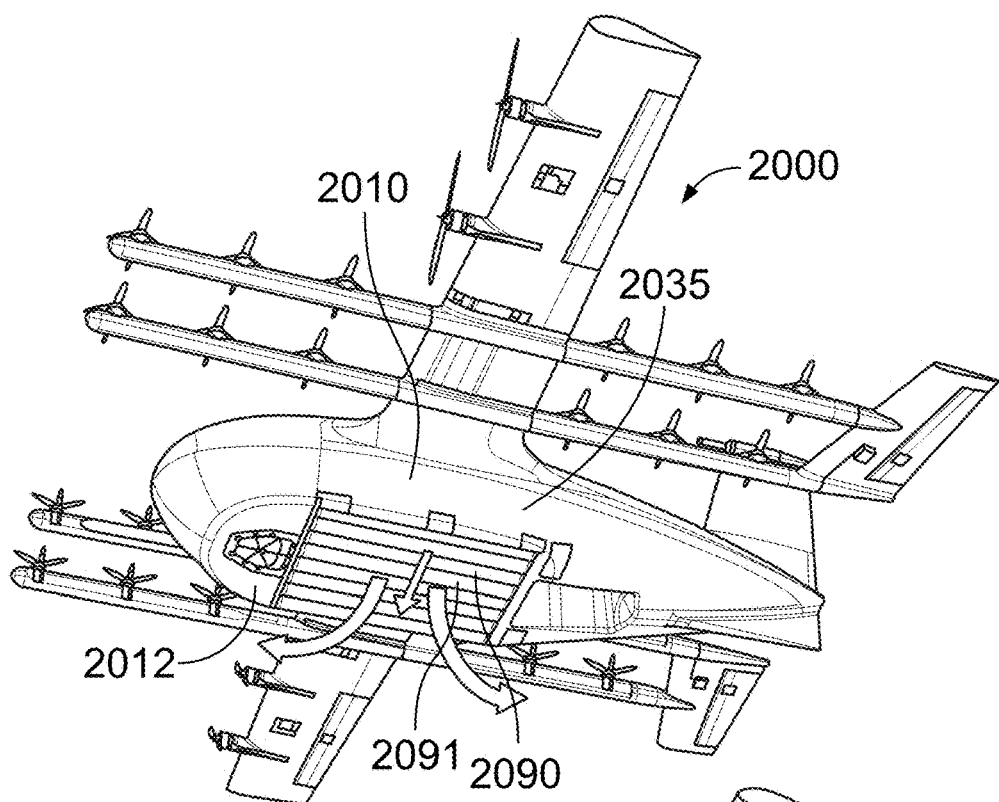
FIG. 41A is a perspective bottom view of UAV 2000 with cargo bay door 2090 in a closed position on bottom surface 2012 of fuselage 2010.
Figure 41B:
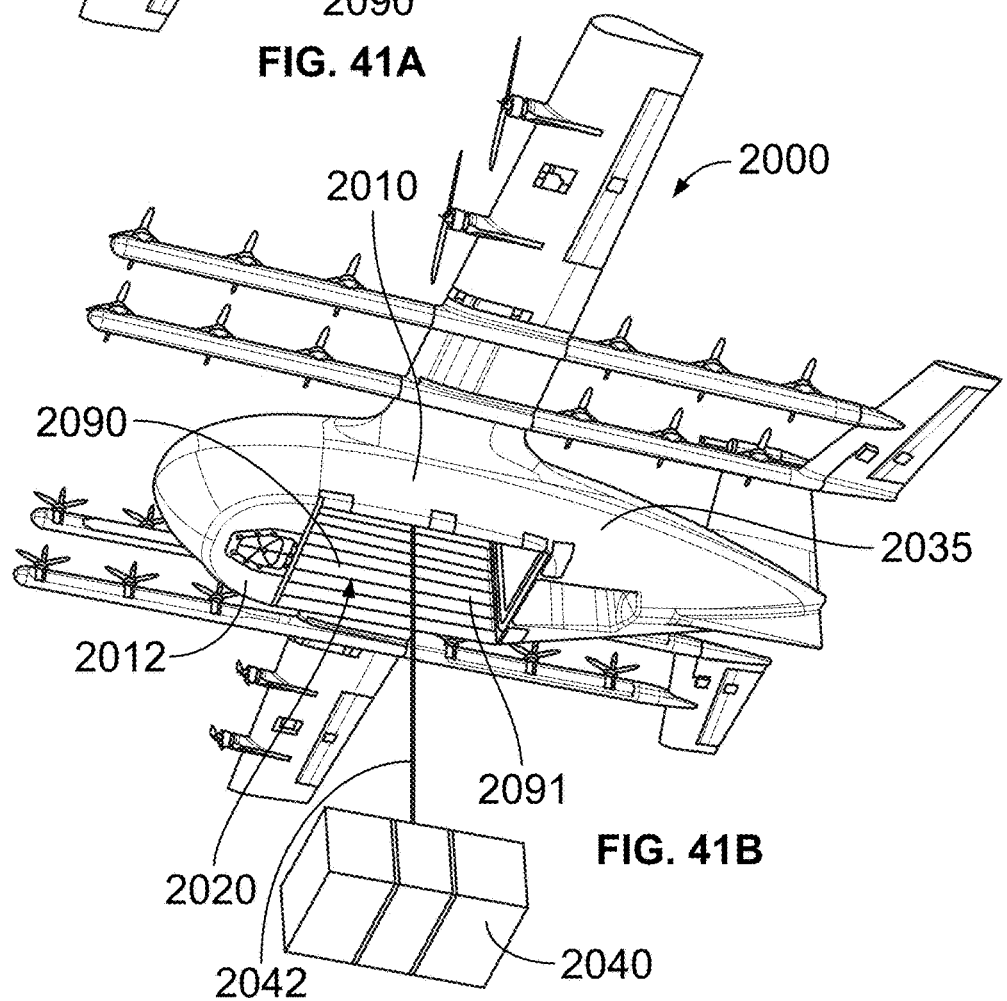
FIG. 41B is a perspective bottom view of UAV 2000 with cargo bay door 2090 in an open position on bottom surface 2012 of fuselage 2010.

FIG. 41A is a perspective bottom view of UAV 2000 with cargo bay door 2090 in a closed position on bottom surface 2012 of fuselage 2010, and FIG. 41B is a perspective bottom view of UAV 2000 with cargo bay door 2090 in an open position on bottom surface 2012 of fuselage 2010. Cargo bay door 2090 includes a plurality of slats 2091 that have a flexible connection to each other such that the cargo bay door 2090 can be moved upwardly into the cargo bay 2020 to open the lower access opening of cargo bay 2020, wherein payload 2040 may be lowered out of cargo bay 2020 and onto a landing site.

Figure 42A:
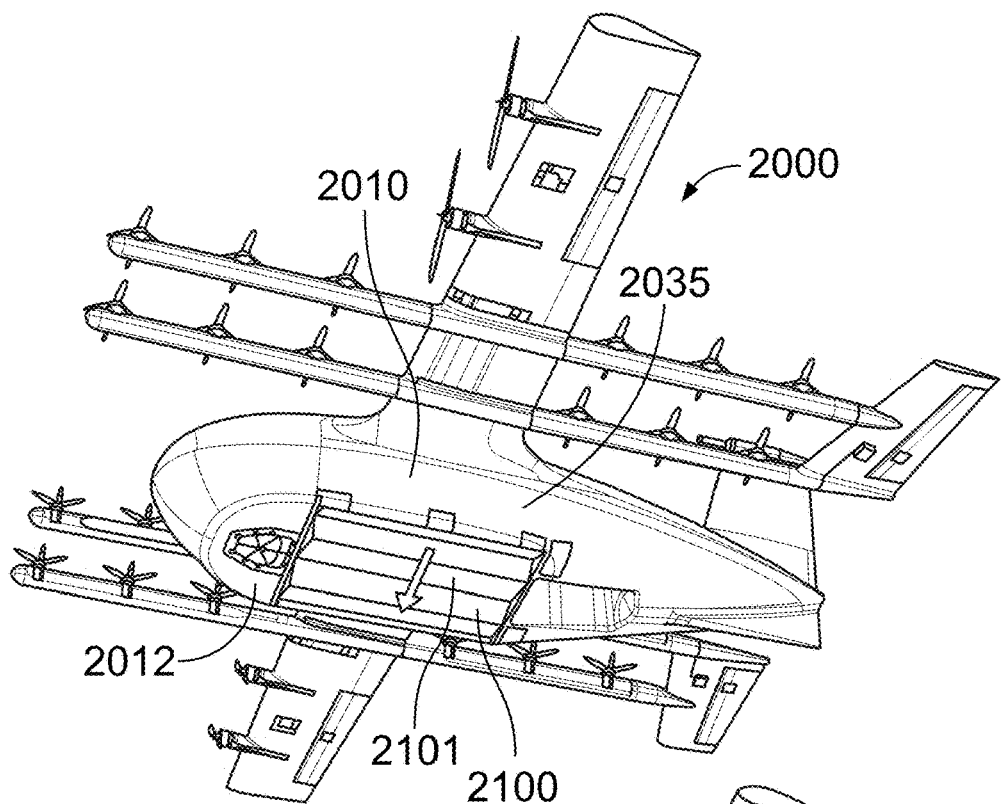
FIG. 42A is a perspective bottom view of UAV 2000 with cargo bay door 2100 in a closed position on bottom surface 2012 of fuselage 2010.
Figure 42B:
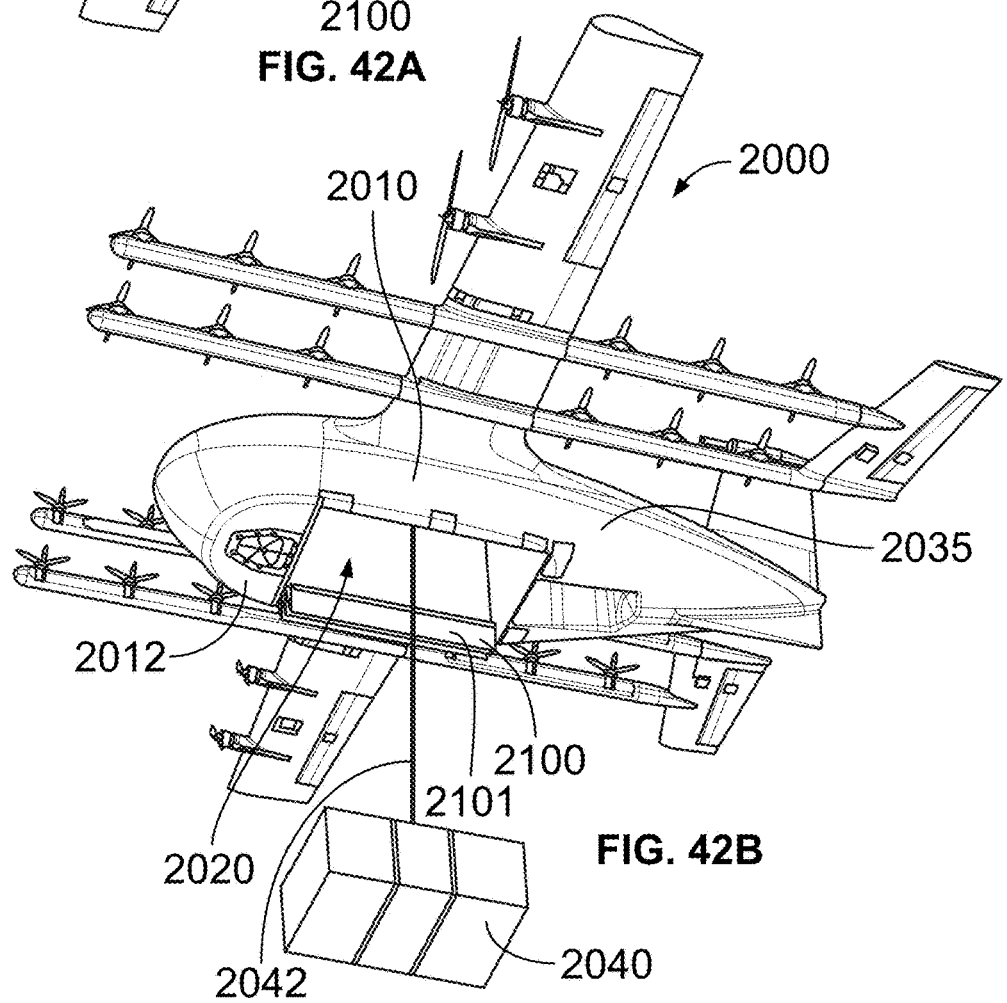
FIG. 42B is a perspective bottom view of UAV 2000 with cargo bay door 2100 in a folded up open position on bottom surface 2012 of fuselage 2010.

FIG. 42A is a perspective bottom view of UAV 2000 with cargo bay door 2100 in a closed position on bottom surface 2012 of fuselage 2010, FIG. 42B is a perspective bottom view of UAV 2000 with cargo bay door 2100 in a folded up open position on bottom surface 2012 of fuselage 2010. Cargo bay door 2100 has an edge attached longitudinally to bottom surface 2012 of fuselage 2010. Cargo bay door 2100 includes a plurality of slats 2101 that have a flexible connection to each other such that the cargo bay door 2100 can be folded up like an accordion to open the lower access opening of cargo bay 2020, wherein payload 2040 may be lowered out of cargo bay 2020 and onto a landing site.

Figure 43A:
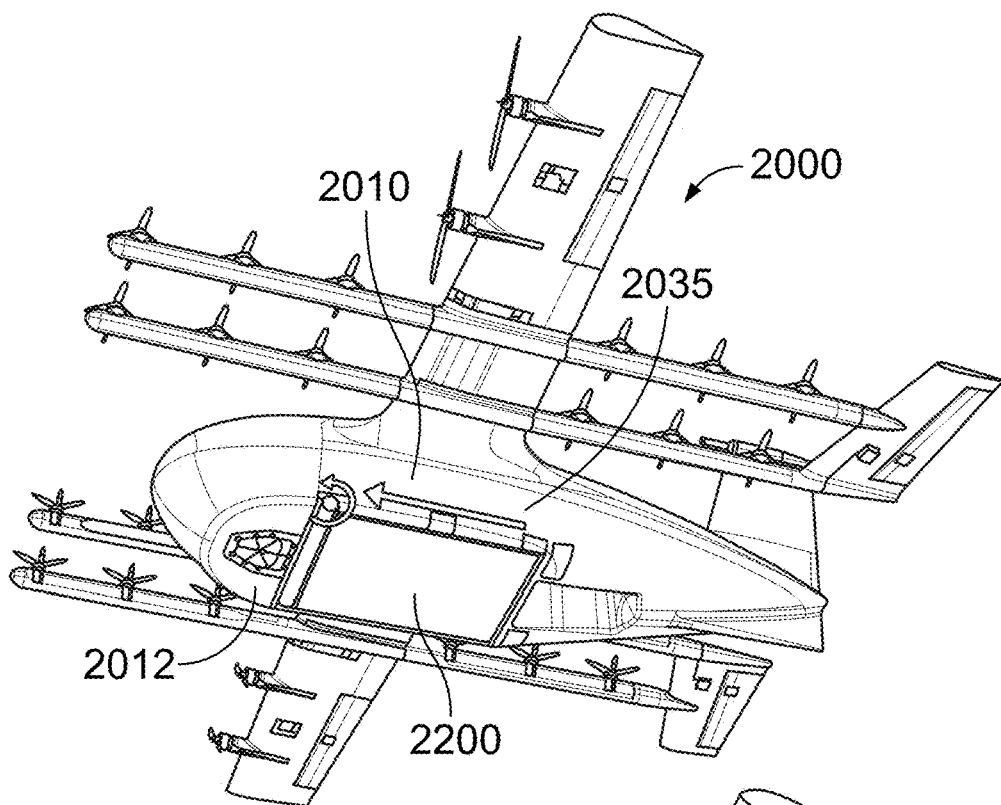
FIG. 43A is a perspective bottom view of UAV 2000 with cargo bay door 2200 in a closed position on bottom surface 2012 of fuselage 2010.
Figure 43B:
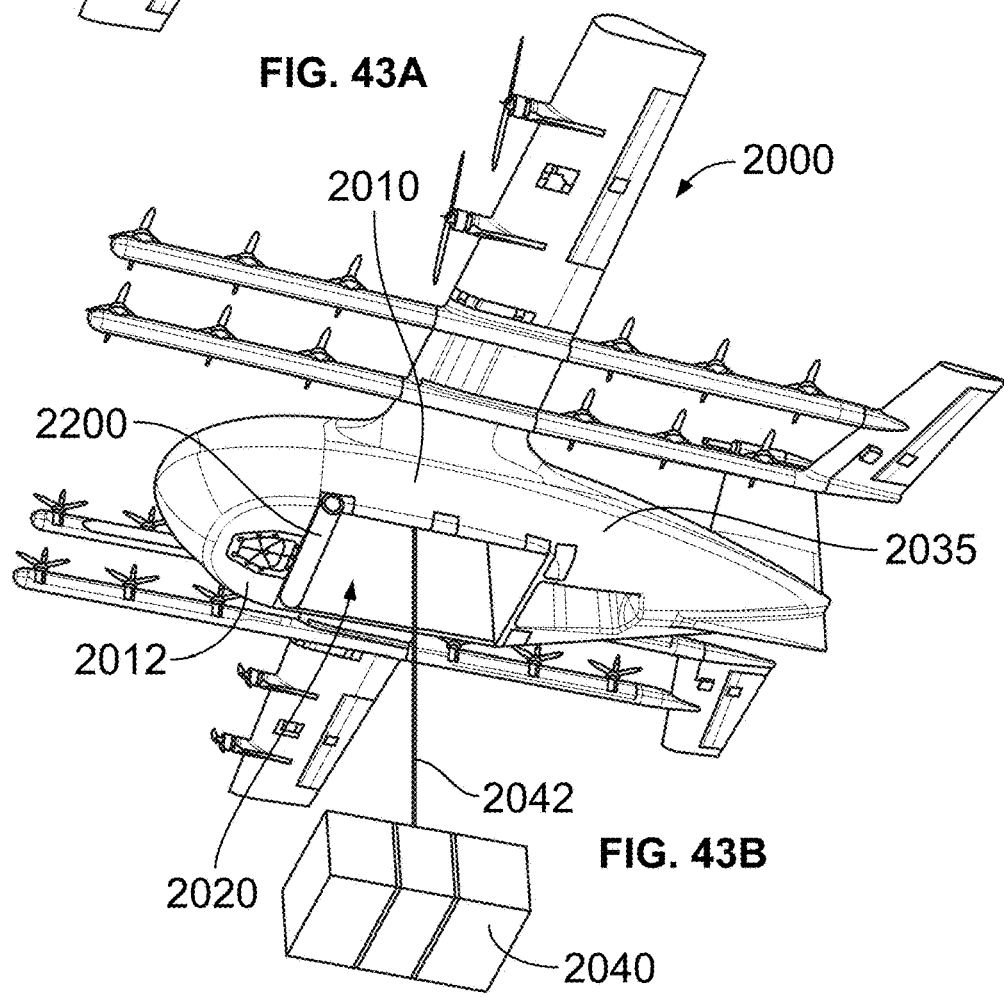
FIG. 43B is a perspective bottom view of UAV 2000 with cargo bay door 2100 in a rolled up open position on bottom surface 2012 of fuselage 2010.

FIG. 43A is a perspective bottom view of UAV 2000 with cargo bay door 2200 in a closed position on bottom surface 2012 of fuselage 2010, FIG. 43B is a perspective bottom view of UAV 2000 with cargo bay door 2100 in a rolled up open position on bottom surface 2012 of fuselage 2010. Cargo bay door 2200 has an edge attached laterally to bottom surface 2012 of fuselage 2010, although it could also be attached longitudinally to bottom surface 2012 of fuselage 2010. Cargo bay door 2200 is flexible and can be made of a fabric which can be rolled up to open the lower access opening of cargo bay 2020, wherein payload 2040 may be lowered out of cargo bay 2020 with tether 2042 and onto a landing site.

Figure 44A:
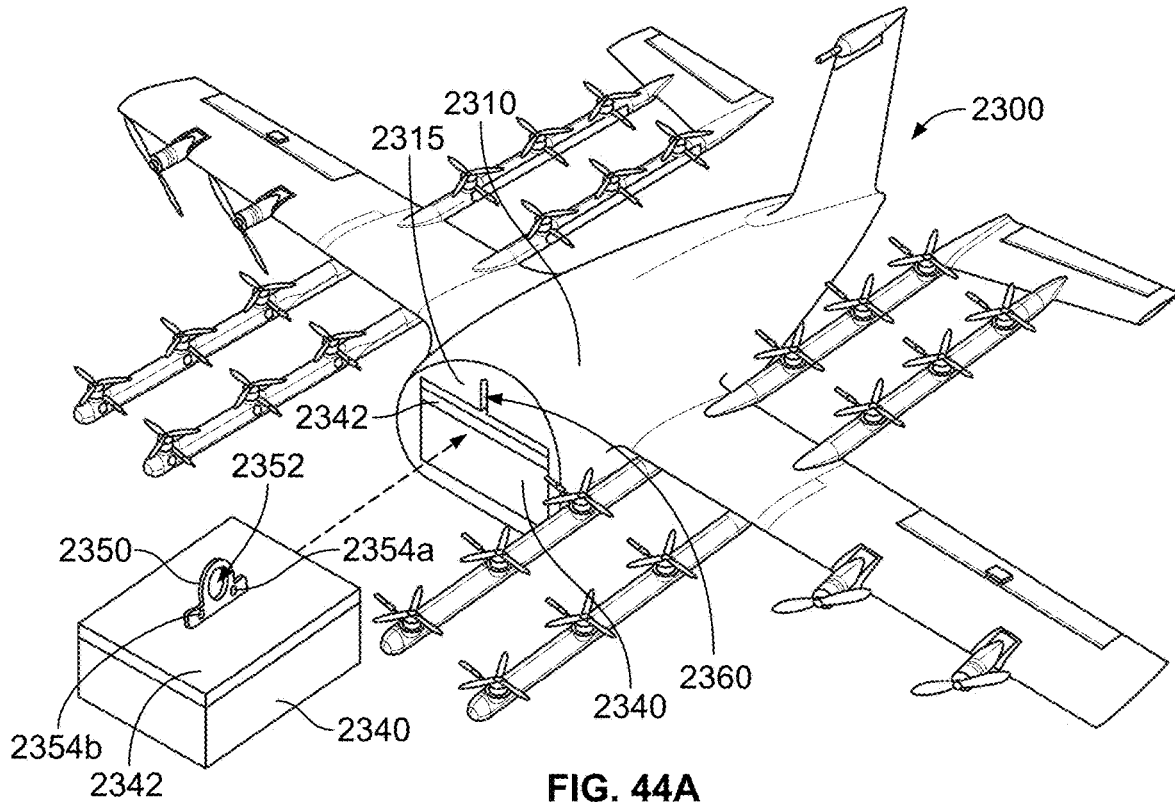
FIG. 44A is a perspective top view of UAV 2300 illustrating payload 2340 being inserted into fuselage body 2310 of UAV 2300.
Figure 44B:
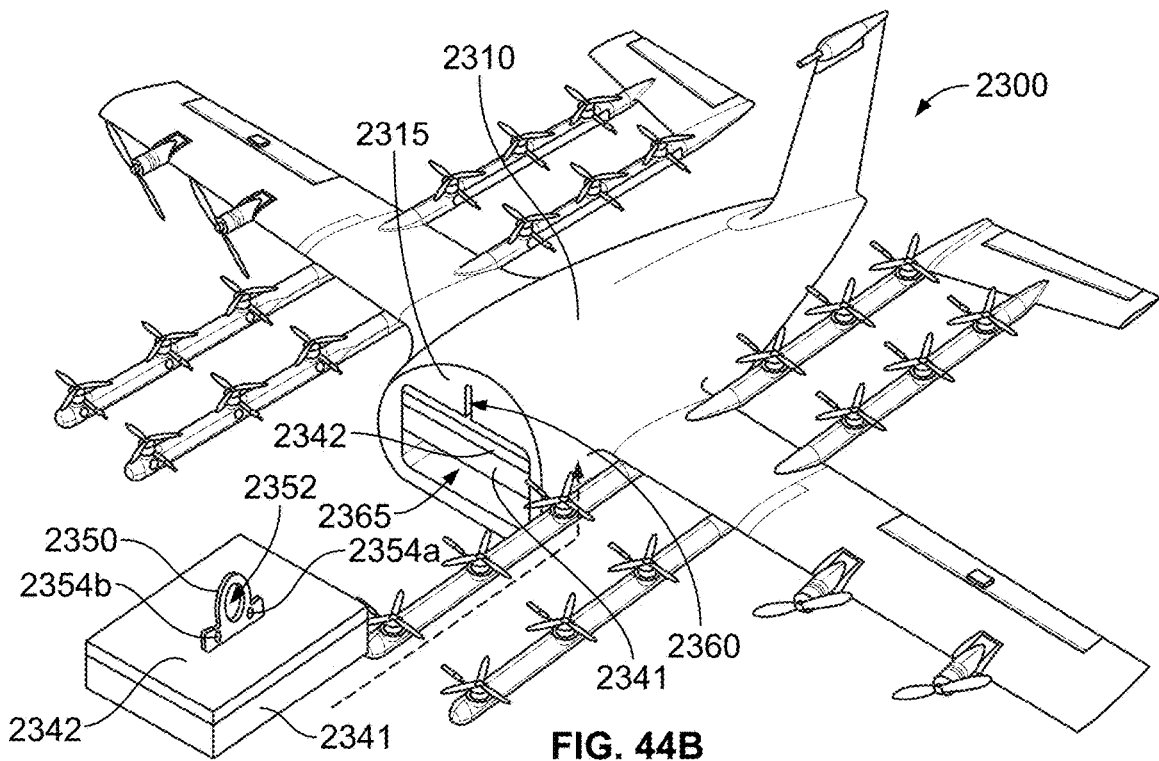
FIG. 44B is a perspective top view of UAV 2300 illustrating payload 2341 being inserted into cargo bay 2365 of fuselage body 2310 of UAV 2300.

FIG. 44A is a perspective top view of UAV 2300 illustrating payload 2340 being inserted into fuselage body 2310 of UAV 2300, and FIG. 44B is a perspective top view of UAV 2300 illustrating payload 2341 being inserted into cargo bay 2365 of fuselage body 2310 of UAV 2300. In FIGS. 44A and 44B, a nose section of UAV 2300 has been removed from fuselage body 2310 allowing access for payload 2340 to be moved into cargo bay 2365 in fuselage body 2310 of UAV 2300. Payload 2340 includes a top 2342 and a handle 2350 positioned on top 2342. Handle 2350 includes an opening 2352 configured to receive a lip of a payload coupling apparatus (described above) to secure payload 2340 to the payload coupling apparatus positioned within an upper portion 2315 above cargo bay 2365 of fuselage body 2310. Handle 2352 is also equipped with apertures 2354a and 2354b through which mounting pins (shown above) may extend through. A first end of a tether 2348 is attached to a winch system positioned within upper portion 2315 of fuselage body 2310, and a second end of the tether 2348 is attached to a payload coupling apparatus 2346 also positioned within upper portion 2315 of fuselage body 2310 (see FIG. 46A).

Upper portion 2315 of fuselage body 2310 includes a vertical handle slot 2360 to accommodate handle 2350 of payload 2340 when payload 2340 is inserted into cargo bay 2365. Once handle 2350 is inserted through vertical handle slot 2360, the payload 2340 is moved upwardly where handle 2350 is secured to the payload coupling apparatus 2346 by extending a lip of payload coupling apparatus 2346 through opening 2352 of handle 2350 of payload 2340 or 2341. The payload coupling apparatus 2346 may be biased towards the handle 2350 of the payload to facilitate entry of the lip of payload coupling apparatus 2346 into opening 2352 of handle 2350. In FIG. 44B, payload 2341 is shown having a shorter height than payload 2340 shown in FIG. 44A.

Figure 45A:
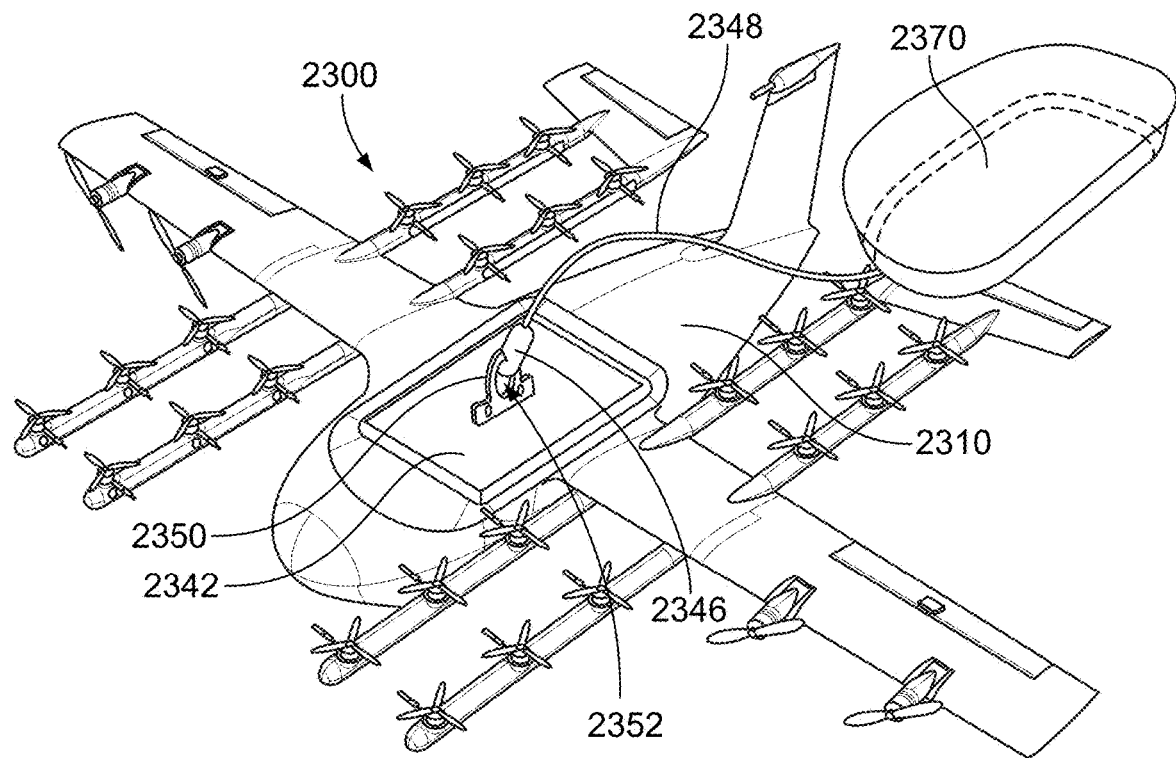
FIG. 45A is a perspective top view of UAV 2300 illustrating payload 2340 positioned in fuselage body 2310 of UAV 2300.

FIG. 45A is a perspective top view of UAV 2300 illustrating payload 2340 positioned in fuselage body 2310 of UAV 2300. Hatch door 2370 is shown removed from fuselage body 2310. Tether 2348 and payload coupling apparatus 2346 have been pulled out of hatch door 2370 and payload coupling apparatus 2346 has been secured to handle 2350 of top surface 2350 of payload 2340. Thus, payload coupling apparatus 2346 is shown secured to handle 2350 of payload 2340 before hatch door 2370 is positioned onto fuselage body 2310 of UAV 2300. Tether 2348 is attached to a winch system positioned within hatch door 2370.

Figure 45B:
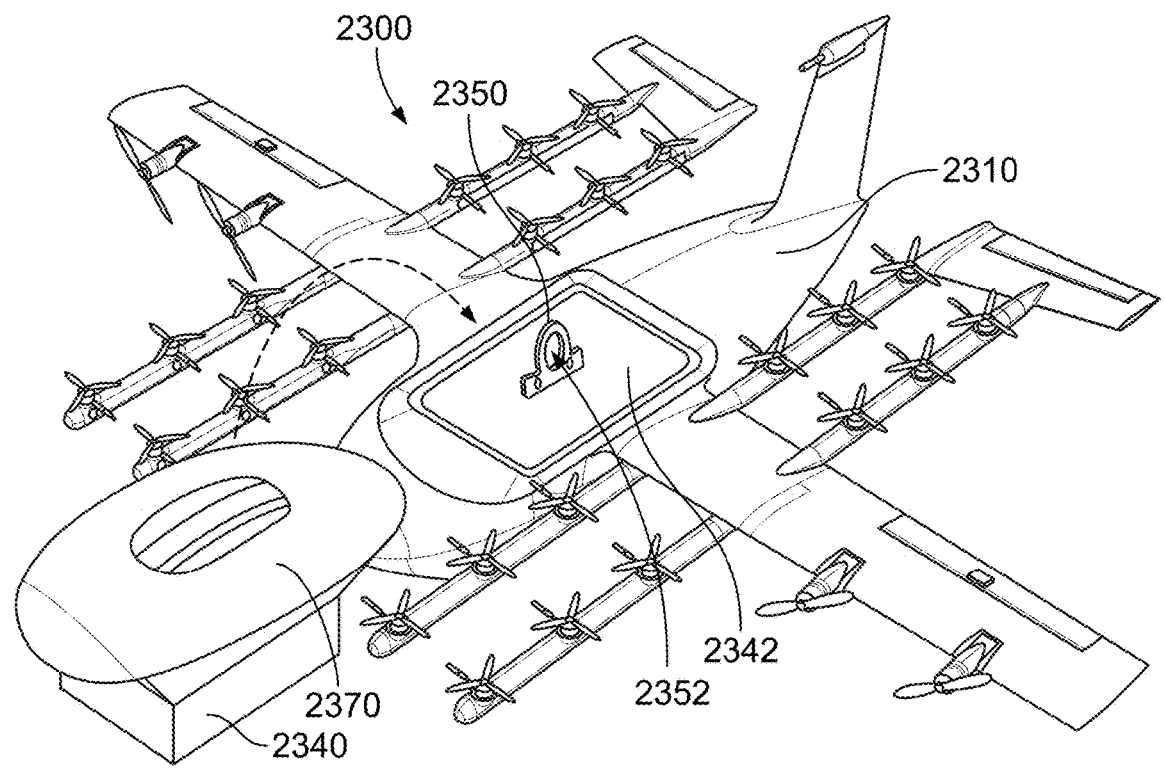
FIG. 45B is a perspective top view of UAV 2300 illustrating payload 2340 secured to hatch door 2370 and being inserted into fuselage body 2310 of UAV 2300.

FIG. 45B is a perspective top view of UAV 2300 illustrating payload 2340 secured to hatch door 2370 and being inserted into fuselage body 2310 of UAV 2300. In FIG. 45B, door hatch 2370 is secured to payload 2340 prior to positioning payload 2340 into the cargo bay in fuselage body 2310 of UAV 2300. In FIG. 45B, hatch door 2370 is shown removed from the fuselage body 2310 after payload 2340 has been positioned in the cargo bay of the fuselage body 2310.

Figure 46A:
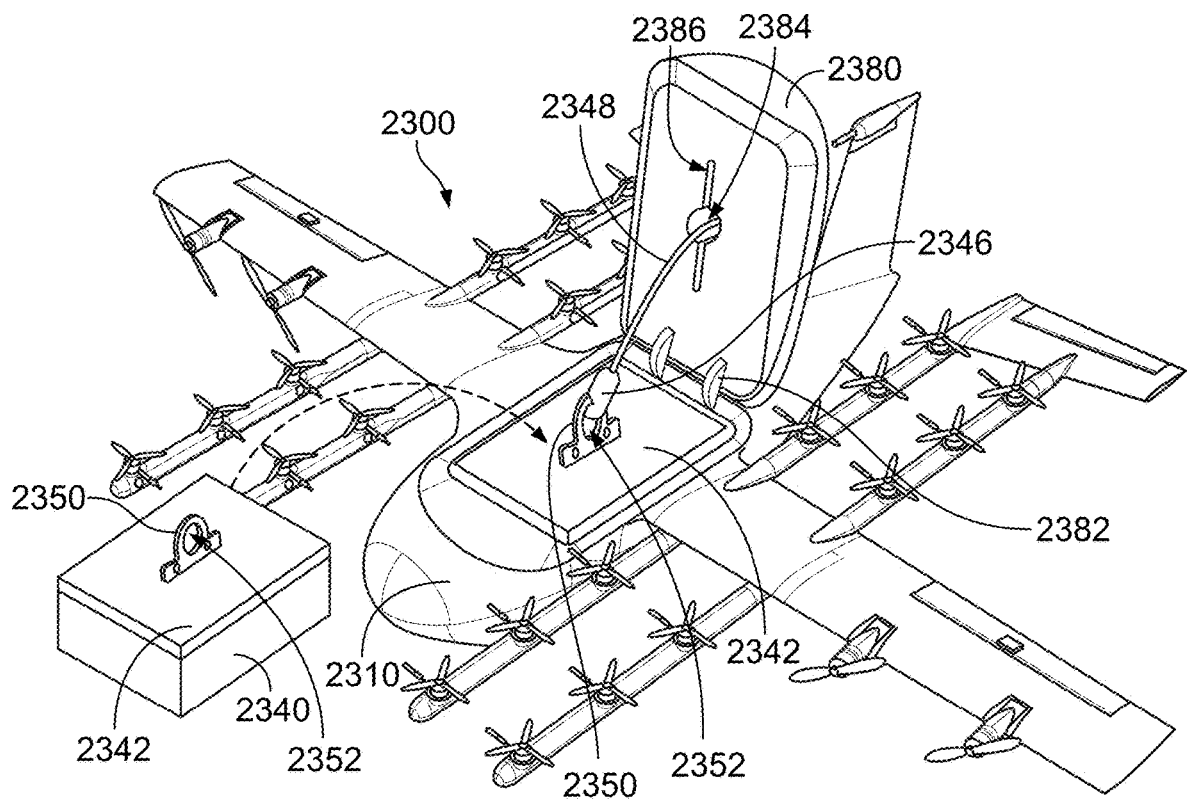
FIG. 46A is a perspective top view of UAV 2300 illustrating payload 2340 being inserted into fuselage body 2310 of UAV 2300.

FIG. 46A is a perspective top view of UAV 2300 illustrating payload 2340 being inserted into fuselage body 2310 of UAV 2300. Payload 2340 is shown being moved into position in the cargo bay of fuselage body 2310, with hatch door 2380 in an open position. Tether 2348 and payload coupling apparatus 2346 have been pulled out of hatch door 2380 through payload coupling apparatus opening 2384 in a bottom surface of hatch door 2380 and payload coupling apparatus 2346 has been secured to handle 2350 of top surface 2342 of payload 2340. Thus, payload coupling apparatus 2346 is shown secured to handle 2350 of payload 2340 before hatch door 2380 is closed onto fuselage body 2310 of UAV 2300. The bottom surface of hatch door 2380 includes a handle slot 2386 to accommodate handle 2350 of payload 2340 when hatch door 2380 is closed and positioned over the cargo bay. Tether 2348 is attached to a winch system positioned within hatch door 2380. In FIG. 46A, hatch door 2380 is hingedly attached to fuselage body 2310 with hinges 2382 positioned on a lateral edge of fuselage body 2310. Hatch door 2380 is shown in an open condition with the payload coupling apparatus 2346 pull down from the winch with a little slack on the tether. An operator places the payload 2340 into the cargo bay and the payload 2340 and manually attaches the handle 2350 of the payload 2340 to the payload coupling apparatus 2346 and the slack in the tether is reduced which increases tension on the winch motor. The winch system senses the tension on the winch motor, delays for a few moments, and then the winch slowly retracts the tether onto the winch. A sprung open hinge on the cargo bay door allows for constant tension as the cargo bay door is closed over the payload.

Figure 46B:
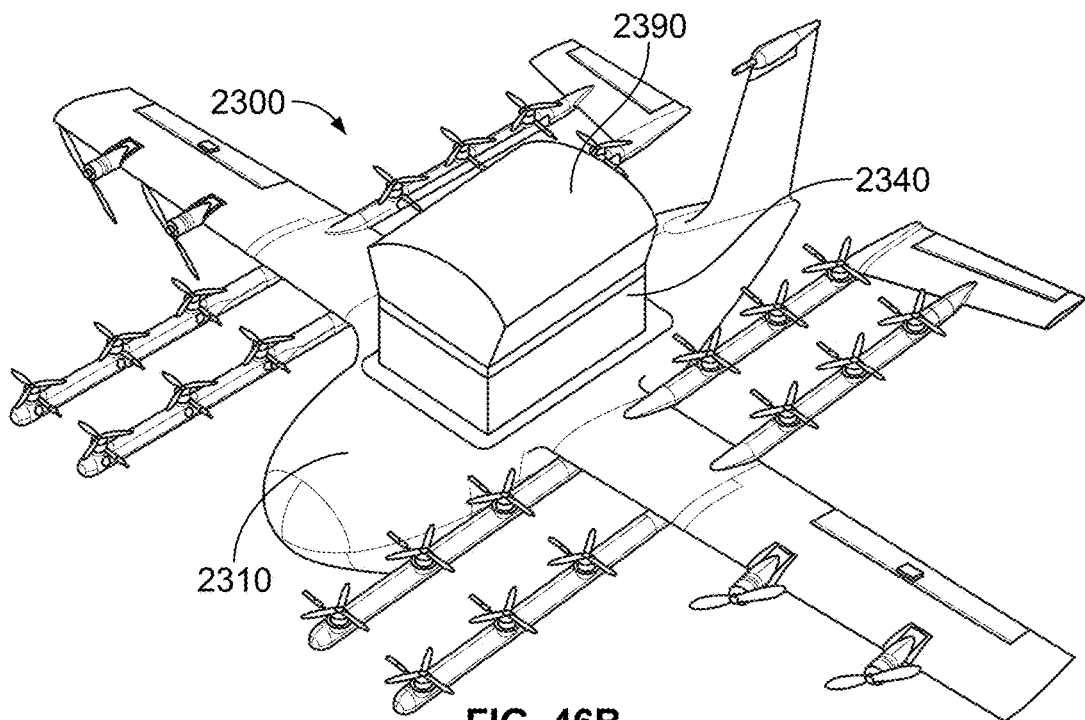
FIG. 46B is a perspective top view of UAV 2300 illustrating payload 2340 secured to hatch door 2390 and being inserted into fuselage body 2310 of UAV 2300.

FIG. 46B is a perspective top view of UAV 2300 illustrating payload 2340 secured to hatch door 2390 and being inserted into cargo bay 2420 in fuselage body 2310 of UAV 2300. In FIG. 46B, hatch door 2390 is secured to payload 2340 prior to positioning payload 2340 into the cargo bay in fuselage body 2310 of UAV 2300.

FIG. 47A is a perspective top view of UAV 2300 illustrating payload 2340 being inserted into cargo bay 2420 in fuselage body 2310 of UAV 2300. Payload 2340 is shown being moved into position in the cargo bay of fuselage body 2310, with hatch door 2400 in an open position. Tether 2348 and payload coupling apparatus 2346 have been pulled out of hatch door 2400 through payload coupling apparatus opening 2484 in a bottom surface of hatch door 2400 for subsequent attachment to handle 2350 of top surface 2342 of payload 2340. Thus, payload coupling apparatus 2346 is shown prior to being secured to handle 2350 of payload 2340 before hatch door 2400 is closed onto fuselage body 2310 of UAV 2300. The bottom surface of hatch door 2400 includes a handle slot 2486 to accommodate handle 2350 of payload 2340 when hatch door 2400 is closed and positioned over the cargo bay 2420 in fuselage body 2310 of UAV 2300. Tether 2342 is attached to a winch system positioned within hatch door 2400. In FIG. 47A, hatch door 2400 is hingedly attached to fuselage body 2310 with hinges 2482 positioned on a longitudinal edge of fuselage body 2310. A bar 2317 is shown laterally extending across a top of cargo bay 2420 and a bottom surface of hatch door 2400 includes a bar receptacle 2486 to accommodate bar 2317.

FIG. 47B is a perspective top view of UAV 2300 illustrating payload 2340 positioned in cargo bay 2420 in the fuselage body 2310 of UAV 2300. Payload 2340 has been moved into position in the cargo bay of fuselage body 2310, with hatch door 2450 in an open position. Tether 2348 and payload coupling apparatus 2346 have been pulled out of hatch door 2450 through payload coupling apparatus opening 2490 in a bottom surface of hatch door 2450 for subsequent attachment to handle 2350 of top surface 2342 of payload 2340. Thus, payload coupling apparatus 2346 is shown prior to being secured to handle 2350 of payload 2340 before hatch door 2450 is closed onto fuselage body 2310 of UAV 2300. The bottom surface of hatch door 2450 includes a handle slot 2492 to accommodate handle 2350 of payload 2340 when hatch door 2450 is closed and positioned over the cargo bay 2420 in fuselage body 2310 of UAV 2300. Tether 2348 is attached to a winch system positioned within hatch door 2450. In FIG. 47B, hatch door 2450 is hingedly attached to fuselage body 2310 with hinges 2483 positioned on a lateral edge of fuselage body 2310. A bar 2317 is shown laterally extending across a top of cargo bay 2420.

Figure 48A:
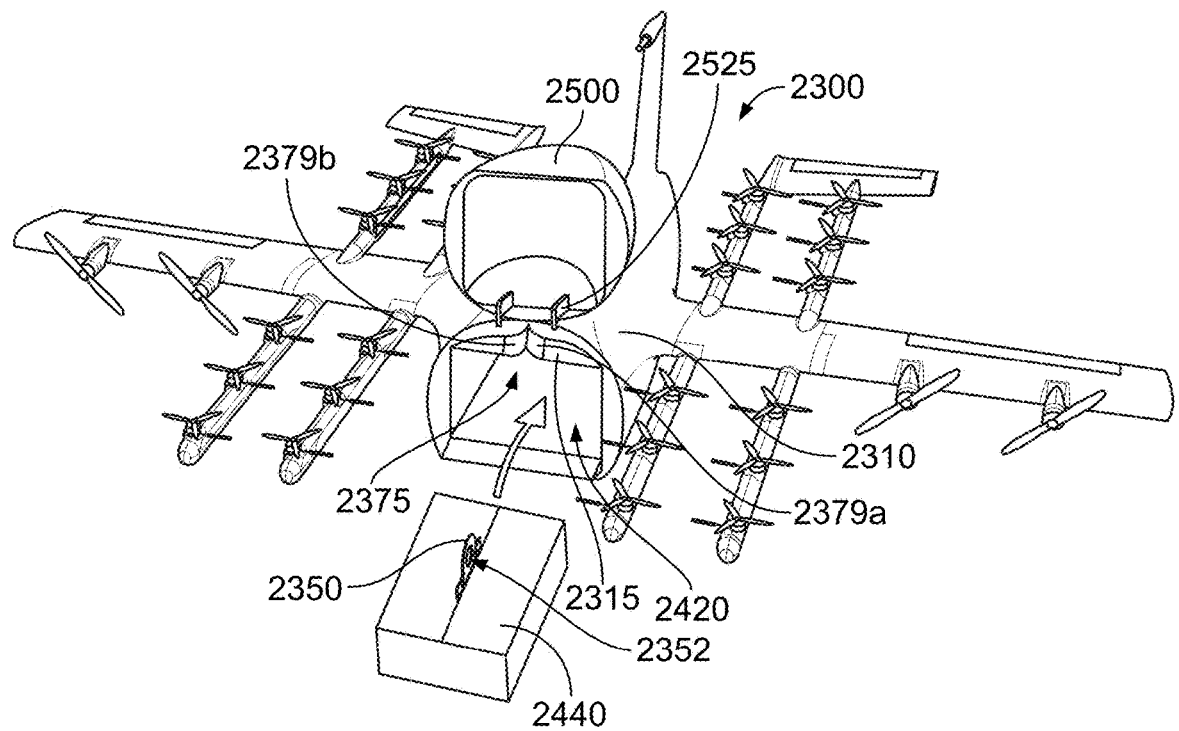
FIG. 48A is a perspective top view of UAV 2300 illustrating payload 2440 prior to being positioned in cargo bay 2420 of fuselage body 2310 of UAV 2300.
Figure 48B:
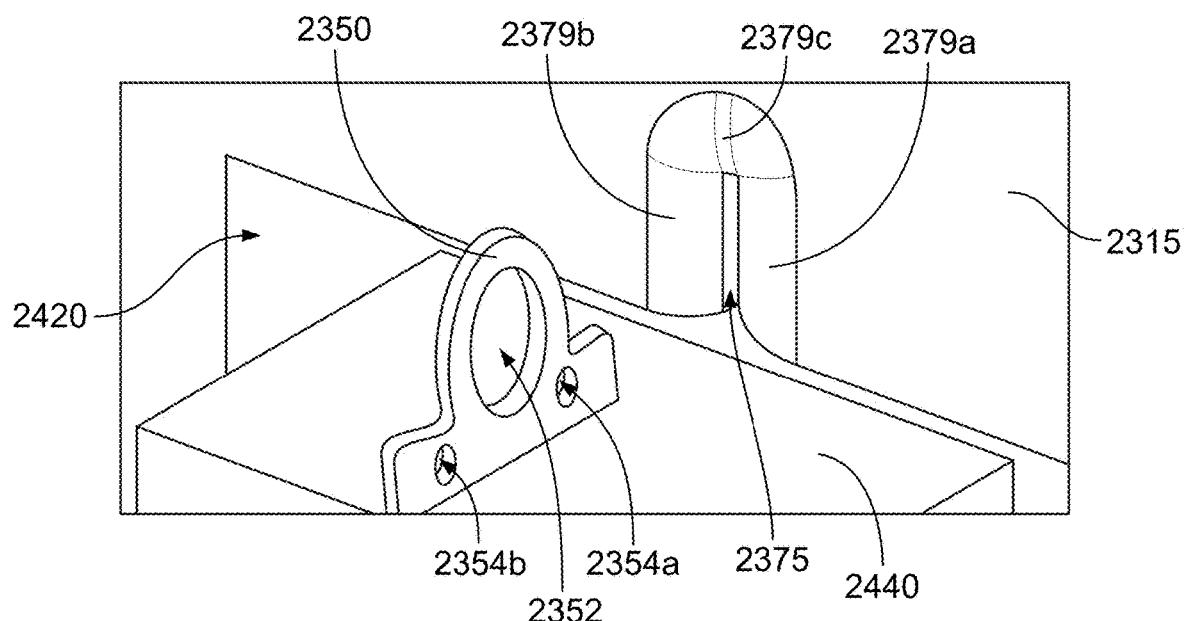
FIG. 48B is a close up perspective view of payload 2440 prior to insertion of payload 2440 into cargo bay 2420 of fuselage body 2310 of UAV 2300.

FIG. 48A is a perspective top view of UAV 2300 illustrating payload 2440 prior to being positioned in cargo bay 2420 of fuselage body 2310 of UAV 2300, and FIG. 48B is a close up perspective view of payload 2440 prior to insertion of payload 2440 into cargo bay 2420 of fuselage body 2310 of UAV 2300, and prior to insertion of handle 2350 into handle slot 2375 in the upper portion 2315 of fuselage body 2310. In FIGS. 48A and 48B, a nose section 2500 of UAV 2300 has been has been moved upwardly using hinges 2525 attached to nose section 2500 and fuselage body 2310 allowing access for payload 2440 to be moved into cargo bay 2375 in fuselage body 2310 of UAV 2300. Payload 2440 includes handle 2350 positioned on top of payload 2440. Handle 2350 includes an opening 2352 configured to receive a lip of a payload coupling apparatus (described above) to secure payload 2440 to the payload coupling apparatus positioned within an upper portion 2315 above cargo bay 2375 of fuselage body 2310. Handle 2352 is also equipped with apertures 2354a and 2354b through which mounting pins (shown above) may extend through. A first end of a tether 2348 is attached to a winch system positioned within upper portion 2315 of fuselage body 2310, and a second end of the tether 2348 is attached to a payload coupling apparatus 2346 also positioned within upper portion 2315 of fuselage body 2310 (see FIG. 46A).

Upper portion 2315 of fuselage body 2310 includes a vertical handle slot 2375 to accommodate handle 2350 of payload 2440 when payload 2440 is inserted into cargo bay 2375. Once handle 2350 is inserted through vertical handle slot 2375 it is secured to the payload coupling apparatus 2346 by extending a lip of payload coupling apparatus 2346 through opening 2352 of handle 2350 of payload 2340 or 2341. The payload coupling apparatus 2346 may be biased towards the handle 2350 of the payload 2440 to facilitate entry of the lip of payload coupling apparatus 2346 into opening 2352 of handle 2350. As shown in FIG. 48B, vertical handle slot 2375 includes curved lead in surfaces 2379a, 2379b, and 2379c surrounding the vertical handle slot 2375 to guide the handle 2352 of the payload 2440 into the vertical handle slot 2375. In addition, upon entry into the cargo bay, the handle 2352 of the payload 2440 may be slightly bent and deformed to allow the payload coupling apparatus 2346 that is positioned in a known and fixed orientation behind the handle slot 2375 to engage and secure the handle 2352 of the payload 2440 as the payload coupling apparatus 2346 is pulled upwardly.

Figure 49A:
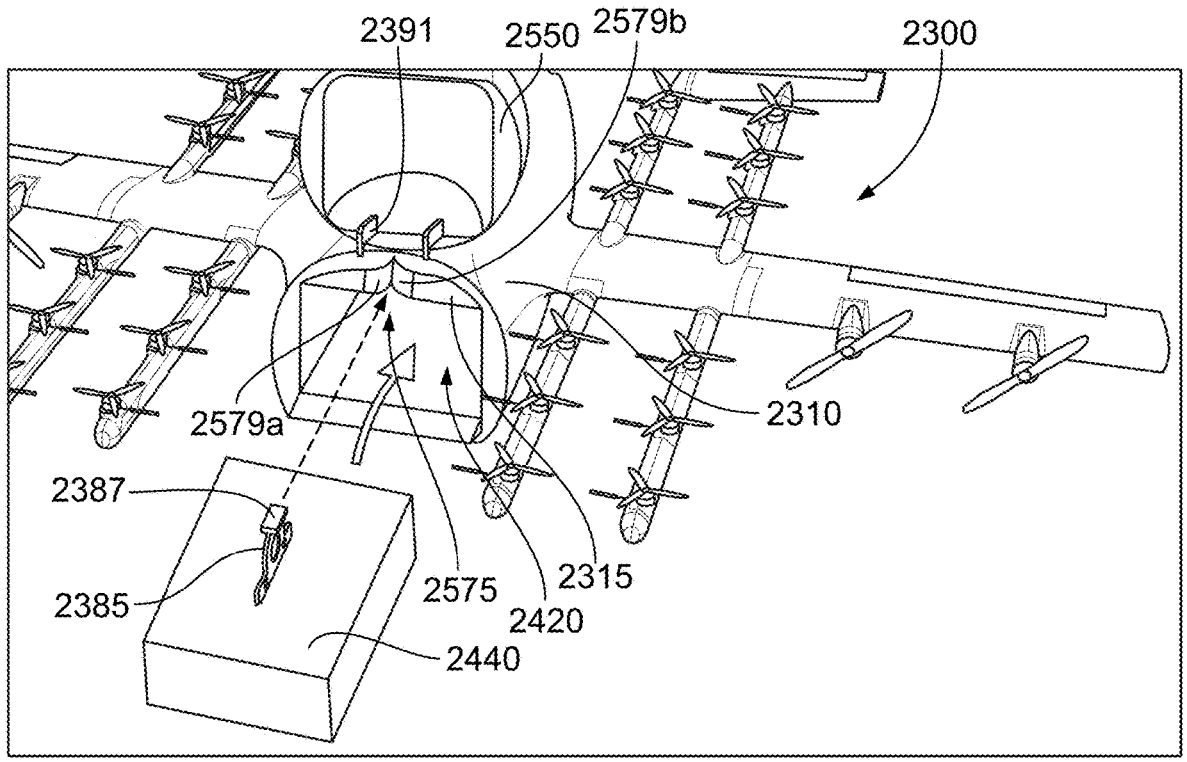
FIG. 49A is a perspective top view of UAV 2300 illustrating payload 2440 prior to being positioned in cargo bay 2420 of fuselage body 2310 of UAV 2300.
Figure 49B:
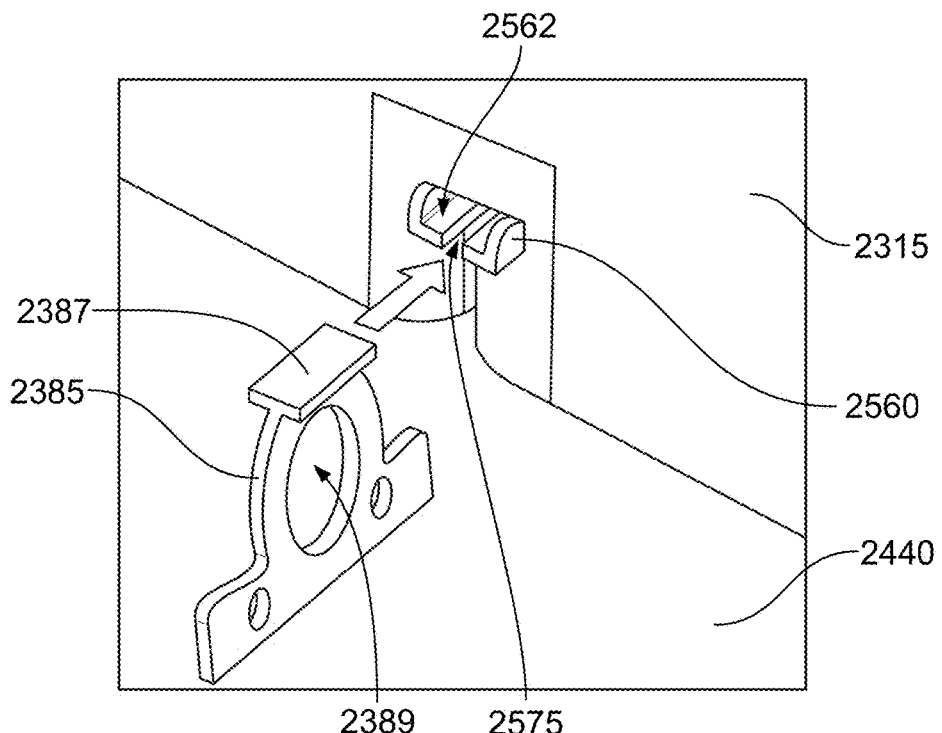
FIG. 49B is a close up perspective view of payload 2440 prior to insertion of payload 2440 into cargo bay 2420 of fuselage body 2310 of UAV 2300.

FIG. 49A is a perspective top view of UAV 2300 illustrating payload 2440 prior to being positioned in cargo bay 2420 of fuselage body 2310 of UAV 2300, and FIG. 49B is a close up perspective view of payload 2440 prior to insertion of payload 2440 into cargo bay 2420 of fuselage body 2310 of UAV 2300. In FIGS. 49A and 49B, a nose section of UAV 2500 has been has been moved upwardly using hinges 2391 attached to nose section 2550 and fuselage body 2310 allowing access for payload 2440 to be moved into cargo bay 2375 in fuselage body 2310 of UAV 2300. Payload 2440 includes handle 2385 positioned on top of payload 2440. Handle 2385 includes an opening 2389 configured to receive a lip of a payload coupling apparatus (described above) to secure payload 2440 to the payload coupling apparatus positioned within an upper portion 2315 above cargo bay 2430 of fuselage body 2310. A first end of a tether 2348 is attached to a winch system positioned within upper portion 2315 of fuselage body 2310, and a second end of the tether 2348 is attached to a payload coupling apparatus 2346 also positioned within upper portion 2315 of fuselage body 2310. (see FIG. 46A).

Upper portion 2315 of fuselage body 2310 includes a vertical handle slot 2575 to accommodate handle 2385 of payload 2440 when payload 2440 is inserted into cargo bay 2375. Once handle 2350 is inserted through vertical handle slot 2375 it is secured to the payload coupling apparatus 2346 by extending a lip of payload coupling apparatus 2346 through opening 2389 of handle 2385 of payload 2440. A top of handle 2389 also includes a horizontal flange 2387, and a horizontal opening 2562 with edges 2560 is positioned in the upper portion 2315 of the fuselage body 2310 above the vertical handle slot 2575 to receive the horizontal flange 2387 on the top of the handle 2385 of the payload 2440. The payload coupling apparatus 2346 may be biased towards the handle 2389 of the payload 2440 to facilitate entry of the lip of payload coupling apparatus 2346 into opening 2389 of handle 2385. As shown in FIGS. 49A and 49B, vertical handle slot 2575 includes curved lead in surfaces 2579a and 2579b surrounding the vertical handle slot 2575 to guide the handle 2385 of the payload 2440 into the vertical handle slot 2575.

FIG. 50A is a perspective view illustrating hatch door 2600 being lowered onto payload 2340, FIG. 50B is a perspective view illustrating hatch door 2600 being lowered onto payload 2340, with handle 2350 of payload 2340 entering a bottom surface of hatch door 2600, and FIG. 50C is a perspective view of hatch door 2600 secured to payload 2340. A first end of a tether 2348 is attached to a winch system positioned within hatch door 2600, and a second end of the tether 2348 is attached to a payload coupling apparatus 2346 also positioned within hatch door 2600. A handle 2610 is positioned on a top surface of hatch door 2600 and is used to lower hatch door 2600 onto payload 2340. When hatch door 2600 is lowered onto payload 2340, the payload coupling apparatus 2346 within the hatch door 2600 is secured to the payload coupling apparatus 2346 by extending a lip of payload coupling apparatus 2346 through opening 2352 of handle 2350 of payload 2440. The payload coupling apparatus 2346 may be biased towards the handle 2350 of the payload 2340 to facilitate entry of the lip of payload coupling apparatus 2346 into opening 2352 of handle 2350. In addition, upon entry into the cargo bay, the handle 2352 of the payload 2440 may be slightly bent and deformed to allow the payload coupling apparatus 2346 that is positioned in a known and fixed orientation within the hatch door 2600 above a handle slot to engage and secure the handle 2352 of the payload 2440 as the handle 2352 of of payload 2440 is moved upwardly through the handle slot in hatch door 2600.

Figure 51A:
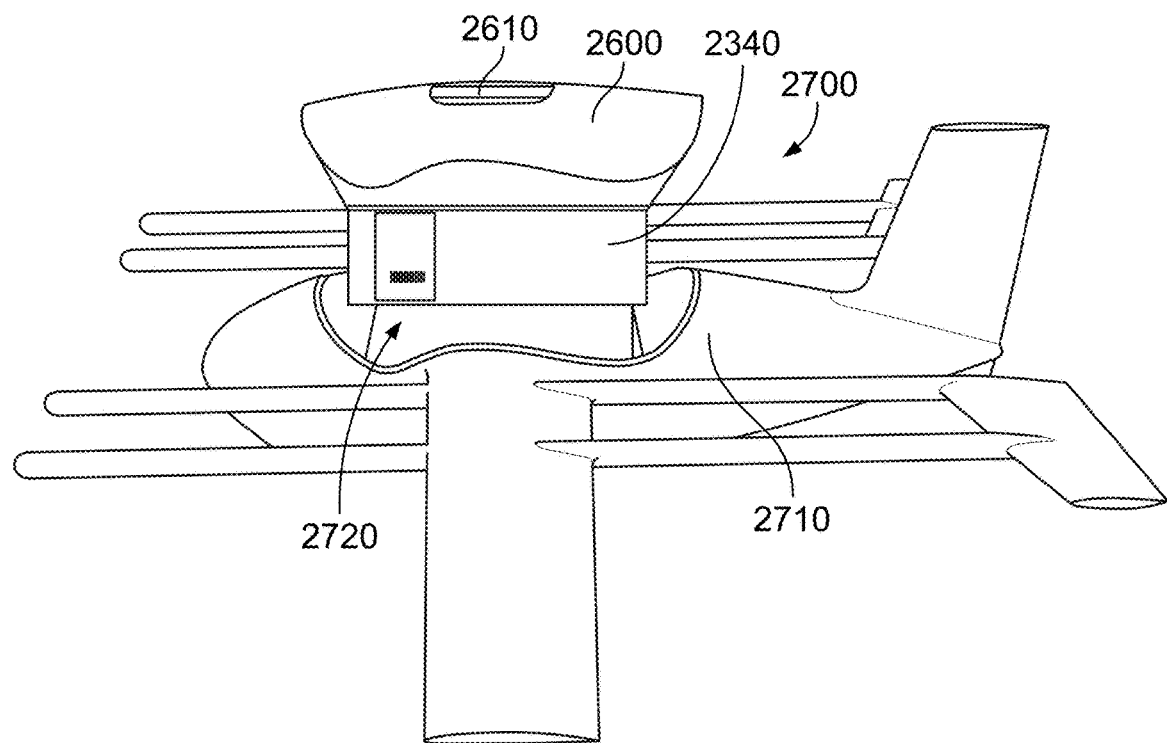
FIG. 51A is a perspective view of hatch door 2600 secured to payload 2340 positioned above cargo bay 2720 of fuselage body 2710 of UAV 2700.
Figure 51B:
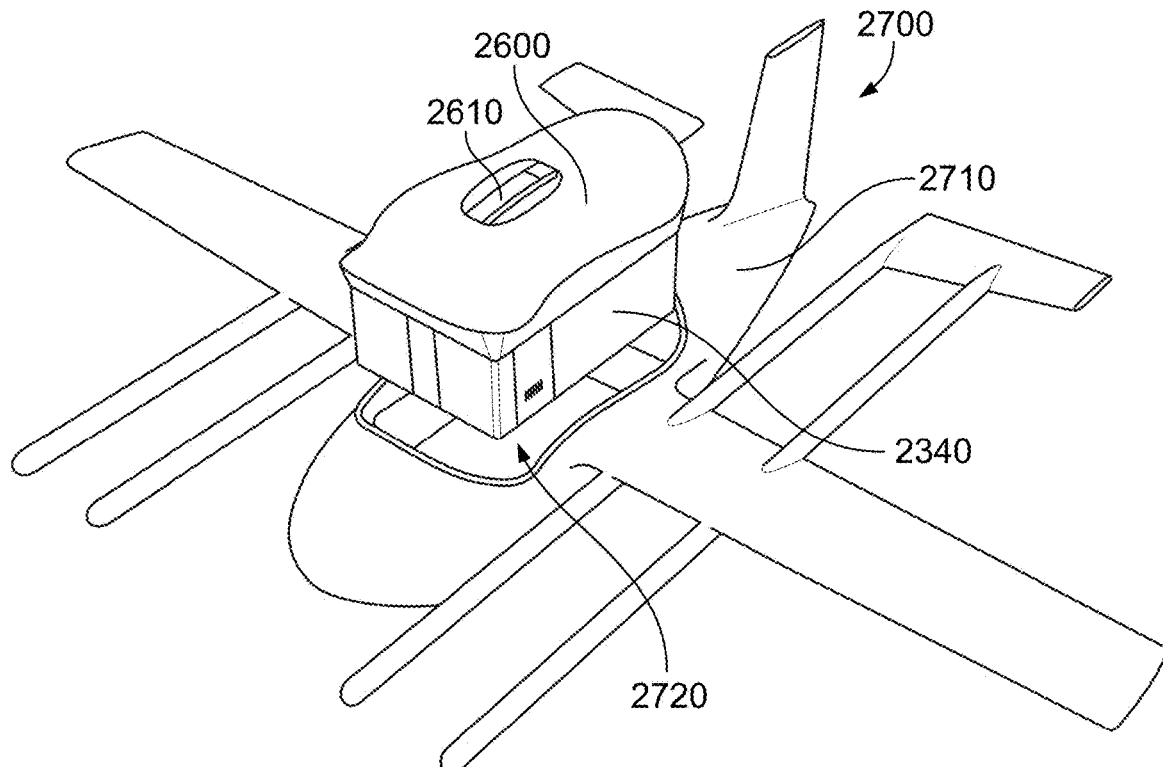
FIG. 51B is a another perspective view of hatch door 2600 secured to payload 2340 positioned above cargo bay 2720 of fuselage body 2710 of UAV 2700.

FIG. 51A is a perspective view of hatch door 2600 secured to payload 2340 positioned above cargo bay 2720 of fuselage body 2710 of UAV 2700, and FIG. 51B is a another perspective view of hatch door 2600 secured to payload 2340 positioned above cargo bay 2720 of fuselage body 2710 of UAV 2700.

Figure 51C:
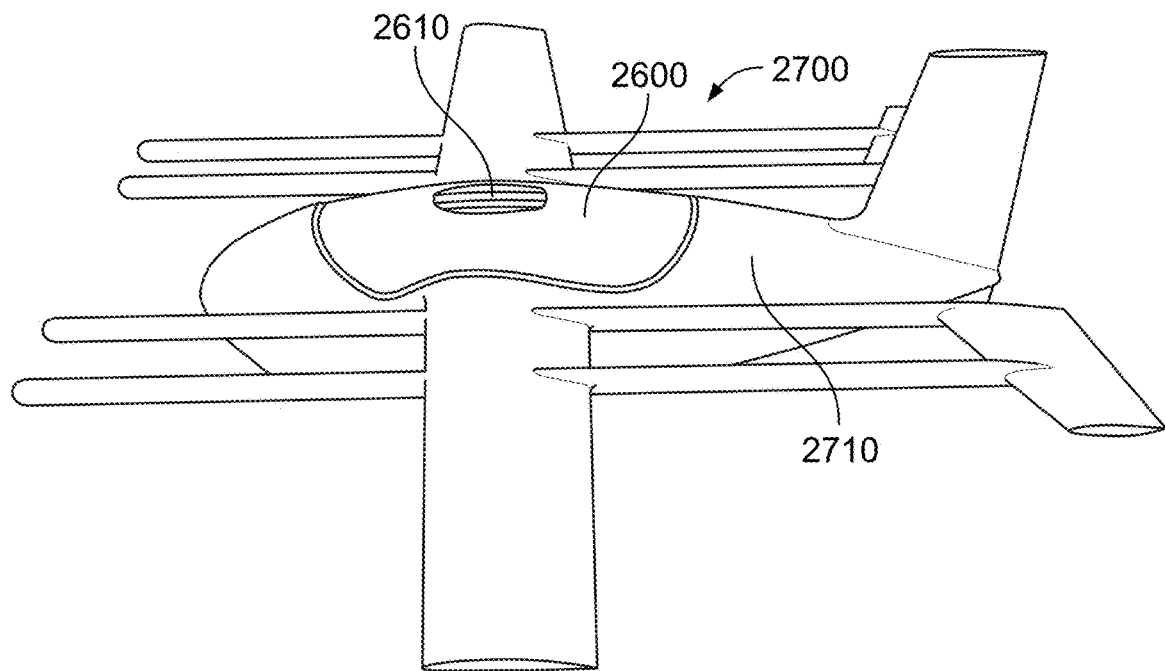
FIG. 51C is a perspective view of hatch door 2600 positioned in fuselage body 2710 of UAV 2700.
Figure 51D:
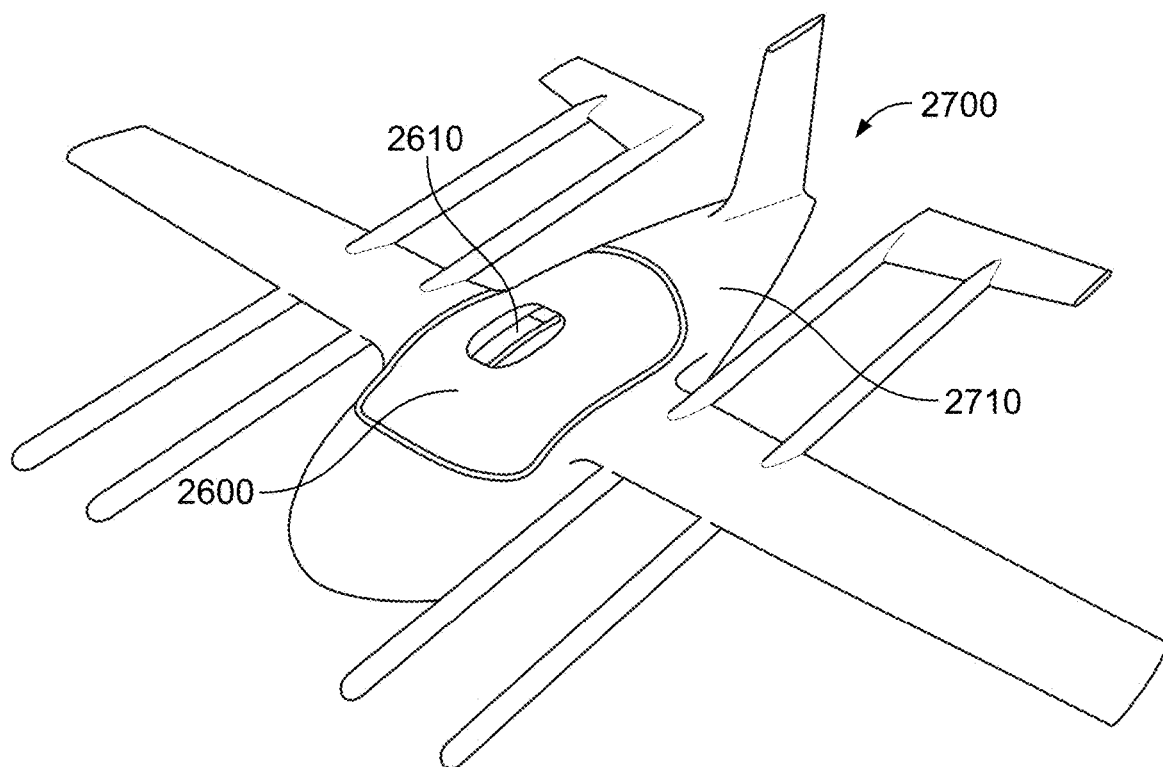
FIG. 51D is another perspective view of hatch door 2600 positioned in fuselage body 2710 of UAV 2700.

FIG. 51C is a perspective view of hatch door 2600 positioned in fuselage body 2710 of UAV 2700, and FIG. 51D is a another perspective view of hatch door 2600 positioned in fuselage body 2710 of UAV 2700.

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. An unmanned aerial vehicle (UAV) comprising:
    a fuselage body including:
        a cavity that forms a cargo bay for transporting a payload, and
        a lower access opening for lowering the payload from the cargo bay, the lower access opening including a cargo bay door;
    a winch system positioned in the cargo bay configured to suspend a payload within the cargo bay;
    a motor operable to open and close the cargo bay door; and
    a cargo bay door monitor which is configured to detect a current of the motor to determine whether the payload is exerting a force on the cargo bay door to provide an indication that the payload has been detached from the winch system and/or the payload has been lowered by the tether onto the cargo bay door such that the payload is applying a weight to the cargo bay door.

2. The UAV of claim 1, wherein the cargo bay door includes a first door rotatably attached to a first side of a bottom surface of the fuselage body on a first edge of the first door with a longitudinally extending first hinge, and a second door rotatably attached to a second side of the bottom surface of the fuselage body on a first edge of the second door with a longitudinally extending second hinge; and
    wherein the cargo bay door may be opened by rotating the first door about the first hinge such that a second edge of the first door extends downwardly, and by rotating the second door about the second hinge such that a second edge of the second door extends downwardly.

3. The UAV of claim 1, wherein the cargo bay door includes a first door rotatably attached to a first side of the fuselage body on a first edge of the first door with a longitudinally extending first hinge, and a second door rotatably attached to a second side of the fuselage body on a first edge of the second door with a longitudinally extending second hinge; and
    wherein the cargo door may be opened by rotating the first door about the first hinge such that a second edge of the first door extends downwardly, and by rotating the second door about the second hinge such that a second edge of the second door extends downwardly.

4. The UAV of claim 3, wherein the first door comprises a first section hingedly attached to a second section of the first door with a longitudinally extending third hinge, and the second door comprises a first section hingedly attached to a second section of the second door with a longitudinally extending fourth hinge.

5. The UAV of claim 4, wherein the third hinge and the fourth hinge comprise a living hinge.

6. The UAV of claim 4, wherein the third hinge on the first door extends along an intersection of the first side of the fuselage body and a bottom surface of the fuselage body, and the fourth hinge on the second door extends along an intersection of the second side of the fuselage body and the bottom surface of the fuselage body.

7. The UAV of claim 1, wherein the cargo bay door includes a first door rotatably attached to a first side of a bottom surface of the fuselage body on a first edge of the first door with a laterally extending first hinge, and a second door rotatably attached to a second side of the bottom surface of the fuselage body on a first edge of the second door with a laterally extending second hinge; and
    wherein the cargo bay door may be opened by rotating the first door about the first hinge such that a second edge of the first door extends downwardly, and by rotating the second door about the second hinge such that a second edge of the second door extends downwardly.

8. The UAV of claim 1, wherein the cargo bay door includes a first door rotatably attached to a first side of a bottom surface of the fuselage on a first edge of the first door with a longitudinally extending first hinge; and
    wherein the cargo door may be opened by rotating the first door about the first hinge such that a second edge of the first door extends downwardly.

9. The UAV of claim 1, wherein the cargo bay door includes a first door rotatably attached to a first side of a bottom surface of the fuselage on a first edge of the first door with a laterally extending first hinge; and
    wherein the cargo door may be opened by rotating the first door about the first hinge such that a second edge of the first door extends downwardly.

10. The UAV of claim 1, wherein the cargo bay door includes a plurality of longitudinally extending slats flexibly connected to each other such that the cargo bay door may be retracted into the cavity of the cargo bay to open access to the lower access opening of the cargo bay.

11. The UAV of claim 1, wherein the cargo bay door includes a plurality of longitudinally extending slats flexibly connected to each other such that the cargo bay door may be retracted to an edge of the lower access opening of the cargo bay in an accordion-like manner to open access to the lower access opening of the cargo bay.

12. The UAV of claim 11, wherein the edge of the lower access opening of the cargo bay is a longitudinally extending edge.

13. The UAV of claim 11, wherein the edge of the lower access opening of the cargo bay is a laterally extending edge.

14. The UAV of claim 1 wherein the cargo bay door is adapted to be rolled up to an edge of the lower access opening of the cargo bay.

15. The UAV of claim 14, wherein the edge of the lower access opening of the cargo bay is a longitudinally extending edge.

16. The UAV of claim 14, wherein the edge of the lower access opening of the cargo bay is a laterally extending edge.

17. The UAV of claim 1, wherein the motor is a servo motor.

18. The UAV of claim 1, wherein the cargo bay door includes a latch which can be monitored to ensure that the cargo bay door is in a closed position.

19. The UAV of claim 1, wherein the cargo bay door includes a first door rotatably attached to the fuselage body on a first edge of the first door with a first hinge, and includes a second door rotatably to the fuselage body with a second hinge; wherein first and second doors of the cargo bay door may be retracted inwardly into the cavity of the cargo bay.

20. The UAV of claim 19, wherein when the first and second doors of the cargo bay door are retracted inwardly into the cargo bay, a current of the motor is be used to determine whether a payload is present in the cavity of the cargo bay, as when the first door and second doors of the cargo bay door contact the payload there is a rise in the current of the motor indicating that the payload is present in the cargo bay.

21. An unmanned aerial vehicle (UAV) comprising:
a fuselage body including:
   a cavity that forms a cargo bay for transporting a payload; and
   a lower access opening for lowering the payload from the cargo bay, the lower access opening including a cargo bay door;
a winch system positioned in the cargo bay configured to suspend a payload within the cargo bay;
a motor operable to open and close the cargo bay door; and
a cargo bay door monitor which is configured to detect a current of the motor to determine whether the payload is exerting a force on the cargo bay door to provide an indication that the payload has been detached from the winch system and/or the payload has been lowered by the tether onto the cargo bay door such that the payload is in contact with the cargo bay door.

22. The UAV of claim 21, wherein the cargo bay door includes a first door rotatably attached to the fuselage body on a first edge of the first door with a first hinge, and includes a second door rotatably to the fuselage body with a second hinge; and
wherein a motor is used to open and close the first and second doors of the cargo bay door, and wherein when the first and second doors of the cargo bay door are retracted inwardly into the cargo bay, a current of the motor is used to determine whether a payload is present in the cavity of the cargo bay, as when the first door and/or second doors of the cargo bay door contact the payload there is a rise in the current of the motor indicating that the payload is present in the cargo bay.

23. A method comprising:
providing an unmanned aerial vehicle (UAV) having a fuselage body including a cavity that forms a cargo bay for transporting a payload, and a lower access opening for lowering the payload from the cargo bay, the lower access opening including a cargo bay door; a winch system positioned in the cargo bay configured to suspend a payload within the cargo bay; and a cargo bay door monitor which is configured to detect contact between the payload and the cargo bay door; and
using the cargo bay door monitor to detect contact between the payload and the cargo bay door;
wherein the cargo bay door monitor is a current of a motor;
wherein the cargo bay door includes a first door rotatably attached to the fuselage body on a first edge of the first door with a first hinge, and a second door rotatably attached to the fuselage body on a first edge of the second door with a second hinge; and
further including retracting the first and second doors of the cargo bay door inwardly into the cavity of the cargo bay using the motor; and
measuring the current of the motor to determine whether a payload is present in the cavity of the cargo bay, as when the first and/or second doors of the cargo bay door contact the payload there is a rise in the current of the motor indicating that the payload is present in the cargo bay.

24. The method claim 23, further including opening the cargo bay door with a motor.

25. The method of claim 23, further including closing the cargo bay door with the motor.

* * * * *